(12) United States Patent
Dodge, III et al.

(10) Patent No.: US 10,759,149 B2
(45) Date of Patent: *Sep. 1, 2020

(54) RECYCLED RUBBER BACKED CUSHIONED VINYL

(71) Applicant: ECORE INTERNATIONAL INC., Lancaster, PA (US)

(72) Inventors: Arthur B. Dodge, III, Lancaster, PA (US); John McFalls, Lancaster, PA (US)

(73) Assignee: Ecore International Inc., Lancaster, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/156,117

(22) Filed: May 16, 2016

(65) Prior Publication Data

US 2016/0361901 A1 Dec. 15, 2016

Related U.S. Application Data

(63) Continuation-in-part of application No. 13/835,895, filed on Mar. 15, 2013, now Pat. No. 9,340,970, (Continued)

(51) Int. Cl.
*B32B 25/04* (2006.01)
*B32B 7/12* (2006.01)
(Continued)

(52) U.S. Cl.
CPC ............. *B32B 25/04* (2013.01); *B32B 5/022* (2013.01); *B32B 5/024* (2013.01); *B32B 5/026* (2013.01); *B32B 5/16* (2013.01); *B32B 5/18* (2013.01); *B32B 5/24* (2013.01); *B32B 5/30* (2013.01); *B32B 7/04* (2013.01); *B32B 7/12* (2013.01); *B32B 9/02* (2013.01); *B32B 9/025* (2013.01); *B32B 9/045* (2013.01); *B32B 25/08* (2013.01); *B32B 25/10* (2013.01); *B32B 25/16* (2013.01); *B32B 27/08* (2013.01); *B32B 27/12* (2013.01); *B32B 27/30* (2013.01); *B32B 27/302* (2013.01); *B32B 27/304* (2013.01); *B32B 27/34* (2013.01); *B32B 27/36* (2013.01); *B32B 27/40* (2013.01);
(Continued)

(58) Field of Classification Search
CPC ..................................................... B32B 25/04
USPC ................................................. 428/477, 447
See application file for complete search history.

(56) References Cited

U.S. PATENT DOCUMENTS

2006/0199453 A1 * 9/2006 Kuhn ........................ B32B 5/26
442/38

FOREIGN PATENT DOCUMENTS

JP 2008231836 A * 10/2008

OTHER PUBLICATIONS

Translation of JP-2008231836-A (Year: 2008).*

\* cited by examiner

*Primary Examiner* — Brent O'Hern
(74) *Attorney, Agent, or Firm* — Johnson & Associates

(57) ABSTRACT

A laminated surface covering including a facing material made of vinyl and a backing material comprising a rubber component. The rubber component comprising at least a matrix of bonded rubber granules. A bonding material disposed between the facing material and the backing material. The facing material configured to melt at a temperature between 165° F. and 248° F. infiltrating the backing material thereby essentially encasing the rubber granules of the matrix and providing fire retardation and smoke suppression qualities.

21 Claims, 50 Drawing Sheets

Related U.S. Application Data which is a continuation-in-part of application No. 13/194,515, filed on Jul. 29, 2011, now Pat. No. 9,096,045, which is a continuation-in-part of application No. 12/756,954, filed on Apr. 8, 2010, now Pat. No. 8,728,260.

(60) Provisional application No. 61/301,468, filed on Feb. 4, 2010.

(51) Int. Cl.

| | |
|---|---|
| *B32B 27/30* | (2006.01) |
| *E04F 15/10* | (2006.01) |
| *B32B 5/30* | (2006.01) |
| *B32B 39/00* | (2006.01) |
| *B32B 5/16* | (2006.01) |
| *D06N 7/00* | (2006.01) |
| *B32B 37/20* | (2006.01) |
| *B32B 5/24* | (2006.01) |
| *B32B 27/40* | (2006.01) |
| *B32B 27/34* | (2006.01) |
| *B32B 25/16* | (2006.01) |
| *B32B 25/08* | (2006.01) |
| *B32B 27/08* | (2006.01) |
| *B32B 5/18* | (2006.01) |
| *B32B 5/02* | (2006.01) |
| *B32B 9/02* | (2006.01) |
| *B32B 27/12* | (2006.01) |
| *B32B 27/36* | (2006.01) |
| *B32B 7/04* | (2019.01) |
| *B32B 9/04* | (2006.01) |
| *B32B 25/10* | (2006.01) |
| *B32B 41/00* | (2006.01) |
| *B32B 37/08* | (2006.01) |
| *B32B 38/00* | (2006.01) |
| *B32B 37/12* | (2006.01) |

(52) U.S. Cl.
CPC ............ *B32B 37/203* (2013.01); *B32B 39/00* (2013.01); *D06N 7/0084* (2013.01); *E04F 15/105* (2013.01); *E04F 15/107* (2013.01); *B32B 37/08* (2013.01); *B32B 37/1207* (2013.01); *B32B 38/0004* (2013.01); *B32B 38/0036* (2013.01); *B32B 38/1875* (2013.01); *B32B 41/00* (2013.01); *B32B 2260/025* (2013.01); *B32B 2260/046* (2013.01); *B32B 2262/0253* (2013.01); *B32B 2262/0261* (2013.01); *B32B 2262/0276* (2013.01); *B32B 2262/062* (2013.01); *B32B 2262/101* (2013.01); *B32B 2264/02* (2013.01); *B32B 2264/0207* (2013.01); *B32B 2264/067* (2013.01); *B32B 2272/00* (2013.01); *B32B 2305/08* (2013.01); *B32B 2305/10* (2013.01); *B32B 2305/70* (2013.01); *B32B 2307/102* (2013.01); *B32B 2307/3065* (2013.01); *B32B 2307/536* (2013.01); *B32B 2307/546* (2013.01); *B32B 2307/558* (2013.01); *B32B 2307/732* (2013.01); *B32B 2307/734* (2013.01); *B32B 2309/02* (2013.01); *B32B 2319/00* (2013.01); *B32B 2327/06* (2013.01); *B32B 2419/04* (2013.01); *B32B 2471/00* (2013.01); *D06N 2203/048* (2013.01); *D06N 2205/106* (2013.01); *D06N 2209/067* (2013.01); *Y02P 70/649* (2015.11); *Y02P 70/651* (2015.11); *Y10T 428/31739* (2015.04); *Y10T 428/31855* (2015.04); *Y10T 428/31938* (2015.04)

Fig. 8

| 10 UNWIND STATION FOR BACKING MATERIAL |
|---|
| 11 SPLICE STATION FOR BACKING MATERIAL |
| 12 UNWIND STATION FOR FACING MATERIAL |
| 13 SPLICE STATION FOR FACING MATERIAL |
| 14 BONDING LAYER UNWIND STATION |
| 15 LAMINATOR |
| 16 COOLING CONVEYOR |
| 17 OPTIONAL INSPECTION STATION |
| 18 ACCUMULATOR |
| 19 REWIND SYSTEM / 22-23 CONTINOUS DIE CUTTING |
| 22-23 OPTIONAL DIE-CUTTING |

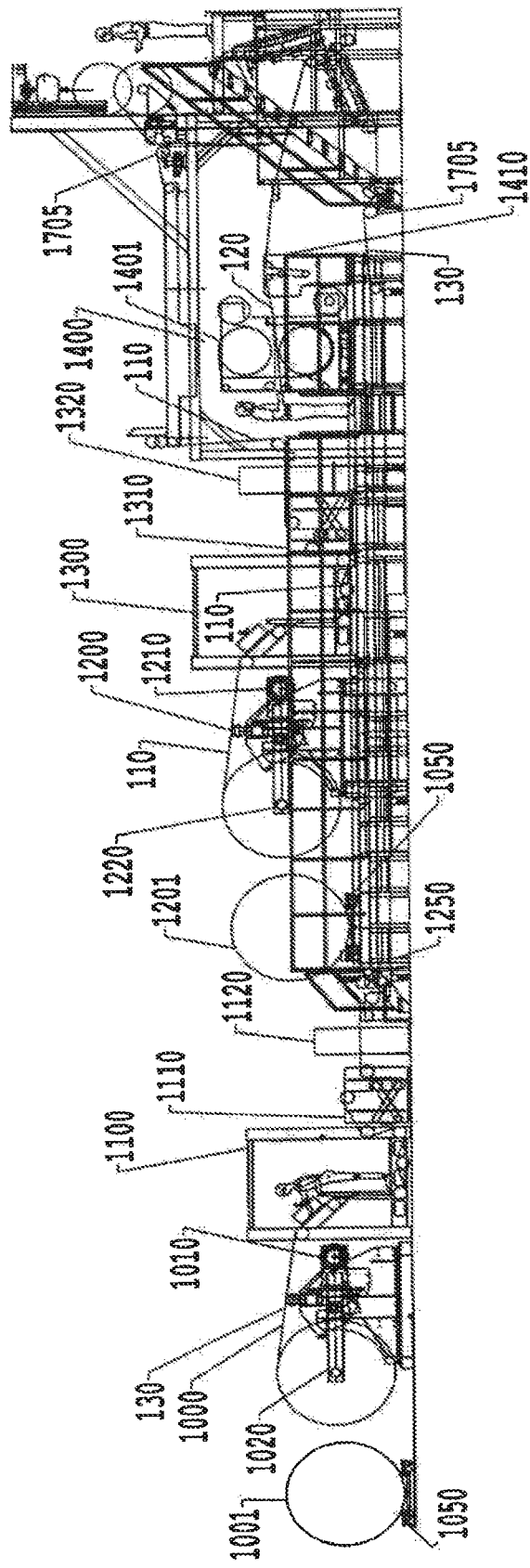

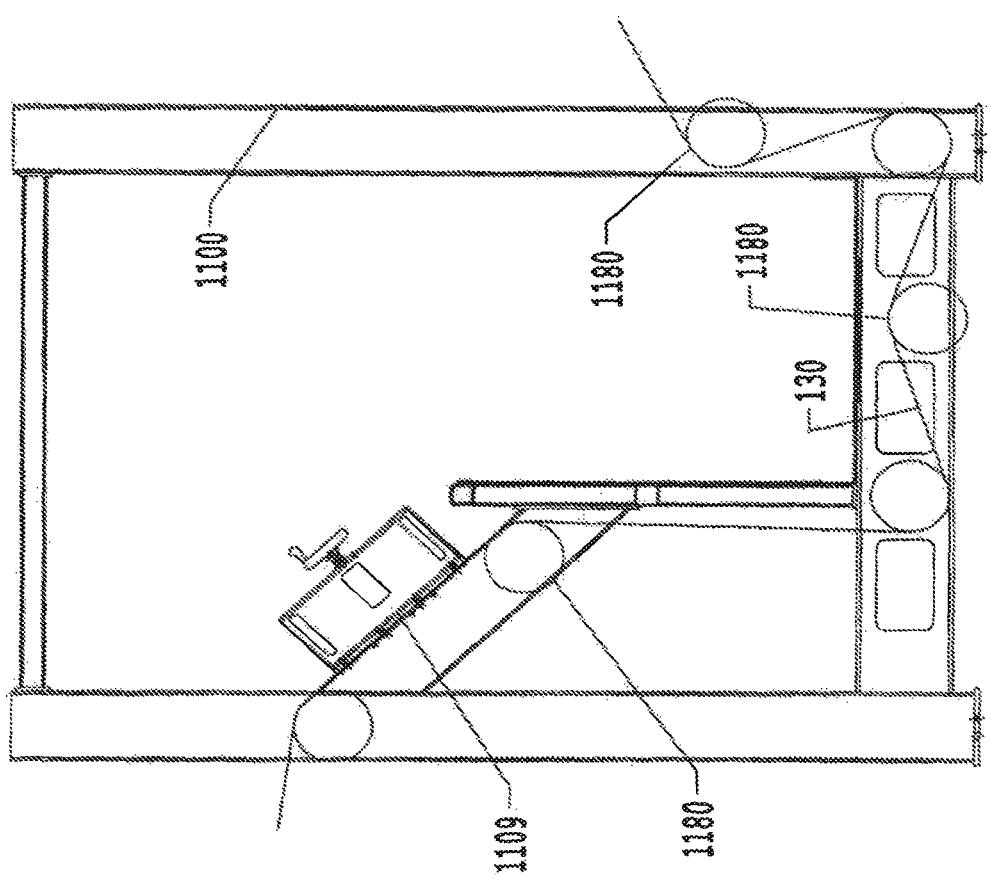

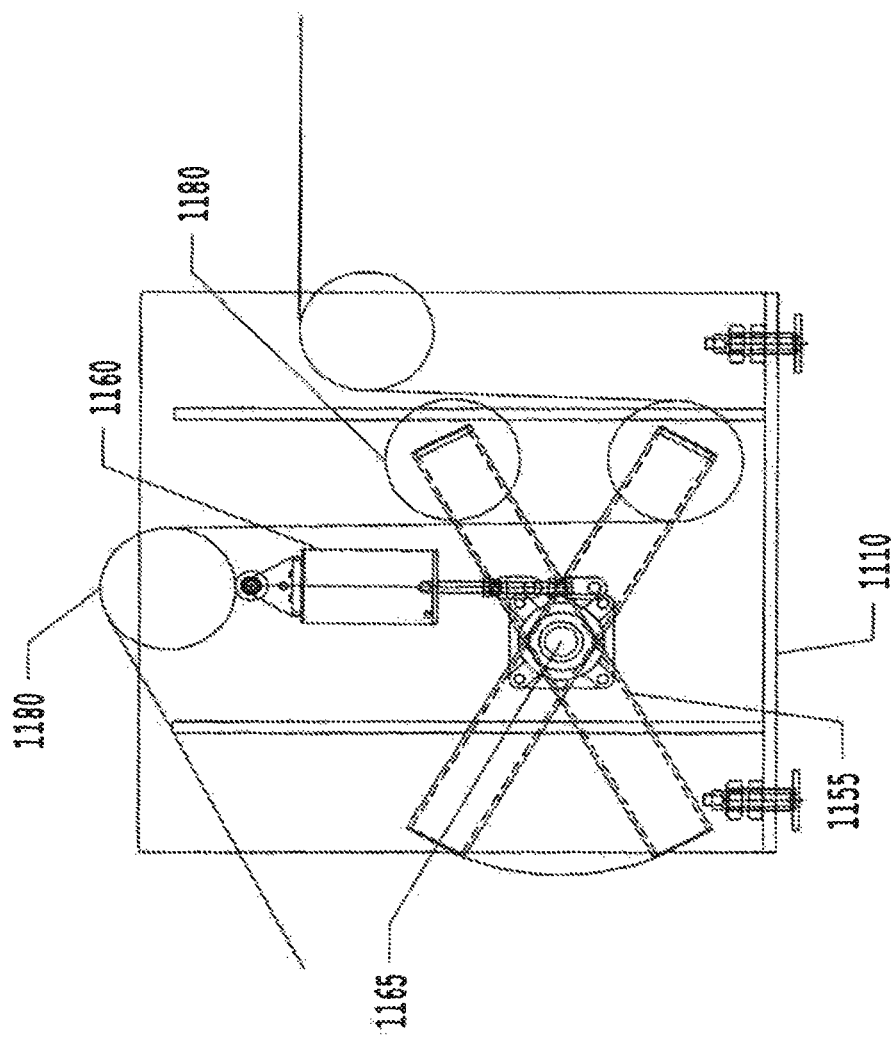

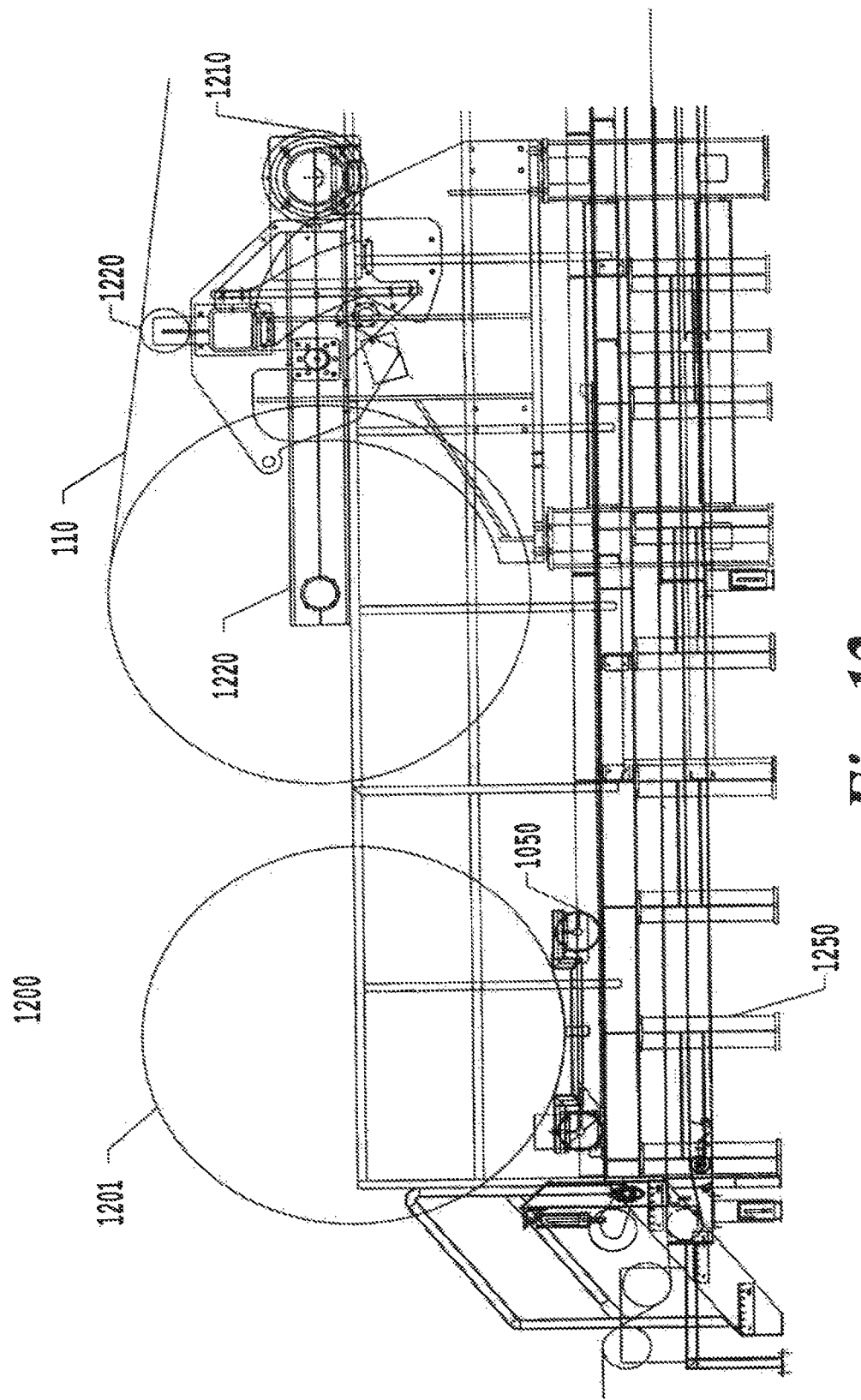

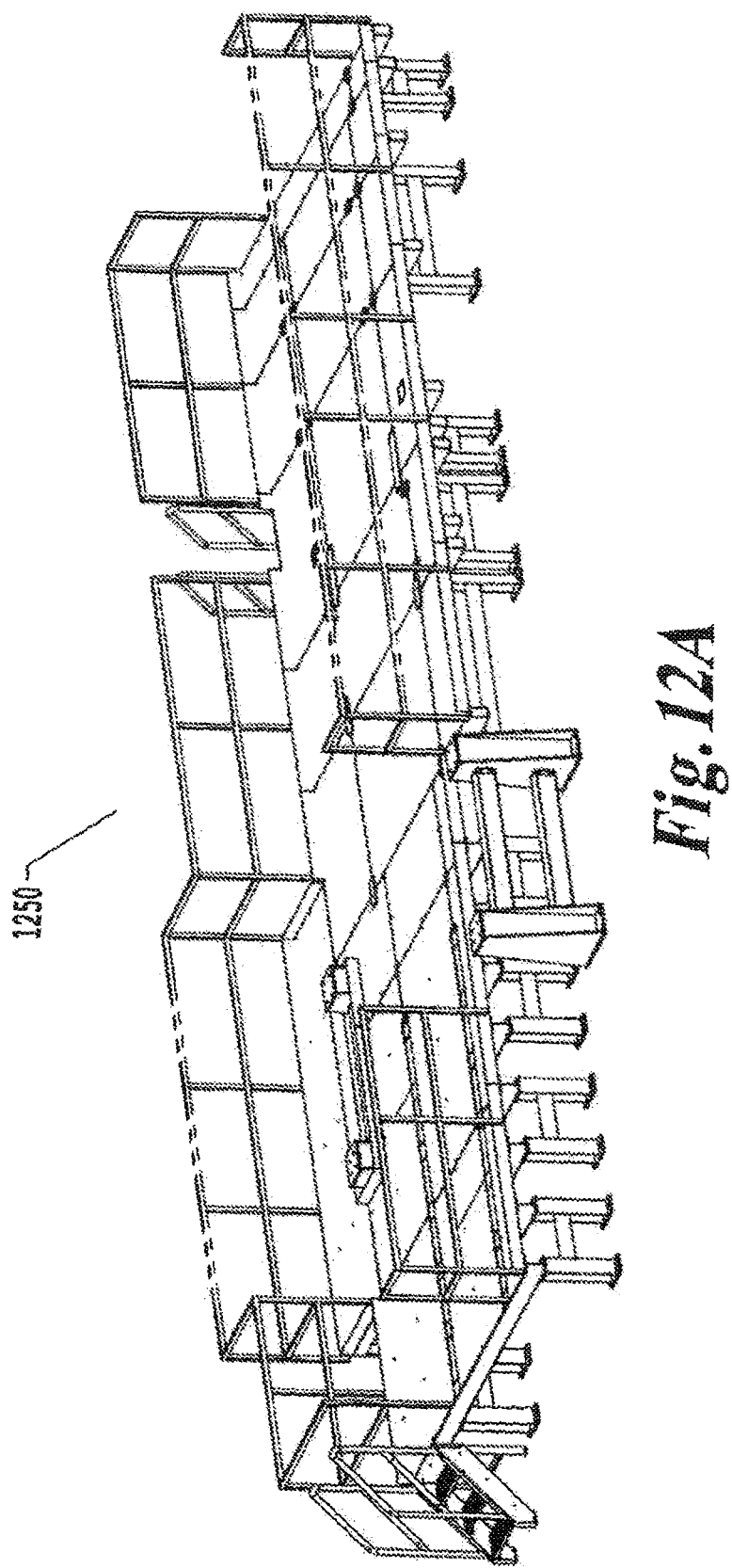

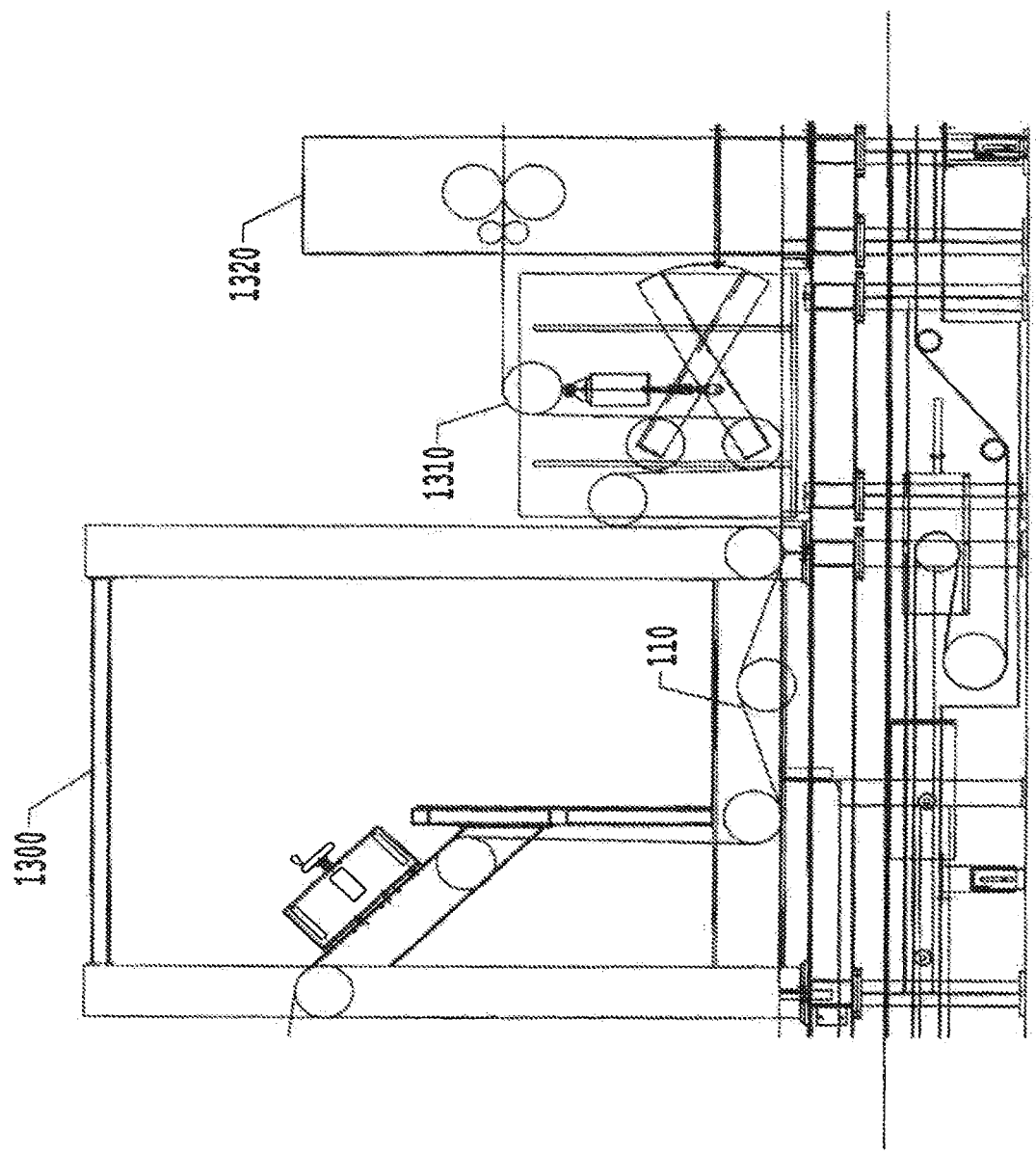

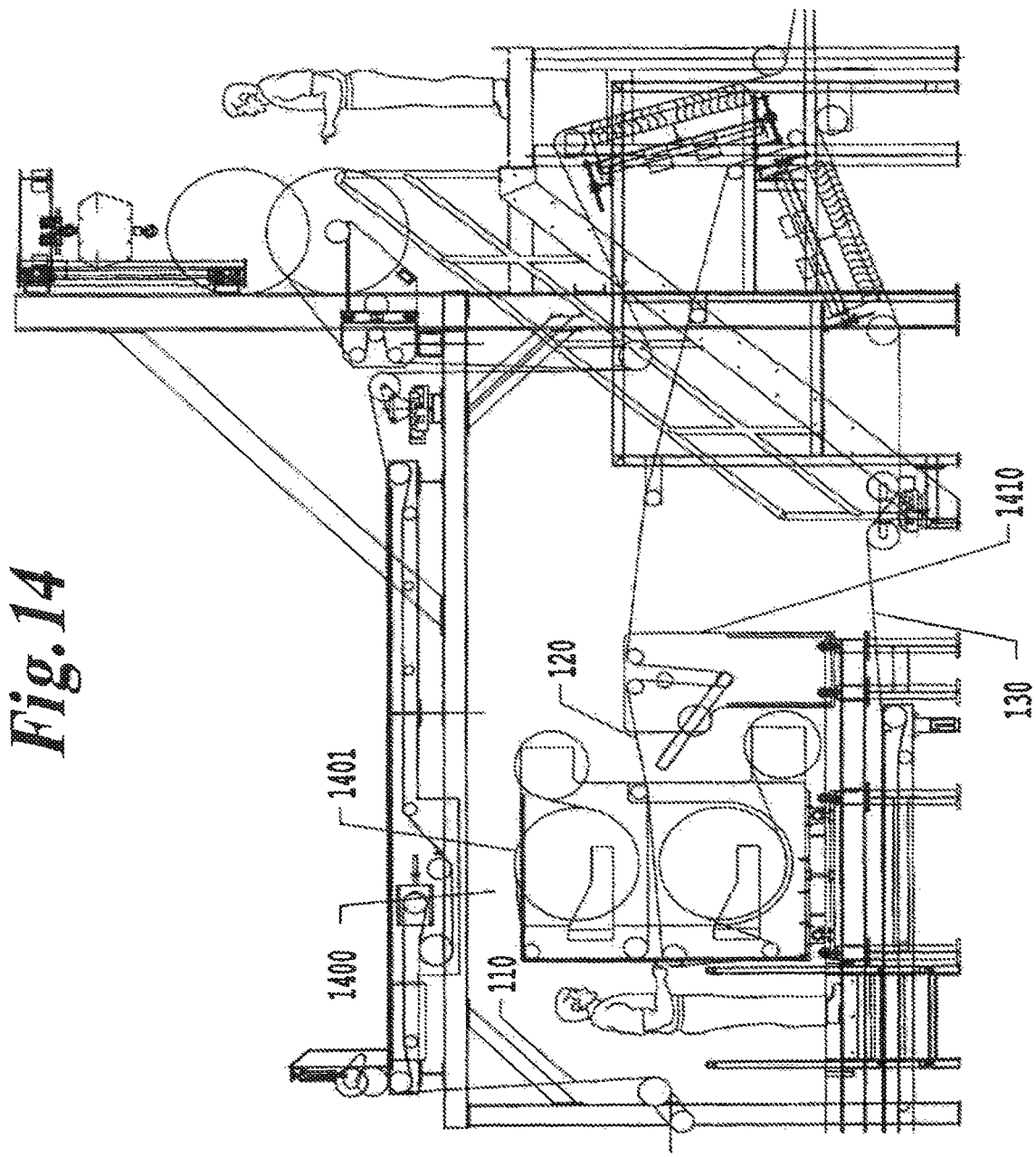

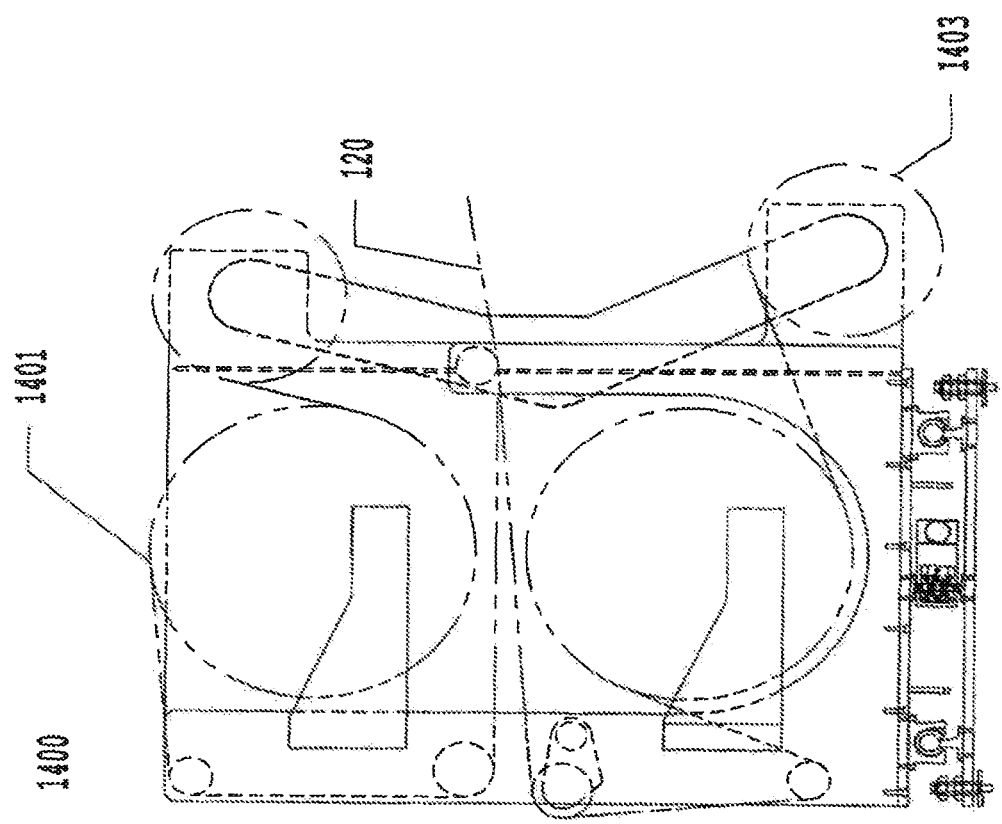

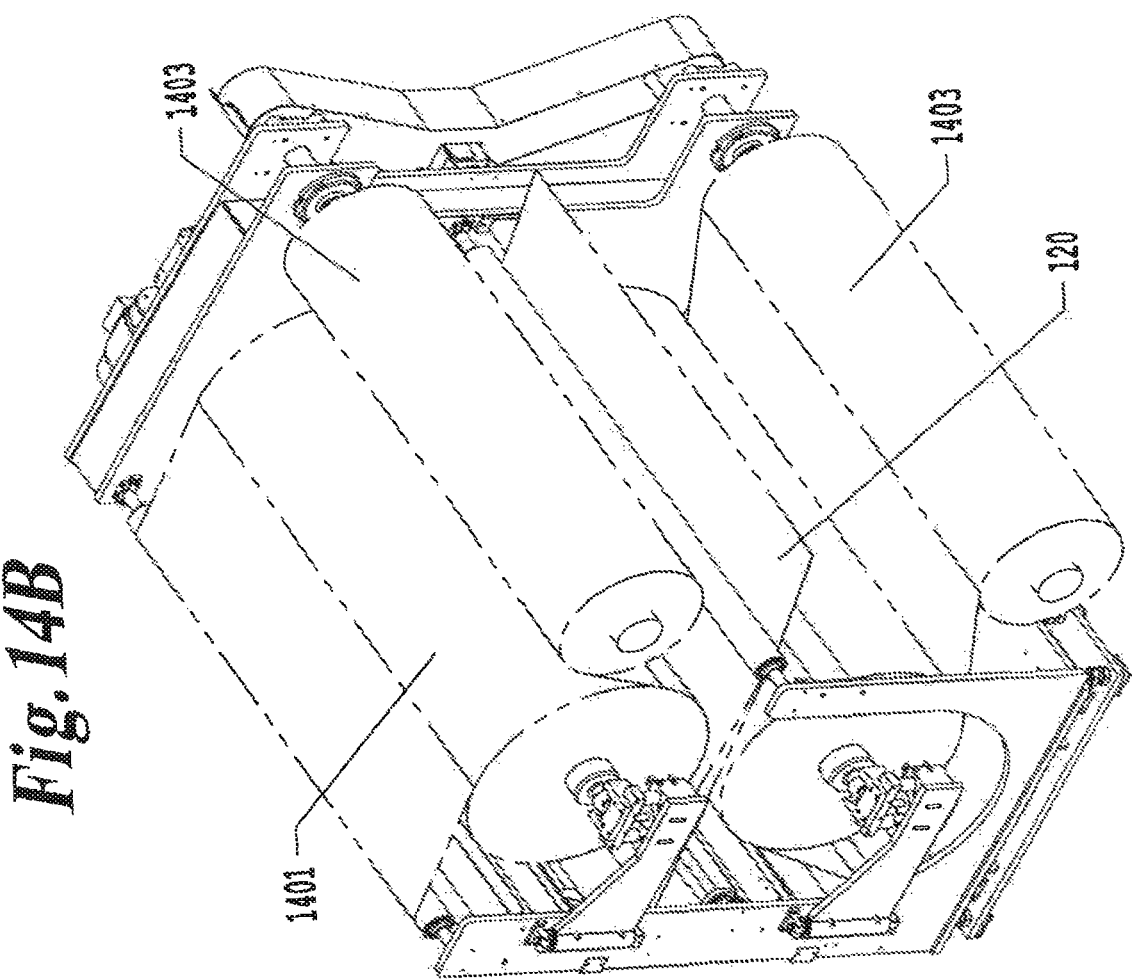

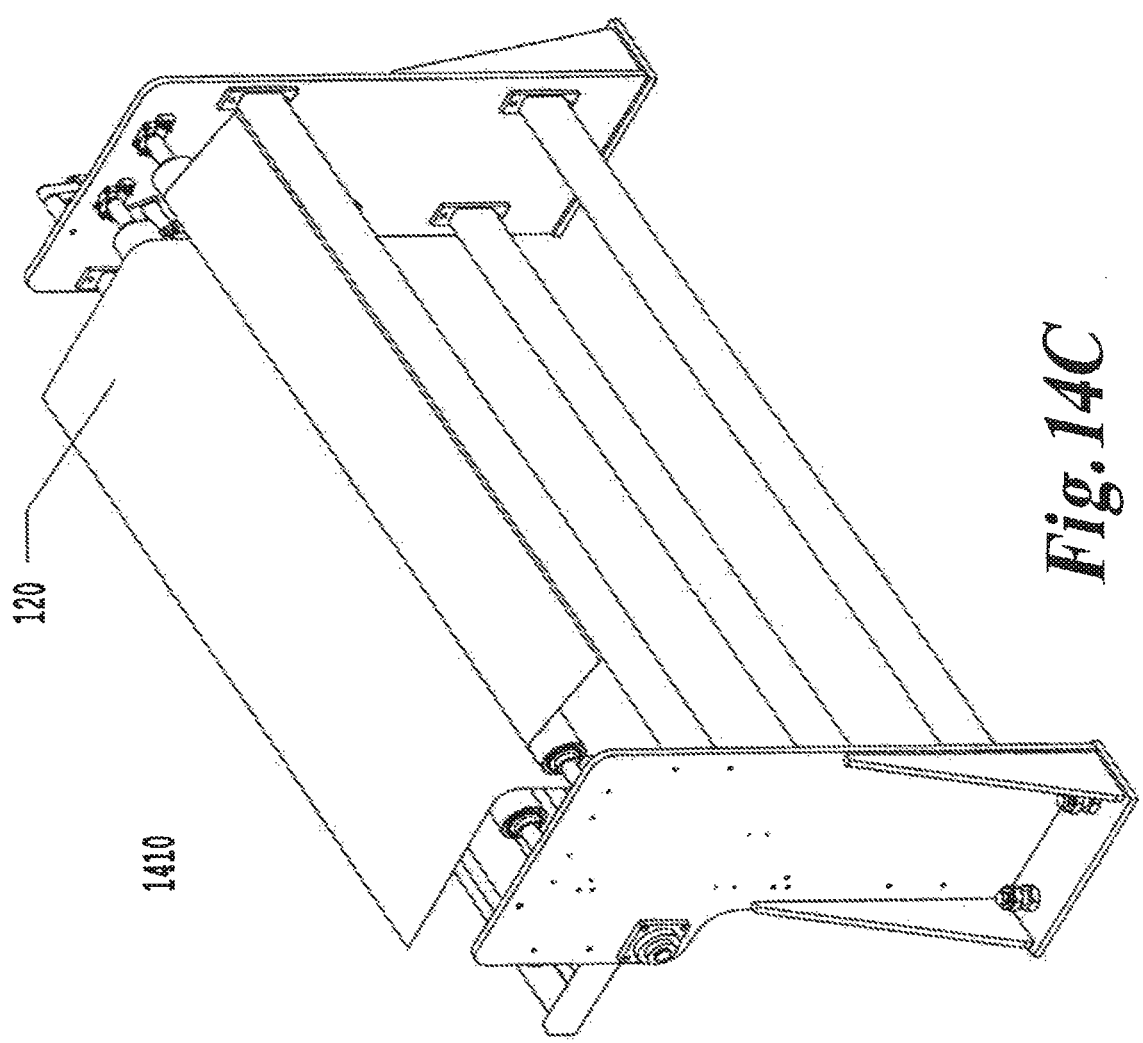

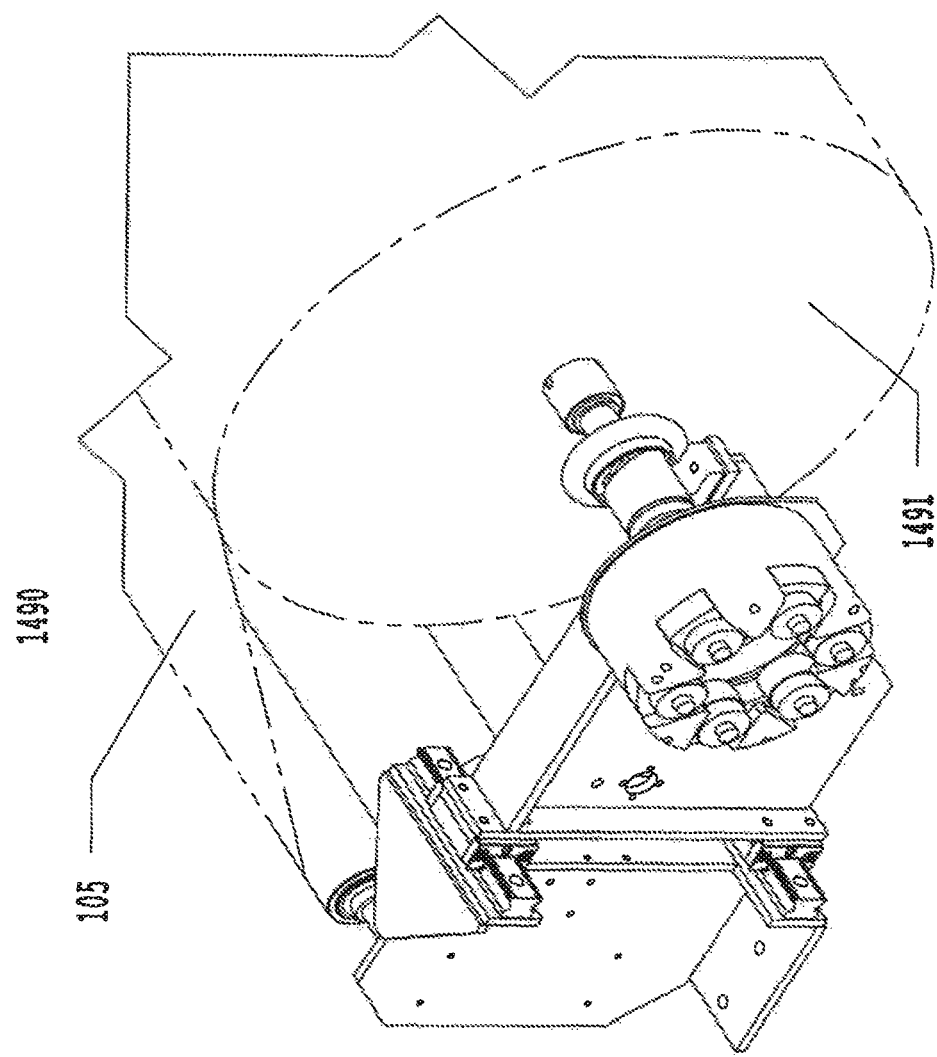

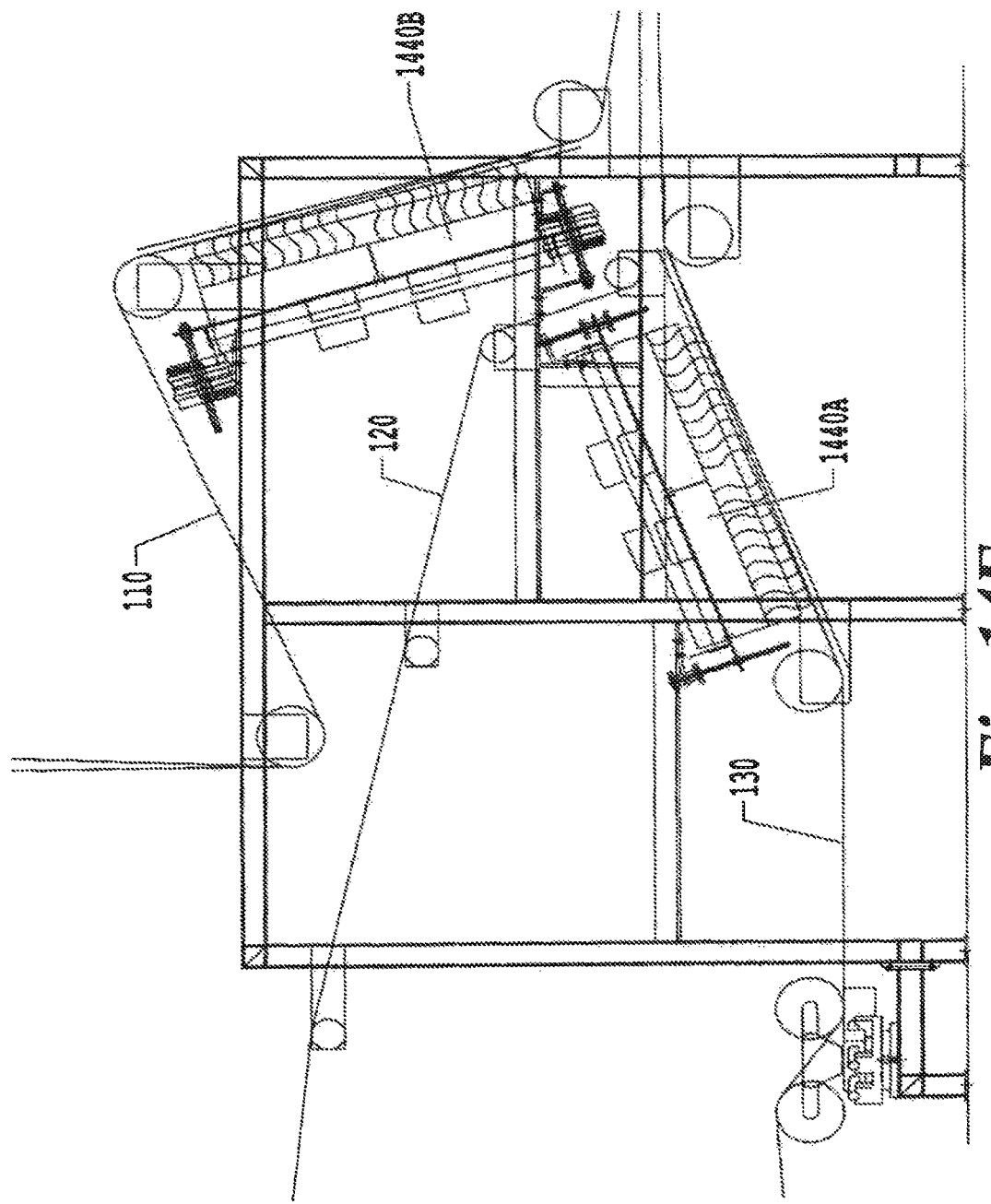

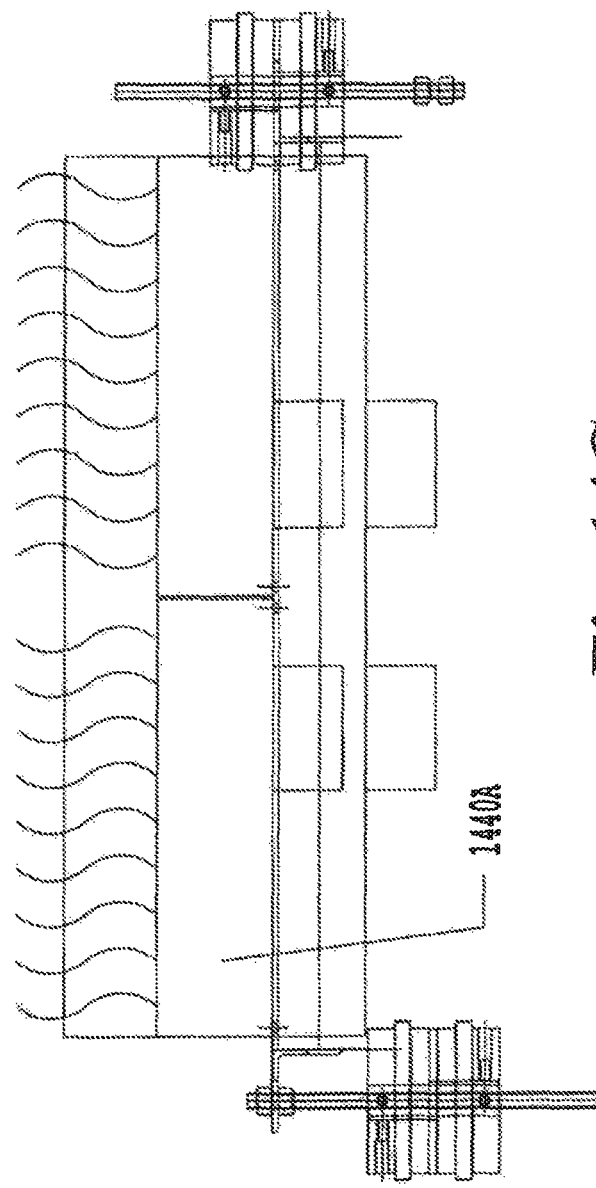

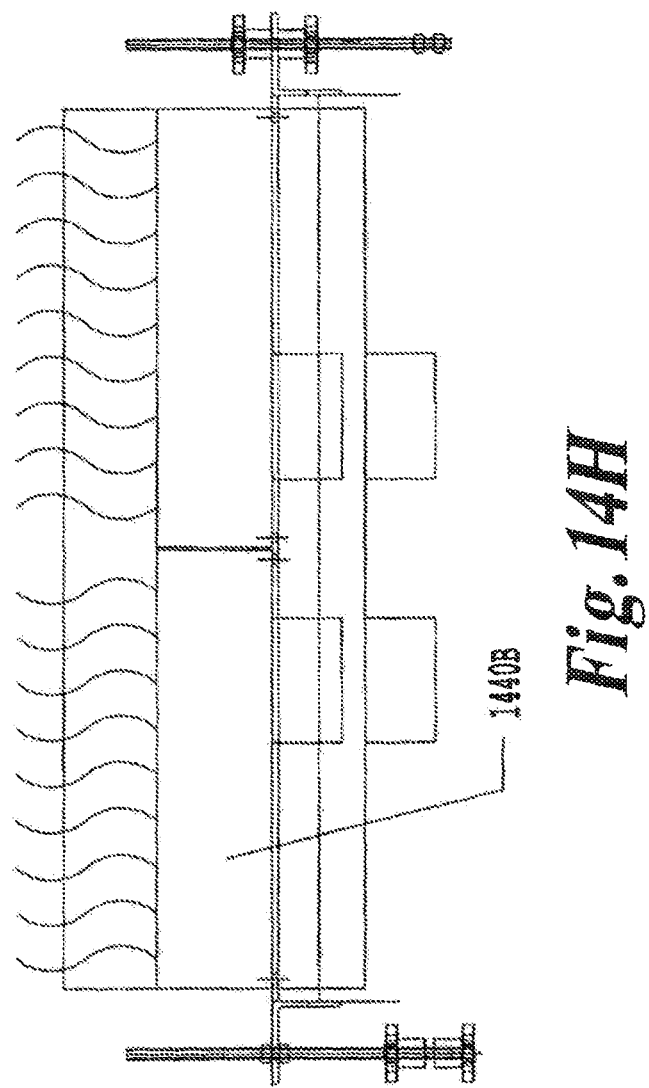

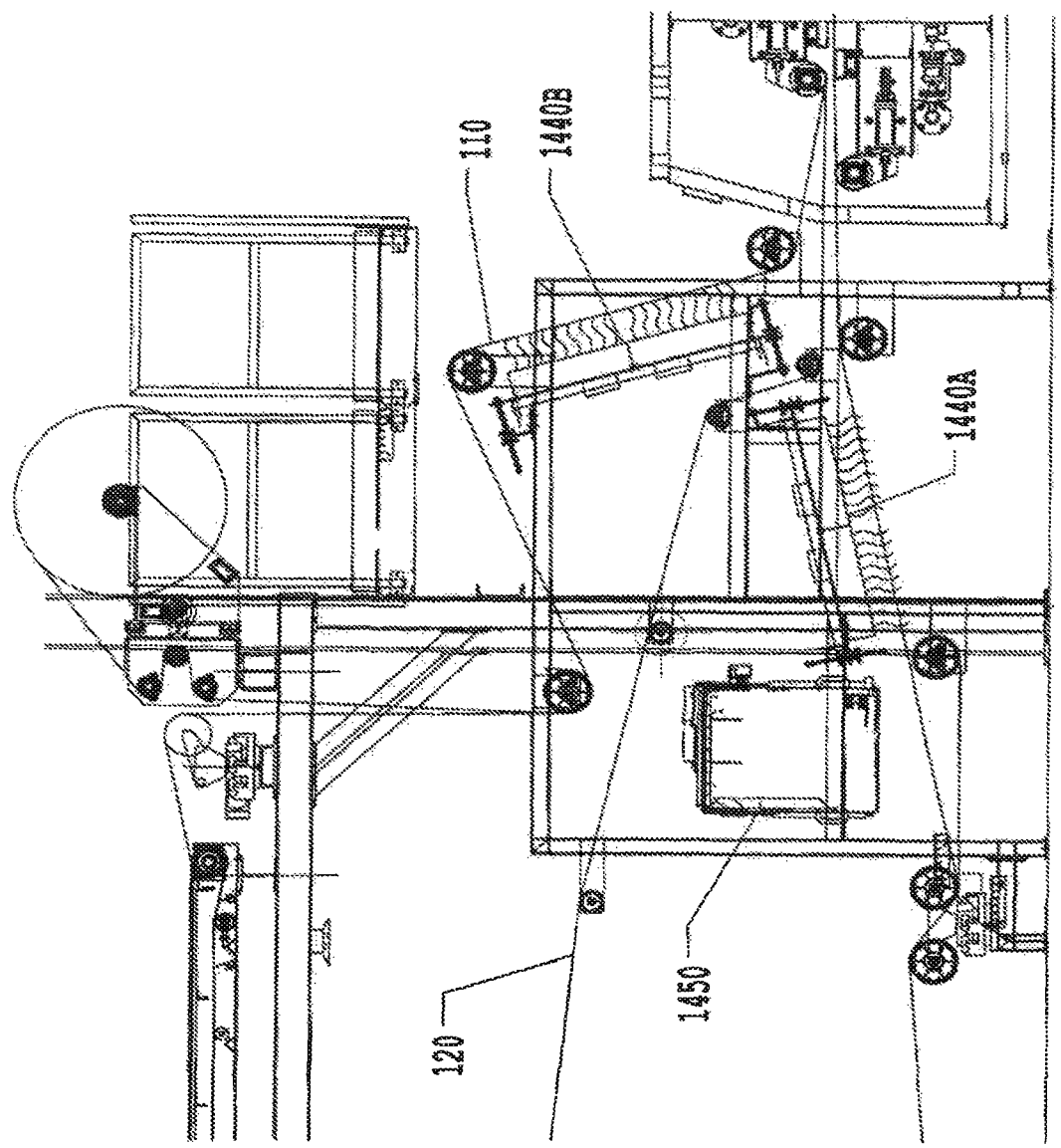

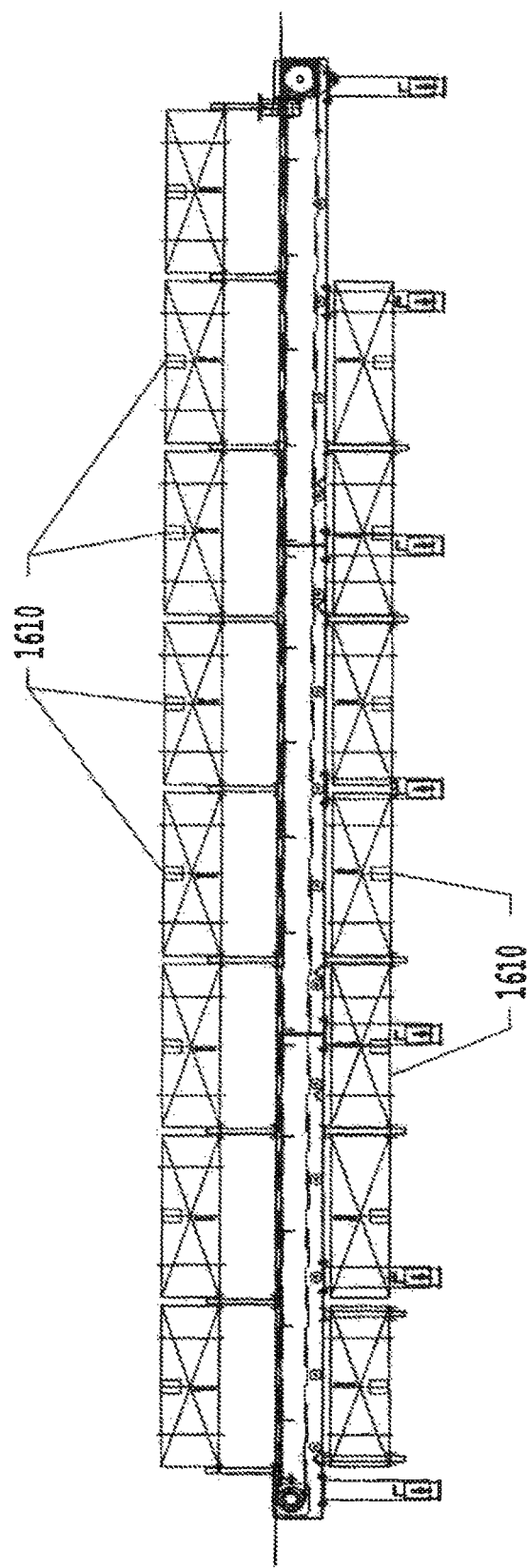

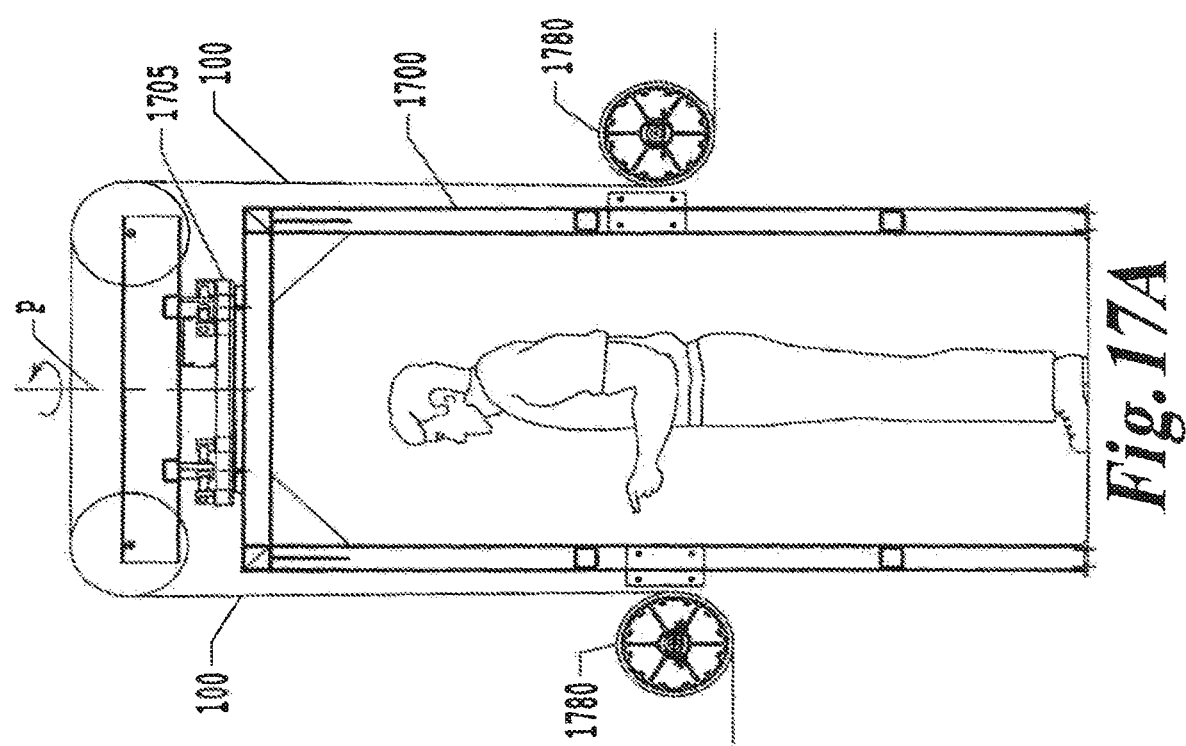

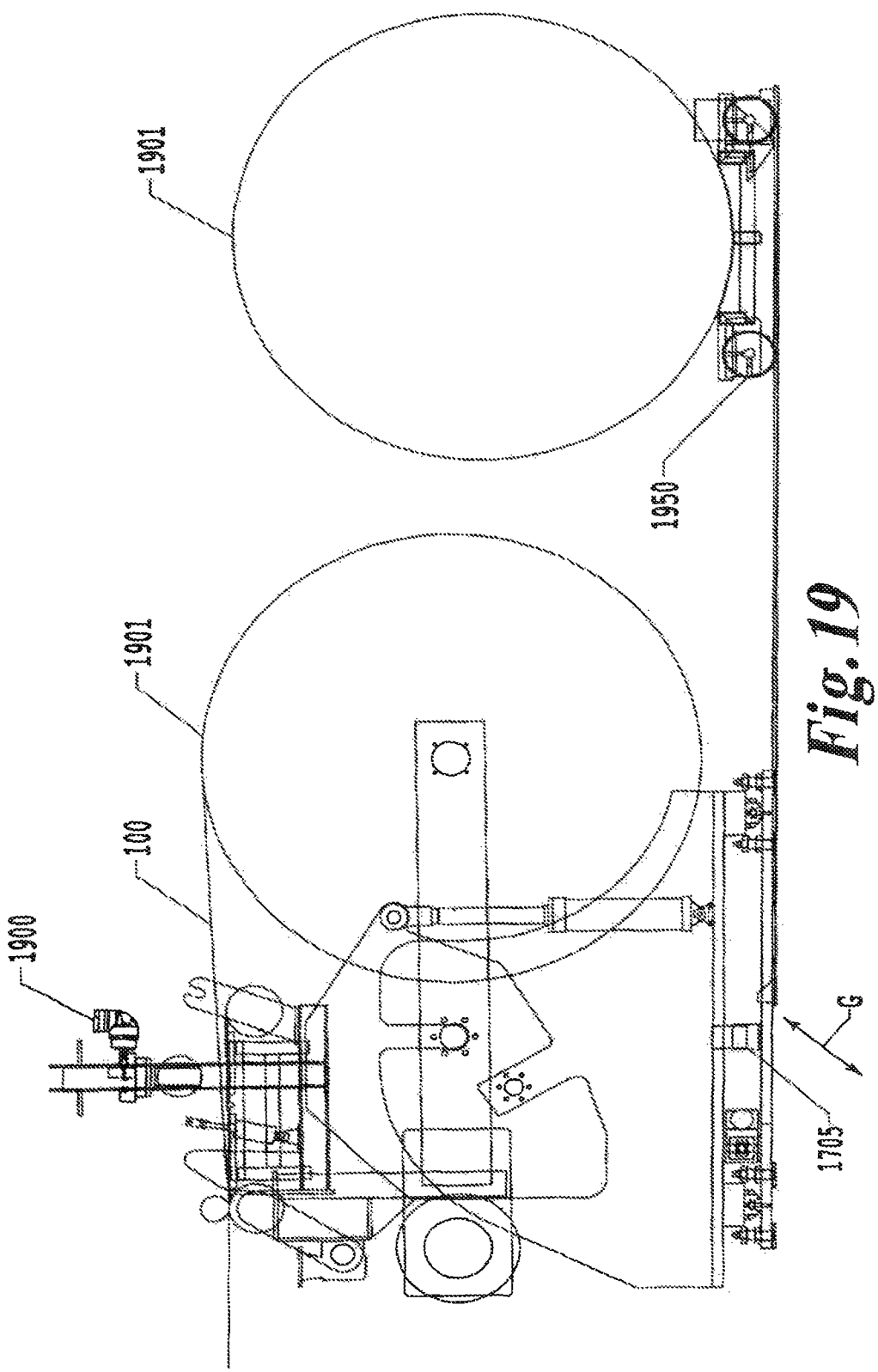

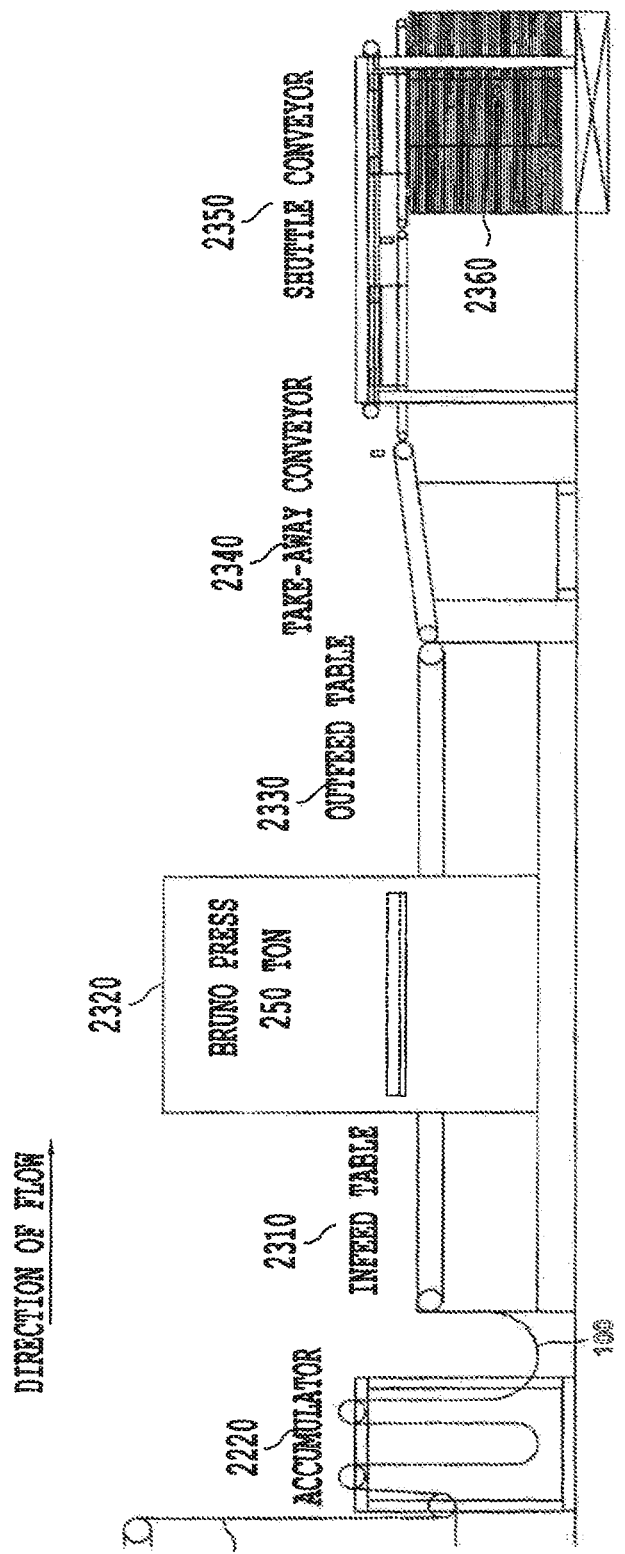

RECYCLED RUBBER BACKED CUSHIONED VINYL

CROSS-REFERENCE TO RELATED APPLICATIONS

The present application is a continuation-in-part application of U.S. application Ser. No. 13/835,895 (U.S. Pat. No. 9,340,970), filed Mar. 15, 2013, which is a continuation-in-part of U.S. application Ser. No. 13/194,515, filed Jul. 29, 2011, now issued as U.S. Pat. No. 9,096,045, which is a continuation-in-part of U.S. application Ser. No. 12/756,954, filed Apr. 8, 2010, now issued as U.S. Pat. No. 8,728,260, and claims priority to U.S. Provisional Application No. 61/301,468 filed Feb. 4, 2010, each of which are hereby incorporated by reference in their entireties as if fully set forth herein.

BACKGROUND

Field

One embodiment of the invention relates to various types of recyclable surface coverings. For example, the recyclable surface coverings include granulated rubber bottom (base) layers in combination with surface layers bonded to the granulated bottom layers. Another aspect of the invention relates to a system, such as a manufacturing line, that produces the above-noted recyclable surface covering. Another aspect of the invention relates to a process for manufacturing the above-noted recyclable surface covering. In one specific exemplary embodiment, a vinyl surface material is bonded to a recycled rubber cushioned bottom (base) layer (a.k.a. underlayment). This type of laminate has a number of positive characteristics such as flame retardation, smoke suppression, noise reduction, force reduction, and the ability to stay in place upon installation without the use of adhesives.

Description of the Related Art

Recyclable floor coverings include carpet, matting, wood, and tile. Carpet and matting, for example, rubber matting, typically require substantial amounts of solvents and/or adhesives during production or installation. Conventional solvents and adhesives produce emissions, which can be harmful to the environment.

Additionally, disposal of conventional carpets and matting poses difficulties inasmuch as these materials can be difficult to recycle. For example, conventional carpets and mattings are often formed of dissimilar materials, and therefore, conventional recycling techniques, which may include liquidation of the materials to be recycled, are relatively ineffective.

For example, one type of floor covering provides a flocked layer of nylon fibers electrostatically flocked onto a polyvinylchloride (PVC) backing. In production of this material, a glass fiber layer is added between a PVC backing and a flocking to provide dimensional stability. The flocked floor covering is screen printed to provide a wide range of patterns and colors. However, PVC is generally not considered to be easily recyclable. Furthermore, heating PVC, for example, in a liquidation process, produces hazardous fumes. Additionally, the need to add a glass fiber increases manufacturing complexity and cost. Furthermore, the glass fiber material itself may be difficult to recycle.

An alternative form of surface covering provides a flocked layer adhered to a substrate via an adhesive. However, as discussed above, adhesives, and any solvents associated with such adhesives, contribute to pollution in the environment surrounding the production and possibly the installation process. Additionally, the use of liquid adhesives during the production process poses difficulties in providing a uniform layer of adhesive. This lack of uniformity creates difficulties in adding a flocked layer to the backing material. Therefore, providing an attractive, preprinted flocking layer to a backing material covered in a liquid adhesive has typically been difficult.

Surface coverings in the form of floor tiles are known. Conventional floor tiles are stiff and relatively inflexible. Bending a conventional floor tile through a bend radius equal to its thickness results in substantial damage to the tile. For example, the tile may suffer creasing or cracking resulting in cosmetic or structural damage that renders the tile unfit for use.

Conventional floor tiles are further disadvantaged by cosmetic weaknesses. When used to form a floor covering conventional surface covering tiles tend to slip when in contact with one another. The edge of a first tile thus slides against the edge of a second neighboring tile during installation. The resulting slippage between tiles is later evident as a seam that is visible by the naked and untrained eye.

Heterogeneous and homogeneous sheet vinyl and vinyl tile constitute a significant percentage of the commercial resilient flooring market. Heterogeneous vinyl comprises multiple layers which allows for greater control of the look and feel of the finished product. Homogeneous vinyl comprises a single layer of material. A typical vinyl sheet flooring is produced in a gauge of 2-4 mm thick and consists of PVC formed in 6' wide rolls or tiles. The flooring may have a urethane or other durable wear layer because the nature of PVC is that the material is soft and prone to damage.

The market for vinyl flooring has been negatively affected by perceptions that vinyl is environmentally hazardous and difficult to recycle. But commercially, vinyl is still used extensively in healthcare and education environments, principally because of its relatively low cost, ease of installation, inflammability, and maintenance. Vinyl flooring sheet goods have installation seams that can be heat welded to eliminate fluid penetration risk which is vital in clean room and healthcare environments. Vinyl flooring is typically adhered (for example, via an adhesive) directly over a concrete or wooden sub-base. In this type of installation, the resulting flooring is very hard and provides no cushioning.

It is becoming more typical for all commercial facilities, and in particular, healthcare environments to be evaluated by users and providers for comfort, noise, and safety. The risk of patient injury due to falls that can result in extended bed stay for patients is a critical issue to the healthcare community as it is the number one cause of patient injury. Falls cause over 90,000 hospital injuries per year, adding an average of 15 days to in-patient treatment and resulting in additional cost to the healthcare system of over $10 billion annually. The risk of injury due to falls demands that hospitals and healthcare providers provide additional staff to assist with patient mobility. Also, noise within patient environments is being considered as a major component to the overall quality of the environment. Ambient noise is ever present, but the residual noise generated by the impact of foot traffic or the relocation of equipment on what are typically vinyl or other hard surfaces negatively impacts the noise environment and consequently patient recovery.

Accordingly, a desire exists for a recyclable floor covering that is relatively free of solvents during its production process and which provides a uniform bonding layer between an upper layer, for example a flocking layer, and a lower layer, for example a backing material. Further, a desire exists for a recyclable floor covering that exhibits excellent flame retardation and smoke suppression qualities, and that attenuates impact noise, absorbs impact force, and is easy to install and/or maintain.

SUMMARY OF THE INVENTION

One aspect of the invention provides a floor tile which accommodates contoured substrates and is capable of interlocking with other floor tiles to provide an essentially seamless floor covering. The floor tile may be used to provide decorative and functional transitions such as coved transitions between vertical and horizontal surfaces. The flooring tiles may continue in an interlocking manner vertically and/or non-horizontally to cover walls and other transition shapes between floor substrates and other features of semi-enclosed spaces.

Another aspect of the invention provides a floor surface covering system and/or assembly which may include a plurality of floor tiles. The floor tiles are capable of interlocking in at least two dimensions such that a bordered flooring substrate is completely covered with a continuous covering of interlocked floor tiles. The floor covering system may not be attached to the flooring substrate but may instead be attached to one or more walls defining the dimensions or limits of the floor substrate covered by the floor covering surface.

Another aspect of the invention provides a floor covering system that accommodates features such as ramps or steps such that the facing material of the floor tiles provides a substantially continuous covering of the floor substrate over any modulations in the horizontal or level characteristics of the floor substrate.

Another aspect of the invention includes a process for making a laminated surface covering. The process includes passing a first material across a first conveyor, passing a second material across a second conveyor, and passing a bonding material across a third conveyor. The process further includes contacting the first material and the second material to the bonding material, heating at least one of the first material and the second material, introducing the first material, the second material, and the bonding material into a pressure zone such that the bonding material is introduced between a bottom surface of the first material and a top surface of the second material, and applying pressure to bond the first material and second material together via the bonding material to produce a laminated material.

Another aspect of the invention provides a process for making a laminated surface covering, wherein the process includes passing a first material across a first conveyor, passing a second material across a second conveyor, passing a bonding material across a third conveyor, and contacting the second material to the bonding material. The process further includes heating at least one of i) the second material and bonding material after contacting the second material to the bonding material, or ii) the first material, and contacting the first material to the bonding material after the second material and bonded material are contacted to each other and after the heating. The process further includes introducing the first material, the second material, and the bonding material into a pressure zone such that the bonding material is introduced between a bottom surface of the first material and a top surface of the second material. The process further includes applying pressure to bond the first material and second material together via the bonding material to produce a laminated material.

In another aspect the process for making a laminated surface includes one or more steps of making a pre-laminated material or layer. One or more steps of pre-lamination may include adding one or more layers of pre-lamination material onto either the first material or the second material. The resulting pre-laminated material may represent, for example, the base layer having a pre-lamination layer comprising or consisting of an adhesive. The pre-lamination layer now comprising the base layer and an adhesive layer may then be pressed or heated with the facing or surface material to thereby form a laminated surface covering. The pre-lamination layer is added to one or more of the base or surface layers using a system of conveyors and rollers such as that described above. The pre-lamination layer may be attached to the surface layer, the base layer or a reinforcing layer electrostatically, by pressure or by heating the layers together with or without the application of heat.

Another aspect of the invention provides a surface covering including a first layer including a rubber material and a second layer including a flocked material. A heat-activated bonding layer is disposed between the first layer and second layer and bonds the first layer to the second layer.

Another aspect of the invention provides a recyclable surface covering including a first material adhered to another material and a second material including recycled rubber comprising rubber granules inter-bonded to each other via a chemical bonding agent.

Another aspect of the invention provides a process for making surface covering on a continuous laminator line. The process includes introducing a roll of backing material into a backing unwind station including a conveyor, introducing a roll of facing material into a facing unwind station including a conveyor, and introducing a roll of bonding material into a bonding material unwind station including a conveyor. The process further includes conveying backing material from the roll of backing material to a first heat source, conveying facing material from the roll of facing material to a second heat source, and heating a first surface of the backing material with the first heat source. The process further includes heating a second surface of the facing material with the second heat source, conveying the adhesive from the adhesive unwind station between the heated first surface of the backing material and the heated bottom surface of the facing material, and pressing the face material, the adhesive, and the backing material together to form a composite product. The process further includes conveying the composite product into a laminator and laminating the pressed together product to form a laminated flooring material. The process also includes conveying the laminated flooring material from the laminator into and through a cooling station and conveying the flooring material from the cooling station to an edge trim station. The process also includes trimming the edges of the flooring material in the edge trim station and conveying the trimmed flooring material from the edging station to a rewind station. Optionally, or alternatively, the process includes die cutting the flooring material before or after trimming. In one example, the die cutting is performed continuously, for example, by a continuous die cutter. The process further includes winding the flooring material on a spool and removing filled spools of flooring material from the continuous laminator line.

Another aspect of the invention provides a computer readable medium on which medium is source code. When the code is executed on a computer, the code causes the computer to control a system to perform any of the processes described above.

Another aspect of the invention provides a material bonding system including a first conveyor configured to convey a first material in a direction of conveyance and a second conveyor configured to convey a second material. This aspect includes a heating system configured to apply heat to at least one of the first or second materials and a combination zone configured to receive the first material and the second material from the first and second conveyors and configured to press the first material and second material toward each other.

A further aspect of the invention provides surface covering including a first layer that defines a first outer surface of the surface covering and a second layer including rubber granules inter-bonded by a chemical bonding agent, the second layer defining a second outer surface of the surface covering. This aspect includes a heat activated bonding layer disposed between the first layer and the second layer and bonding the first layer to the second layer.

In one implementation of the invention, a laminated surface covering including a facing material made of vinyl and a backing material comprises a rubber component. A bonding material is disposed between the facing material and the backing material. And the facing material is configured to typically melt at a temperature between 165° F. and 248° F. infiltrating the backing material. The backing material comprises a matrix of rubber granules bonded together. The melted vinyl facing material essentially encases the constituent rubber granules making up the matrix of rubber granules, and thus the backing material, inside and out. The melted vinyl, whether or not it completely encases each and every rubber granule or the rubber backing matrix, creates a barrier to rubber backing combustion. That is the melted vinyl's natural flame suppression properties, in addition to any added flame retardant material to the vinyl, ensure that the constituent rubber of the backing material is less likely to ignite.

In one implementation of the invention, the laminated surface covering has a sufficient mass and thus a sufficient weight (which is essentially the mass/weight of the backing material) and sufficient dimensional stability, such that it maintains its original dimension even under intended use, to allow the covering to be installed without adhesive. Put another way, once placed on a surface, the laminated surface covering does not move/migrate, eliminating the need to permanently affix the laminated surface covering with, for example, an adhesive. The backing material also attenuates the frequency of laminated surface covering sounds when the covering is impacted. The backing material of the laminated surface covering improves impact absorption resulting in improved force reduction characteristics.

In one implementation of the invention, another aspect of the invention provides a laminated surface covering for providing flame retardation and smoke suppression including a facing material, a backing material comprising a rubber component, and a bonding material disposed between the facing material and the backing material.

BRIEF DESCRIPTION OF THE DRAWINGS

These and other advantages of the invention, in its various aspects, will become more apparent and more readily appreciated from the following detailed description of the exemplary embodiments of the invention taken in conjunction with the accompanying drawings where:

FIG. 8 is a schematic representing an assembly line used to perform a process set forth in FIG. 7;

FIG. 9A is a partial side view of a system used to produce the products produced in FIGS. 1-6;

FIG. 11A is a detailed view of the splicing station depicted in FIG. 11;

FIG. 11B depicts a dancer (tension adjustment system) from FIG. 11, in detail view;

FIG. 12 depicts a facing unwind station;

FIG. 12A is an isometric view of a platform partially depicted in FIGS. 12-14;

FIG. 13 depicts a splice station used in conjunction with the facing unwind station depicted in FIG. 12 along with an optional cleaning station and a dancer;

FIG. 14 depicts an overhead path along which the facing travels, a bonding layer unwind station, a dancer used in conjunction with the bonding layer unwind station, an auxiliary unwind station, and heaters;

FIG. 14A is a side view of the bonding layer unwind station;

FIG. 14B is an isometric view of the bonding layer unwind station;

FIG. 14C depicts a dancer used in conjunction with the bonding layer unwind station;

FIG. 14E is a partial isometric view of the auxiliary unwind station depicted in FIG. 14E;

FIG. 14F is a detailed view of the heaters depicted in FIG. 14;

FIG. 14G is an end view of the upper heater depicted in FIG. 14;

FIG. 14H is an end view of the lower heater depicted in FIG. 14;

FIG. 14I is a view of an embodiment of the heaters depicted in FIG. 14, but with a powder scattering unit installed for dispensing a powdered bonding material;

FIG. 16A is a side view of the laminator depicted in FIG. 16;

FIG. 17A is a side view of the inspection station depicted in FIG. 17;

FIG. 19 depicts a rewind station disposed downstream of the accumulator depicted in FIG. 18;

FIG. 21A is a detail view of an edge of the puzzle-cut pattern including a chamfer;

FIG. 23 depicts the second part of the optional/alternative continuous die cutting pathway shown in FIG. 22.

DETAILED DESCRIPTION OF THE PREFERRED EMBODIMENTS

Figure 1:
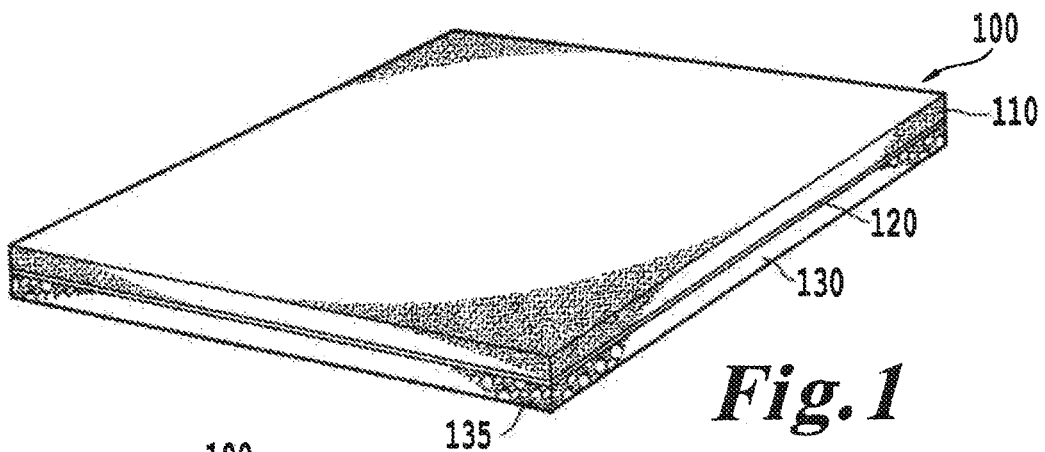
FIG. 1 is an isometric view of a first example of a product produced according to one aspect of the invention.

Referring now to the drawings, wherein like reference numerals designate identical or corresponding parts throughout the several views.

With reference to FIG. 1, one example of a surface covering according to the present invention is depicted in isometric view. The product 100 includes a layer of facing material 110 directly bonded to a layer of backing material 130 via a layer of bonding material 120. In other words, the bonding material 120 is sandwiched between the facing material 110 and the backing material 130.

In the depicted embodiment, the facing material 110 is a rubber material such as EPDM (ethylene propylenediene Monomer (M-class) rubber). However, other facing materials may be used. The bonding material 120 is a heat-activated bonding material, i.e., one that is typically in solid form at room temperature 21° C. (70° F.) and becomes much less viscous at higher temperatures, typically about 48° C. (118° F.) and above. In one example, the bonding material becomes partially liquefied between about 48° C. and 180° C. The term "about" in this document means plus or minus ten percent, when dealing with numerical values. The bonding material 120 is sandwiched between the facing material 110 and the backing material 130 in a process described later. One benefit of using a bonding material that is in solid or semi-solid form at room temperature such as the bonding material 120 is that the facing material 110 may be bonded to the backing material 130 with relatively little solvent in comparison with conventional bonding techniques used for conventional flooring materials. In one example, the bonding material 120 is mostly or entirely free of hydrocarbon solvents. In another example, the bonding material 120 is mostly or entirely free of all solvents, including organic and inorganic solvents. Additionally, the bonding material 120 can be disposed between the facing material 110 and the backing material 130 in a relatively uniform layer. In other words, lumps, bubbles, runs, or other irregularities that may be present when applying a typical liquid-based adhesive to a backing material can be reduced or avoided. The above-noted increase in uniformity of the bonding layer can provide an improved appearance to the finished product inasmuch as the facing material 110 may include a decorative pattern, and runs, bubbles, or lumps disposed in a bonding material located beneath the facing material 110 may detract from the appearance of the facing material 110.

In other embodiments the facing material and/or surface material comprises one or more of rubber, foam, PVC, nylon, polyester, recycled rubber, recycled denim, laminations film, scrim. The facing material and/or surface material may include material in one or more forms of the group of tufted materials, knitted materials, woven materials, non-woven materials, and recycled materials. In preferable embodiments the surface material consists of polyolefin such as polyethylene and/or polypropylene. More preferably the surface material is 100% recycled polypropylene, preferably 100% recycled post-consumer polypropylene.

In at least one embodiment, the facing material is preferably fire retardant polyvinyl chloride (PVC), herein referred to simply as vinyl. PVC is based on a polymer that resists combustion. The vinyl surface covering is slow to ignite, exhibits slow flame spread, and naturally suppresses the flame when the source of the flame is removed. Such vinyl product melts at a wide range of temperatures based on the purity of the vinyl (i.e., the amount of plasticizers, additives, etc.) and based on any urethane or other durable wear layers applied. In at least one embodiment, the makeup of the vinyl facing material melts between 165° F. and 210° F. (73° C. and 99° C.). In another embodiment, the makeup of the vinyl facing material melts between 165° F. and 248° F. (73° C. and 120° C.). In another embodiment the makeup of the vinyl facing material melts between 210° F. and 248° F. (99° C. and 120° C.).

The backing material 130 is typically formed of a granulated rubber material. In other words, the granulated material is interbonded with itself via a process as described in application Ser. Nos. 11/336,116 and 11/468,741, the entire contents of each of which is incorporated by reference herein in their entirety. The backing material 130 may further be material as described in Downey, application Ser. No. 09/931,320, now U.S. Pat. No. 6,920,723, the entire contents of which are herein incorporated by reference in their entirety.

The backing material may comprise one or more materials including rubber, foam, SBR, EPDM, nitrile rubber, neoprene, PVC, urethane, polyurethane, latex, cork, rubber/cork, cellulose, leather, cotton, EVA and recycled material. The backing material may include material in one or more forms of the group of tufted materials, knitted materials, woven materials, non-woven materials, and recycled materials.

The backing material 130 may be produced from granulated rubber material such as recycled rubber material from discarded automobile tires, for example. Additionally, the backing material 130 may be formed, entirely, or partially, from material produced by recycling discarded floor coverings, for example, floor coverings using the same type of backing material as the backing material 130. Thus, the costs and environmental impact of producing the backing material 130 may be less than conventional backing materials inasmuch as the backing material 130 may be produced by recycling other products (such as tires, floor matting, shoe soles or carpet) or incorporating used backing material that is identical or similar to the backing material 130 in composition. In one example, the product 100 is itself ground into particles and inter-bonded by heat fusion or a chemical bonding agent to form a new layer of backing material 130. Depending on the content of the products recycled to form the backing material 130, additional rubber materials such as raw rubber or substantially pure rubber may be added to form a mixture of recycled materials and raw materials. For example, the entire flooring material 100 may be ground to form granules. Then, depending on whether the granules formed by this process contain impurities or undesirable materials, granules formed from raw rubber material or from more pure recycled rubber may be added to create an appropriate mixture of recycled and raw materials. Pressure, a binder and/or heat may be added to the mixture to form a billet of rubber backing material with inter-bonded granules. The billet is typically cylindrical in shape and is cut, shaved, or shaped by rotating the billet while a blade is pressed against the billet to form a continuous sheet or layer of backing material 130. The backing material 130 is then rolled into a roll inasmuch as this material is typically thin and flexible enough to bend without breaking.

In one example, the backing material 130 includes 10% or more of granulated recycled rubber material from a flooring material such as the flooring material represented by reference numeral 100. In another example, the backing material 130 is substantially 100% recycled material from a flooring material such as the flooring material 100 depicted in FIG. 1, FIG. 3, or FIG. 5. In other words, the entire surface covering 100 may be turned into a backing material 130 for a following generation of surface covering 100. In at least one embodiment, the backing material 130 can be comprised of 100% recycled tire rubber. In another example, the backing material 130 comprises various alloys of recycled tire rubber and recycled rubber SBR or EPDM foams. The flash point of such a recycled rubber backing material is typically over 800° F. (427° C.).

The backing material 130 may be alternatively referred to as an underlayment.

In at least one embodiment, the recycled rubber backing material or underlayment 130 is preferably 2-10 mm in thickness. Further, in at least one embodiment, the shore A hardness of the backing material or underlayment 130 is 10-40. Shore durometer is a measure of the hardness of materials, wherein shore A is for softer plastics and wherein the scale ranges from 0-100 with the higher values representing harder material. Therefore, a shore A value of 10-40 is consider fairly soft. Additionally, the backing material 130 is comprised of recycled rubber granules bonded together, the bonding process introduces some amount of air voids within the matrix of rubber granules. In addition to reducing weight and increasing flexibility, these voids in the rubber backing matrix provide an unexpected benefit by allowing the backing matrix to be infiltrated by other materials. Because of these voids, the rubber backing material may be referred to as a backing matrix, instead of a solid backing material. As it turns out, the ability to infiltrate the backing material, and sufficiently encase the constituent components of the backing matrix (i.e., the rubber granule) produces unexpected benefits/results as described later herein. The back material or underlayment 130 may preferably comprise 90-95% recycled rubber. In conclusion, based on the shore A hardness of the backing material 130, according to at least one embodiment of the present disclosure, the underlayment can fairly be classified as "cushioned." In fact, for example, a laminate with just 2-6 mm of the recycled rubber backing material results in a force reduction of 17% improving the laminated product's impact absorption characteristics and ergonomics. These force reduction properties are evaluated by a standard test ASTM F2569 which is incorporated herein by reference for all purposes.

Figure 2:
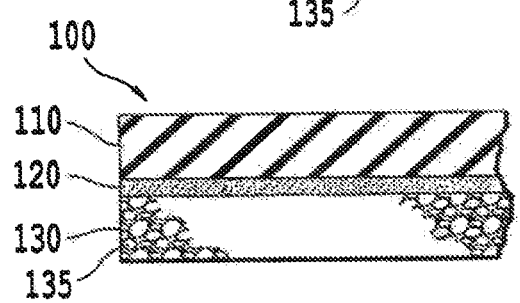
FIG. 2 is a side view of the product depicted in FIG. 1.

FIG. 2 describes a side view of the flooring material 100 depicted in FIG. 1. As shown in FIG. 2, the backing layer 130 typically includes granules 135 interbonded with each other to form the backing material 130. The granules 135 may be bonded to each other via partial melting with or without the addition of a binder material. In a preferred embodiment the granules are at least partially alloyed. Such alloying can occur, for example, when the granules are heated together and pressed and/or partially melted together such that the partially melted portions of the granules disperse into one another and or result in chemical or physically inter-bonding and/or interpenetration with on another.

The base layer material preferably comprises two different type of granules, for example a first granulated rubber and a second granulated rubber where such different granulated rubbers are preferably inter-bonded and/or alloyed with one another. The two types of rubber granules may different in their respective physical and chemical properties although the chemical composition may be substantially the same between two types of granules that differ substantially in physical properties. The rubber granules may differ in properties such as maximum dimension, aspect ratio, density, hardness, modulus of elasticity, number average molecular weight, weight average molecular weight, polydispersity, degree of cross-linking, glass transition temperature, melting point, degree of unsaturation and combinations thereof. The granules can differ in such properties by amount of 1%, 3%, 5%, 8%, 10%, 15%, 20%, 25%, 30%, 35%, 40%, 50%, 75%, 80%, 95%, 100%, 150%, 200%, and any multiples such as 1×, 2×, 3×, 4×, 5× of the figures given above. Preferably the melting and glass transition temperatures of the two types of granules are similar to one another such that alloying may be carried out at a temperature that is not greater than the melting temperature of either type of granule.

Because of the specific properties of the components of the base layer or backing material 130, the laminated surface covering is quite proficient at attenuating or absorbing sound. A typical frequency range for a hard surface flooring is 30-36 dB. In fact, in one embodiment, the addition of a laminated 2-10 mm piece of the backing material 130 the frequency range generated is lowered to Impact Insulation Class (IIC) 51 dB (see ASTM E2179 which is incorporated herein by reference for all purposes). This type of backing material 130 is described in greater detail in U.S. application Ser. No. 11/782,999, filed Jul. 25, 2007 (issued Nov. 23, 2010, as RE41,945), which is incorporated herein by reference for all purposes.

As is apparent from FIG. 2, the interbonded granules 135 can produce a relatively uneven surface. Accordingly, application of a liquid adhesive to such a surface creates difficulties in the application of a facing material to the backing material 130. This is so because the high portions and low portions of the granules 135, when coated with a liquid adhesive, tend to create high spots and low spots in the adhesive layer. Accordingly, the flooring material 100 depicted in FIGS. 1 and 2 is formed with a process using a bonding material that is typically in solid or semi-solid form at room temperature. Once the bonding material 120 is applied to either the backing material 130 or the facing material 110, heat activates the bonding material 120, and the facing material 110 and the backing material 130 are adhered to each other. The heat may be introduced to the bonding material 120 in the form of heat stored in at least one of the materials 110 and 130. The heat may be applied via a lamp, for example, an infrared lamp which will be discussed later. Alternatively, or additionally, the heat may be applied to the bonding material 120 via a heating apparatus after the facing material 110 sandwiches the bonding material 120 with the backing material 130.

Figure 3:
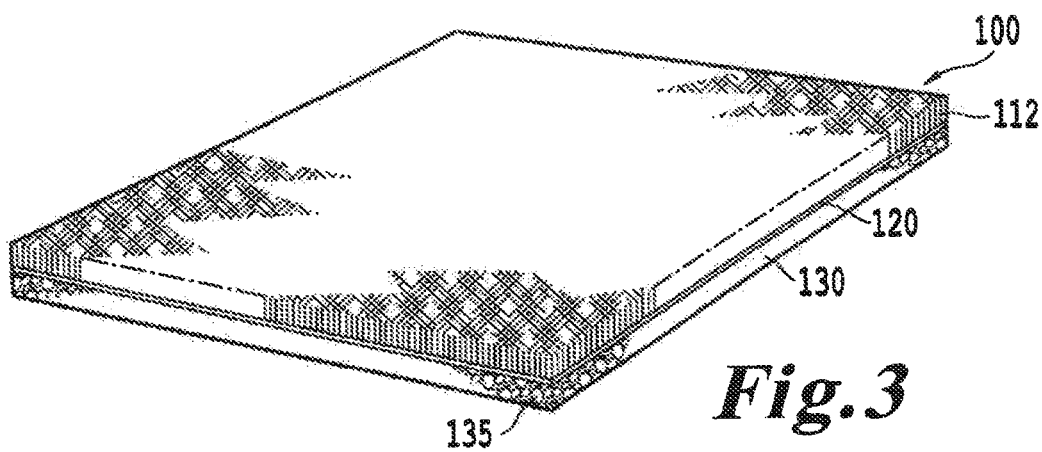
FIG. 3 is an isometric view of a second example of a product produced according to the invention.
Figure 4:
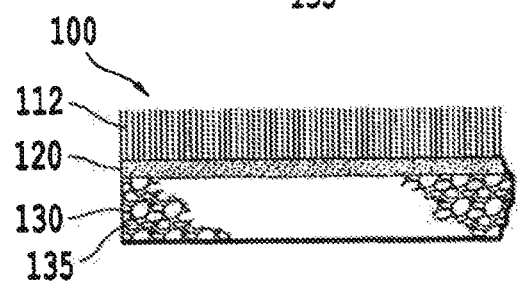
FIG. 4 is a side view of the product depicted in FIG. 3.

FIGS. 3 and 4 depict an enhanced facing material 112 disposed on the bonding material 120 rather than the rubber material 110 described in FIG. 1. The enhanced may include one or more of a flocked material, a tufted material, recycled fibers, a woven fabric, a non-woven fabric, wear-layers, cotton fibers, a monolithic layer, a punched material, an embossed material, a needlepoint and/or synthetic fibers. Similar processes to those described above and hereafter regarding bonding the facing material 110 to the backing material 130 are used to bond the enhanced facing material 112 to the backing material 130. Thus, the enhanced material can be used to produce a wide range of floor coverings or carpet.

Figure 5:
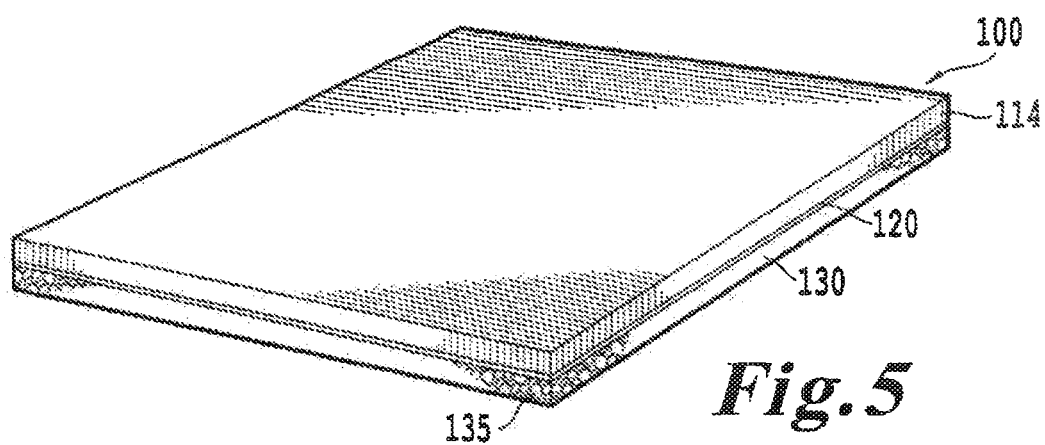
FIG. 5 is an isometric view of a third embodiment of a product produced according to the invention.
Figure 6:
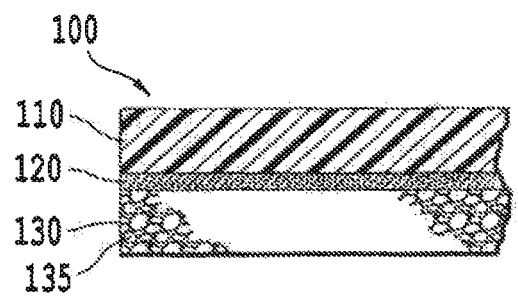
FIG. 6 is a side view of the product depicted in FIG. 5.

FIGS. 5 and 6 depict a wood-grain facing material 114 provided on the backing material 130 rather than a rubber facing material 110 or flocked facing material 112. In some cases, the wood-grain facing material 114 includes PVC. As discussed previously, certain recycling processes using PVC create harmful byproducts. However, as the recycling process that may be used in the formation of the backing layer 130 does not completely liquefy the materials used to form this layer, the backing material 130 may be recycled from surface covering 100 even if the surface covering 100 includes PVC, for example, in the wood-grain layer 114. In other words, the recycling process used to create the backing material 130 can accommodate materials of different chemical compositions and of different specific gravities. In one example, the backing material can include grains of PVC material interbonded to grains of another material of a different specific gravity, such as EPDM or another type of rubber. Accordingly, it is possible to recycle the surface covering 100 in its entirety into a new backing layer 130 if the finished product is to be a second generation of the surface covering 100.

The surface covering may be in the form of floor tiles forming a floor assembly that is optionally connected at points to the floor substrate. Such connection points may include separate and dispersed contact points at which the floor coating system (e.g., portions of individual floor tiles) are chemically and/or physically fixed to a floor substrate. Physical contact may be achieved using fasteners such as ordinary nails and/or other devices which penetrate or connect the surface covering to a floor substrate and thereby anchor at least a portion of the surface covering to the floor substrate. Chemical means of attachment including adhesives may also be used to temporarily or permanently adhere or fix portions of the floor covering to the floor substrate.

The floor tiles may be used as a surface covering on substrates other than floors. In embodiments of the invention the floor tiles are used as a covering for non-horizontal surfaces. Such surfaces may include partial or total covering of substantially vertical surfaces such as walls. Other surfaces that may be covered with the floor tiles include stairs and ramps, including both substantially vertically-oriented and horizontally oriented surfaces thereof.

The floor tile has desirable flexibility and elastic recovery. The floor tile may be bent or deformed for example subject to a bend radius equal to or less than its thickness or the thickness of the base layer without permanent cosmetic or structural damage. In preferable embodiments the floor tile can be subject to a bend radius of one half the thickness of the base layer with full recovery and without detectable structural or cosmetic changes.

In a preferred embodiment of the invention the floor covering system has no permanent or temporary direct attachment to any substantially horizontal section of a floor substrate. In this embodiment of the invention a substantially continuous floor covering may instead be anchored to one or more transitional portions, modulations, contours or edges of the area which is covered with the floor covering to thereby form a flooring assembly. For example, floor tiles may be arranged such that a portion of the floor tiles run into a vertical section of a wall defining the boundaries or barrier of the covered portion of the floor substrate. This substantially vertical section of the floor covering system is then anchored to a wall or other vertical member by fastening means such as nails, screws, or adhesives.

By avoiding a permanent and/or continuous fixing between the floor coating system and the floor substrate the floor covering system may be adjusted, for example, to remove portions defined by individual floor tiles for replacement due to excessive wear or soiling.

During installation of the floor covering assembly substantial savings are realized with respect to installation costs. In contrast to conventional floor covering systems such as carpeting which require skilled tradesmen for installation, the floor covering system, in embodiments, may be installed at substantially lower labor costs. The avoidance of adhesives to fix the floor covering system to the floor substrate is environmentally advantageous and does not suffer from undue odor generation or the release of substances such as solvents which may be toxic. As already noted above, floating the floor covering system over a floor substrate permits replacement and/or customization of floor coverings by replacement and/or rearrangement of existing floor tiles.

Other advantages may also be realized by floating the floor covering system on a floor substrate without permanent adhesion either chemically or physically to any horizontal portion of the floor substrate. Conventional flooring systems do not accommodate moist floor substrates and do not permit floor substrates to breathe. In aspects of the inventive floor covering system floor tiles may be installed over surfaces which are occasionally, usually or always moist. If necessary the floor tiles can be easily removed for cleaning of the floor substrate and/or to provide the floor substrate greater opportunity to degas or dry.

In an especially preferred embodiment of the invention the floor covering system covers a flooring substrate having modulations in height and/or level. Such modulations may be a feature of the flooring substrate surface caused, for example, by environmental and/or weathering changes to the flooring substrate (e.g., cracking of a concrete slab on which a home or other structure is erected).

In other embodiments the floor covering system accommodates features such as ramps or steps such that the facing material of the floor tiles provides a substantially continuous covering of the floor substrate over any modulations in the horizontal or level characteristics of the floor substrate. Contoured floor substrates can likewise be accommodated by the floor covering system of the invention. For example, floor substrates which are contoured at the edges to provide a coped transition from horizontal to vertical substrates can be covered with interlocking tiles to provide an essentially continuous floor covering over both horizontal portions of the flooring substrate and those portions of the floor substrate representing transitions such as coping portions between horizontal and vertical surfaces. In still other embodiments of the invention the flooring tiles may continue in an interlocking manner vertically and/or non-horizontally to cover walls and other transition shapes between floor substrates and other features of semi-enclosed spaces.

Figure 7A:
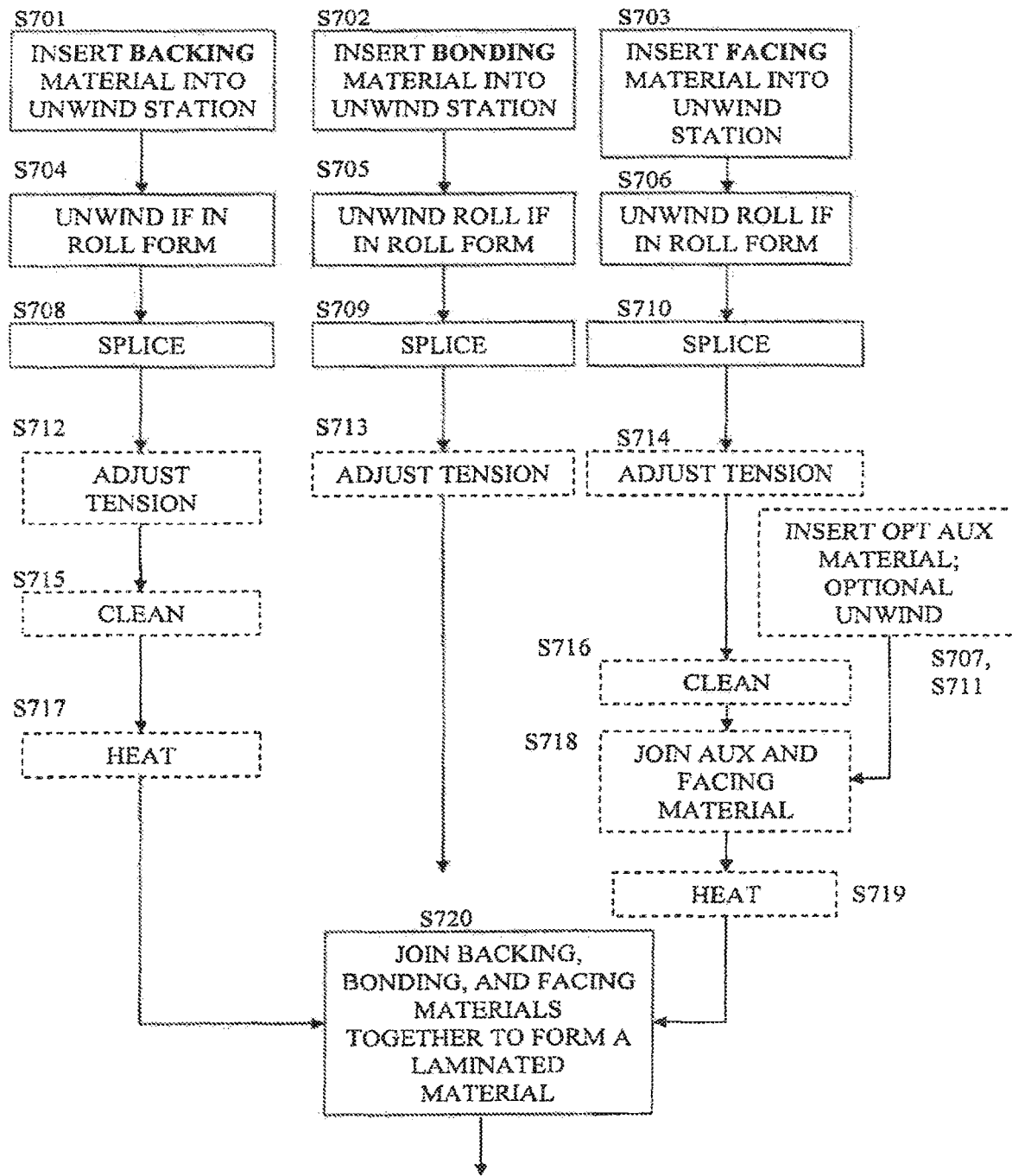
FIGS. 7A-B are first and second parts of a flow chart depicting a process used to produce products as depicted in FIGS. 1-6.
Figure 7B:
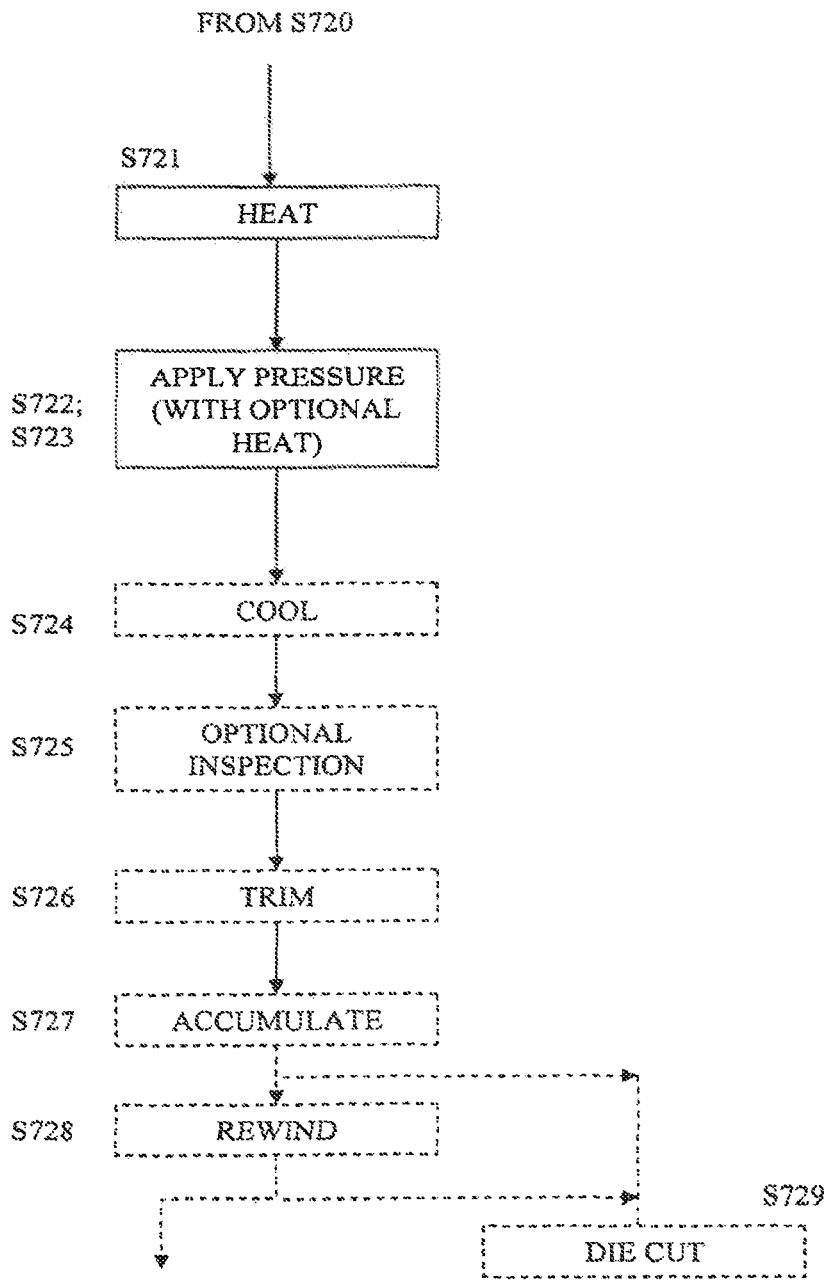

FIGS. 7A-7B depicts a flow chart illustrating one example of the process used to produce the products described in FIGS. 1, 3, and 5. In step S701, a backing material is inserted in the form of a roll in a backing unwind station 110 (see FIG. 10). The backing material may be a recycled material or a substantially new material. In any case, the backing material may be strong enough to support the weight of a person when installed on a floor surface.

Step S702 indicates that a bonding material is disposed in an unwind station. Typically, the backing material is introduced to the unwind station in the form of a roll, as is the backing material.

Similarly, a facing material is introduced into a facing material unwind station in step S703. It should be noted that, in some cases the backing material, bonding material, or facing material may be introduced in a form other than in a roll. Therefore, if the backing material, bonding material, or facing material is introduced in the form of a flat sheet or some other form different from a roll, no unwind steps such as depicted in steps S701, S702, and S703 will be necessary.

The respective materials are unwound in steps S704, S705, and S706. As the process is typically used in a commercial application, time required for the manufacture of the surface covering is a factor in determining the cost of the material. Accordingly, the backing, bonding, and facing materials used in the process typically travel within a range of approximately 10 to 30 feet per minute. Additionally, in order to maintain product flow, one batch of backing, bonding, or facing material will typically be spliced with another batch of the respective material (or roll of material) in the splice steps S708, S709, and S710. Unwinding can be controlled using ultrasonic sensors with laser guided controls.

The base layer, preferably a rubber-based layer, may be pre-treated with corona treatment prior to lamination with any further layer. Further corona treatment may occur after pre-lamination and/or after final lamination to form a surface covering having base and face layers. Corona treatment may be used to form a surface having increased tendency to bond with other layers at less severe temperature or pressure conditions.

In some cases, the ultimate surface covering produced by the process will include a flocking material that is separately applied to the facing material. This optional process is depicted in steps S707 and S711.

As the process is typically performed on a continuous process line, before or after the splicing, tensioning of the respective materials may be performed in steps S712, S713, and S714. Typically, such tensioning is performed via a "dancer", which is configured to apply a predetermined amount of tension to the respective material. However, such tensioning is optional.

In an alternative embodiment, in addition to or in replacement of the "dancer(s)," a belt may be used to convey or carry the respective materials, delivering the respective materials to the laminator with no process tension.

Steps S715 and S716 depict optional cleaning processes. It should be noted that the cleaning processes are depicted as taking place after the tensioning processes. However, the optional cleaning processes S715 and S716 may take place before the tensioning described in S712, S713, and S714. It is preferable that the cleaning take place after the tensioning inasmuch as it is beneficial to provide cleaning as near in time to the process that joins the respective materials together in order to avoid dust or other particles from adhering to the materials after the cleaning, but before the joining process.

Step S718 describes joining the auxiliary material to the facing material. As discussed above, this step is optional inasmuch as the auxiliary material is not included with all of the products produced. Rather, in some cases, for example when only a rubber facing material is provided, no auxiliary material will be added. In other words, the step S718 is optional, depending upon the facing material used. One embodiment of the process adds an enhanced material to a substrate material to form the facing material 110. Thus, the auxiliary material may be an enhanced material such as a flocked material, a tufted material, recycled fibers, a woven fabric, a non-woven fabric, wear-layers, cotton fibers, and/or synthetic fibers, and the facing material 110 may be the substrate material to which the enhanced material is added.

Steps S717 and S719 describe heating the backing and facing materials, respectively. The heat process can occur to only the backing layer, and therefore, only step S717 will be included, and step S719 will be omitted. Alternatively, step S717 may be omitted and only step S719 may be provided. In another embodiment, heating can be performed after or during the joining step S720, and this heating may be used in place of or in conjunction with the heating performed in either or both of steps S717 and S719. In a preferable embodiment heating is accomplished with infrared radiation (IR). The IR radiation is provided by IR heating units that may be controlled by measuring temperatures using a pyrometer and a feedback loop.

As the bonding material is typically a heat-activated bonding material that is solid or substantially solid at room temperature, the heat applied in steps S717 or S719 serves to activate the bonding material and allow bonding of the backing material to the facing material via the bonding material. Therefore, it is preferable to apply the heat to the backing material and/or facing material before attempting to bond the backing material to the facing material. In this way, heat stored in either the backing material or the facing material will activate the bonding material, and active heating via lamp or other heater may not have to be applied directly to the bonding material itself. As the bonding material is typically a relatively thin web, mesh, or film, it is beneficial to avoid applying heat directly to the web, mesh, or film before the bonding material is in contact with at least one of the backing or facing materials, which can provide support for the relatively weak web, mesh, or film and prevent or reduce tearing. Additionally, it is preferable to directly heat the surface of the backing or facing material (or both) that will be in contact with the bonding material inasmuch as the backing material and facing material are typically relatively unconductive (insulative) with regard to heat transfer. Therefore, applying heat to a side of the backing material or facing material opposite to the side that will be bonded via the bonding material can be wasteful because the heat energy applied to this side will have to travel all of the way through the backing or facing material in order to activate the bonding material. In other words, it is typically more efficient to heat only the area of the backing material and/or facing material that will actually transfer heat to the bonding material than it is to heat the backing material and/or facing material through its entire thickness.

As discussed above, heat may be applied to either the backing material or the facing material or both. Additionally, both of steps S717 and S719 may be omitted and heat may be applied after joining the backing material, bonding material, and facing material. Furthermore, either the step S717, which heats the backing material, or the step S719, which heats the facing material, or both, may be used in conjunction with step S721, which heats the joined material including the backing layer, bonding layer, and facing layer. After step S721, or during step S721, pressure is applied to the joined material to form a laminated layer. Additional heat may be applied after this step in step S723. However, this additional heating, like the heating described in step S721, is optional. After pressure is applied in step S722, the laminated material (backing material/bonding material/facing material combination) is cooled in step S724. The cooling may take place via exposure to ambient temperatures or may be actively performed via one or more fans or a refrigeration unit. The laminated material is then typically trimmed in step S726, although an optional inspection S725 may be performed before or after the cooling. Before or after trimming, the laminated material may be die cut in step S729, for example, into squares, rectangles, other polygons, curved shapes, or interlockable puzzle-cut pieces (see FIGS. 21-23).

Lamination may optionally include a further step whereby one or more additional materials or layers are laminated with the material representing the surface layer and/or base layer. This further step of lamination may be used to form a pre-lamination material that is subsequently joined with another material layer or second pre-lamination layer to form the lamination surface covering. Pre-lamination may be used for one or both of the face layer and the base layer. Preferably pre-lamination is sued to form a pre-laminated material having improved adhesion and/or bonding characteristics to a second or third layer. In a preferred embodiment both the face layer and the base layer are first treated with an adhesive layer to form pre-laminated layers. The two pre-laminated layers are then laminated together to form a surface covering having improved adhesions between surface and base layers. Further lamination steps whereby a reinforcing layer is added to the surface layer the base layer or any pre-lamination layer may also be included. In some embodiments a plurality of base layers is laminated to form a base layer of engineered thickness. For example two layers of a stock base layer material having a thickness of 5 mm may be laminated in order to form a base layer having a thickness of 10 mm. Different combinations of base layers may be laminated to form a base layer having different strata.

In order to further allow cooling and to provide a temporary storage area for the laminated material before the material is rolled into rolls or die cut, accumulation is provided in step S727, wherein the material travels back and forth in different directions across a series of rollers. The accumulation allows a predetermined amount of laminated material to be held in the manufacturing line before rolling and partially recreates the effect of having a process line of substantially greater length than the one actually used. For example, approximately 60 to 70 feet of material may be stored in the accumulator by traveling back and forth in substantially upward and downward directions even though the accumulator is typically about 10 feet in length.

After the optional accumulation step S727, the laminated material is wound into rolls and cut at a predetermined length in step S728 or die cut in step S729. Typically, a roll of material will then be removed from the line on a roll shuttle (see FIG. 19).

Figure 7C:
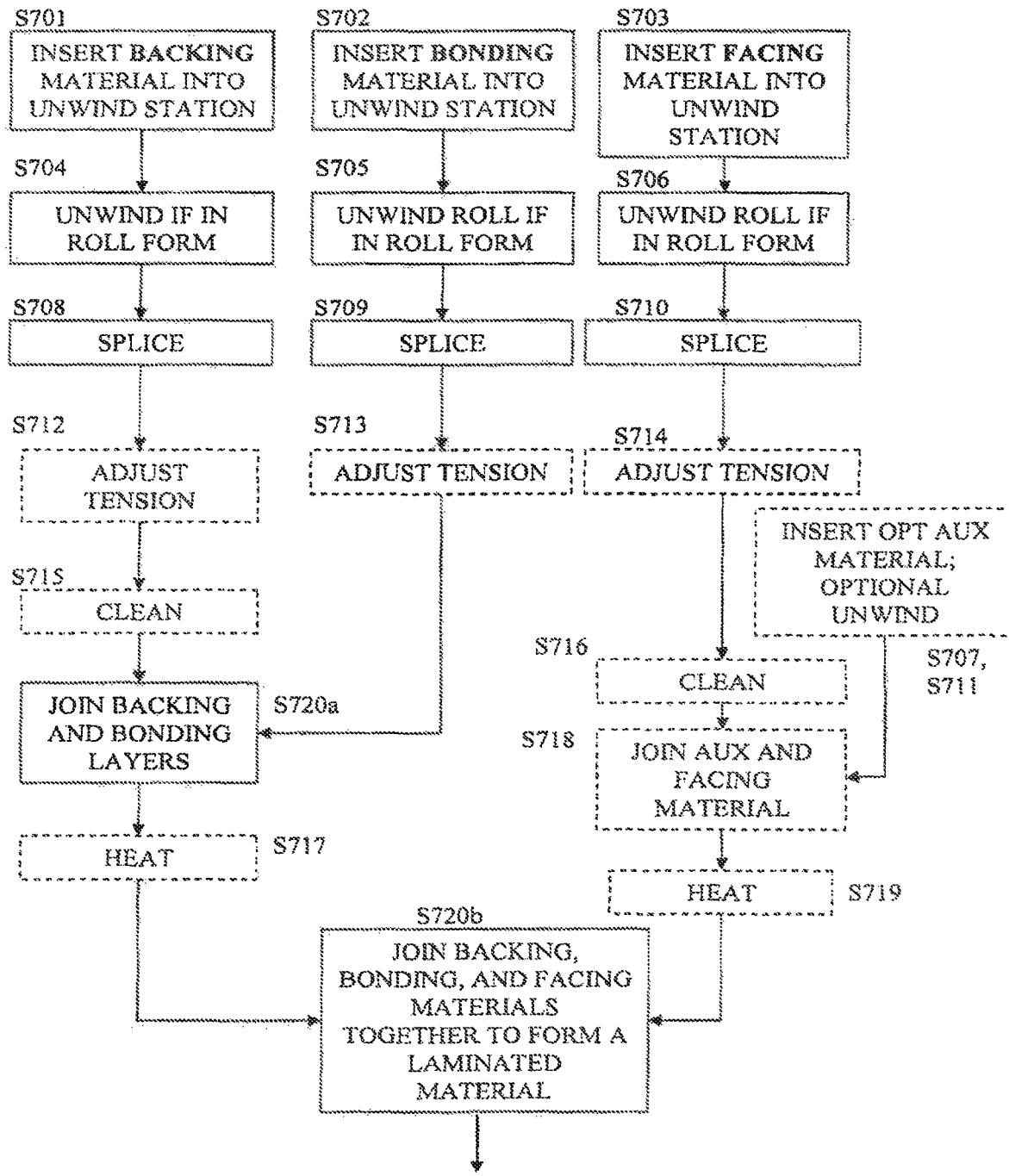
FIGS. 7C-D are first and second parts of flow chart in which backing material and bonding material are placed in contact with each other before facing material is placed in contact with the bonding material.
Figure 7D:
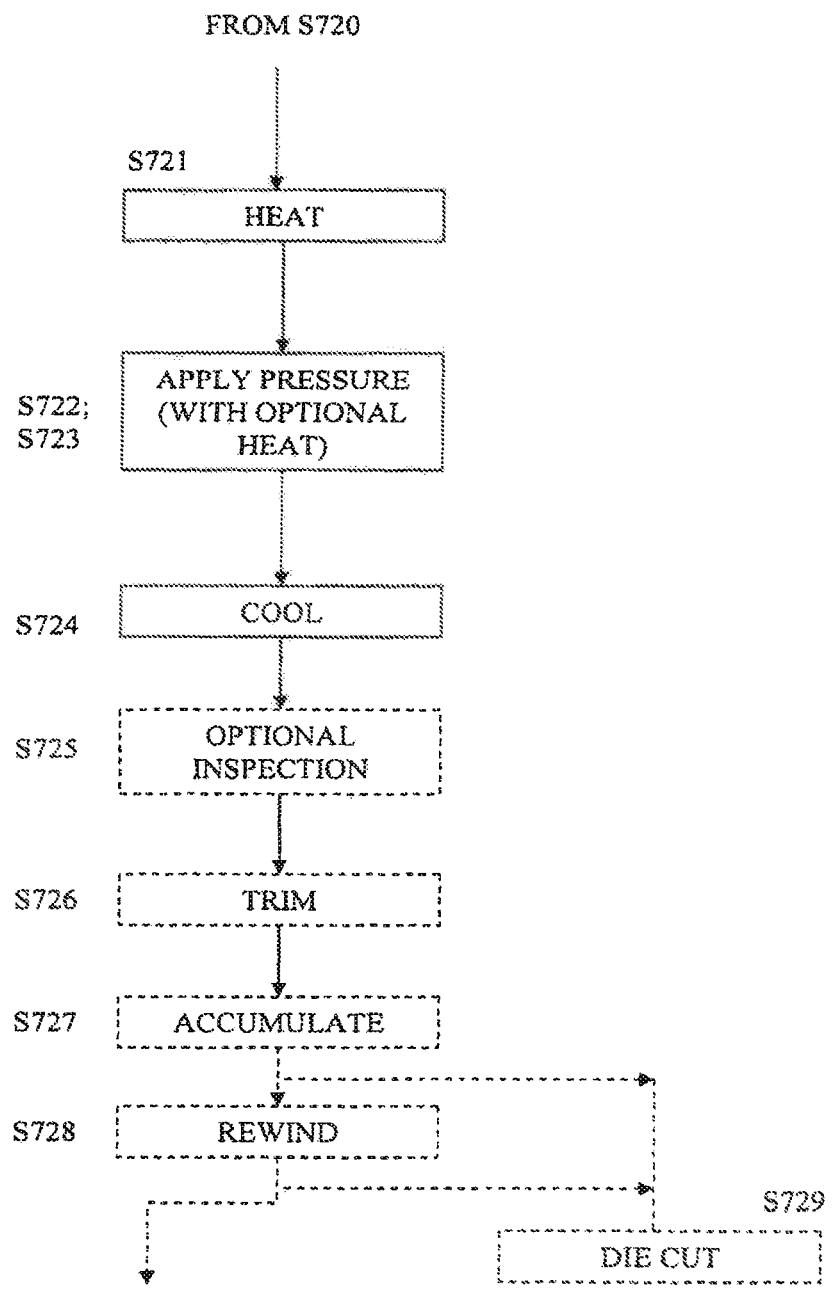

FIGS. 7c and 7d depict a similar process to that shown in FIGS. 7a and 7b, with the exception that the bonding material is joined with the backing material in step S720a prior to heating the backing material and prior to joining the backing material to the facing material in step S720b. The same reference numbers are used in FIGS. 7c and 7d as are used in FIGS. 7a and 7b, aside from S720, S720a, and S720b. One benefit of joining the bonding material to the backing material before the backing and facing materials are joined is that the backing material can act as a support for the bonding material. Thus, although the bonding material is typically relatively low in tensile strength in its heated state, and therefore, usually not directly heated on its own, the bonding material can be directly heated while supported by the backing material. For example, while the bonding material is resting or moving along with the backing material, a lamp may apply radiation directly to the bonding material before the bonding material touches the facing material.

FIG. 8 describes a general layout of a manufacturing system 101 for making surface coverings as depicted in FIGS. 1, 3, and 5. In general, the reference numbers 10-19 depicted in FIG. 8 on the schematic representations of the various operation stations in the system 101 correspond to FIGS. 10-19. However, it should be noted that the general linear arrangement of the system 101 is not required, and nonlinear arrangements may be used. For example, the various stations 10-19 may be arranged in the form of an arc or segmented polygon, for example.

Figure 9B:
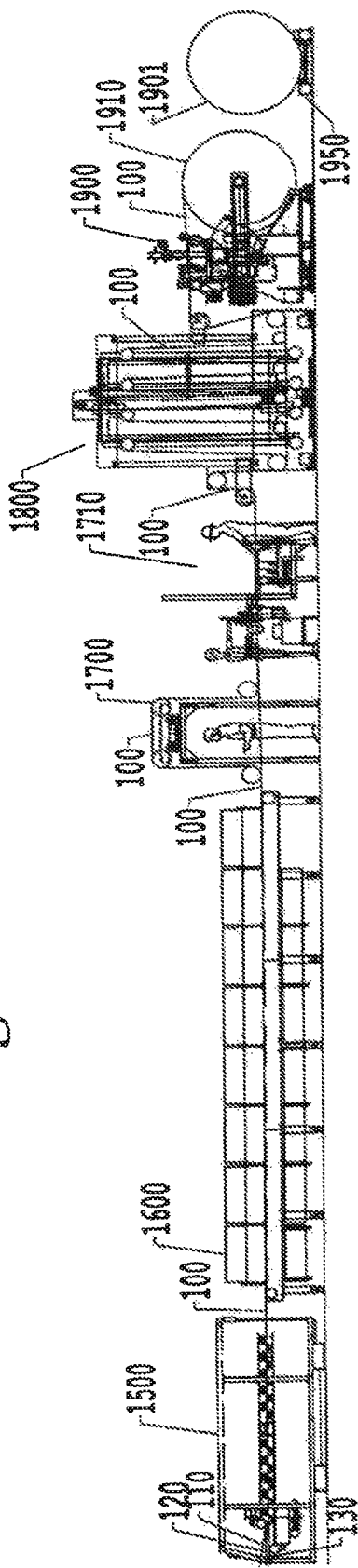
FIG. 9B is a partial side view of the remainder of the system shown in FIG. 9A.

FIG. 9A represents a first portion of a system 101 schematically represented in FIG. 8. FIG. 9A depicts stations 10-14, and FIG. 9B depicts stations 15-19.

Figure 10:
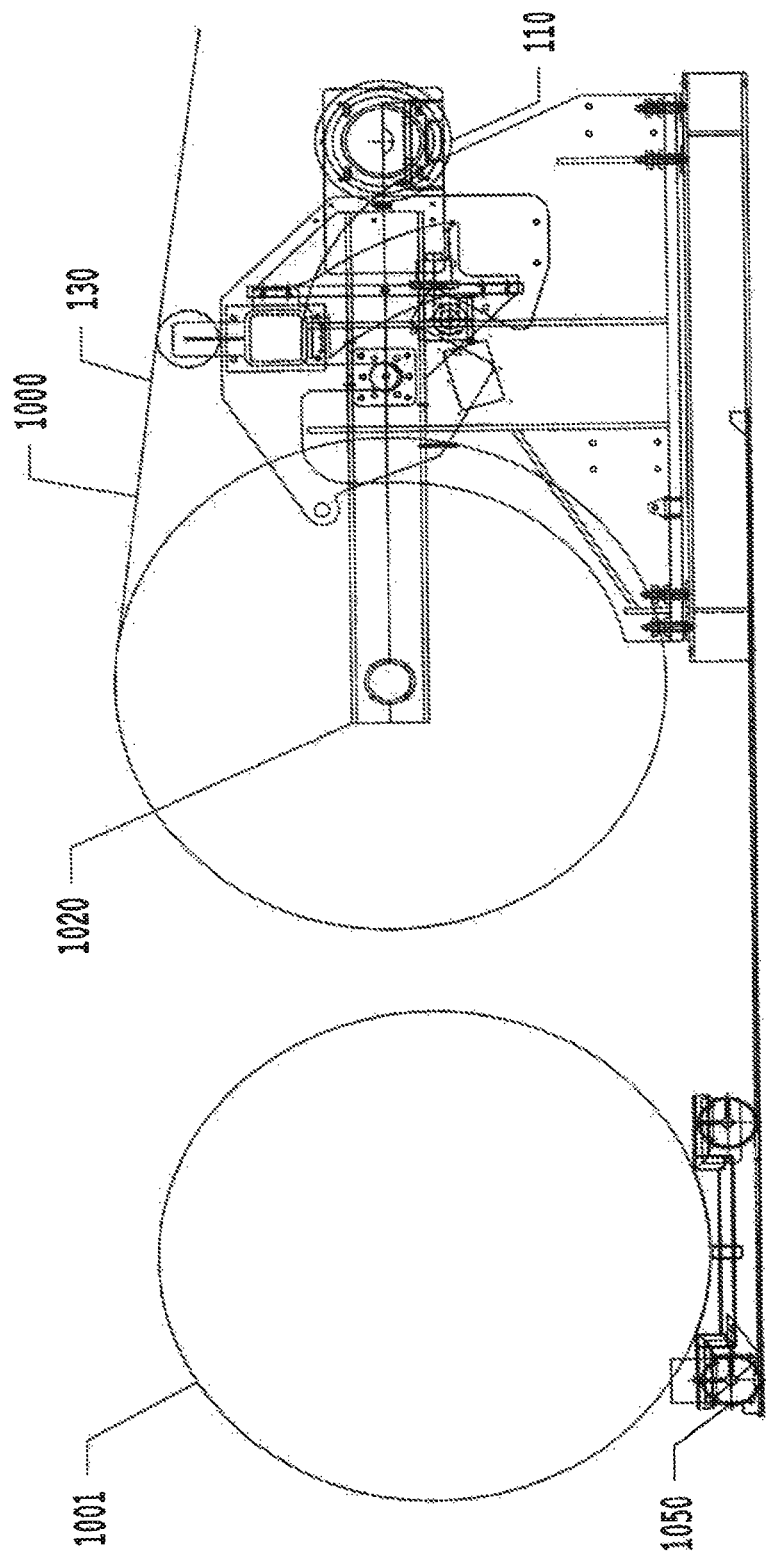
FIG. 10 is a side view of a backing unwind station from the system depicted in FIGS. 9A and 9B.

With respect to FIG. 10, a roll shuttle 1050 holds a roll of backing material 1001. The backing material depicted in roll 1001 typically corresponds to the backing material 130 depicted in FIGS. 1, 3, and 5, for example. A user will typically push the roll shuttle 1050 with the roll 1001 into position for loading onto the backing unwind station 1000. The backing unwind station 1000 is typically either pneumatically or hydraulically operated so as to tilt, receive, and then lift the roll 1001. If the system 101 is empty, for example after a large scale maintenance operation, then a user will thread a leader (not shown) through the system 101 in order to pull backing material from the roll 1001 into the system as if the system were being used for the first time. More common, however, is replacement of an empty roll 1001 with a full roll 1001 after the system has been in use for a period of time. In this case, material from the roll 1001 will be spliced via a splicing station 1100 as shown in FIG.

11. In any case, the backing unwind station 1000 is typically operated via a hydraulic, pneumatic, or electric motor 1010 as shown in FIG. 10.

Figure 11:
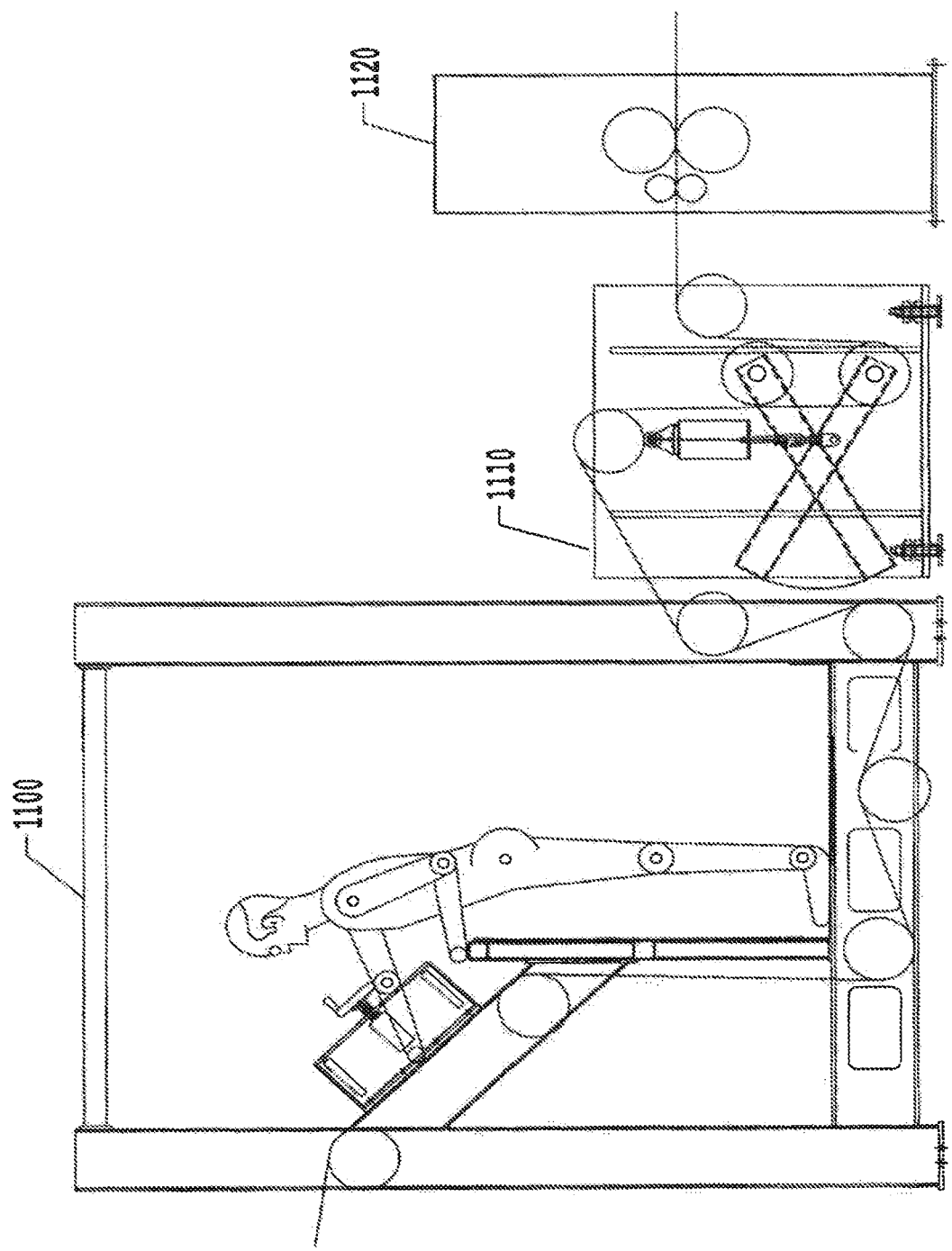
FIG. 11 depicts a splice station and optional dancer and cleaning stations used in conjunction with the backing unwind station of FIG. 10.

FIG. 11 depicts a splicing station 1100, which, as discussed above, is used to combine material from a previous roll 1001 with material from a new roll 1001. In general, material flows from the left to the right in FIG. 11. Accordingly, after the splice station 1100, it is sometimes advantageous to adjust a tension of the material 130. Accordingly, FIG. 11 depicts a dancer, which is a term in the art used to describe a system of rollers and framework configured to apply a predetermined amount of tension to a material conveyed via rollers. Although the dancer 1110 depicted in FIG. 11 is positioned immediately after, in the direction of material movement, the splice station 1100, other positions may be used for the dancer 1110. Additionally, more than one dancer may be used in a given system 101 for any of the materials handled by the system. In an alternative embodiment, in addition to or in replacement of the dancer 1110, a belt may be used to convey or carry the material in the direction of backing material movement.

Figure 10A:
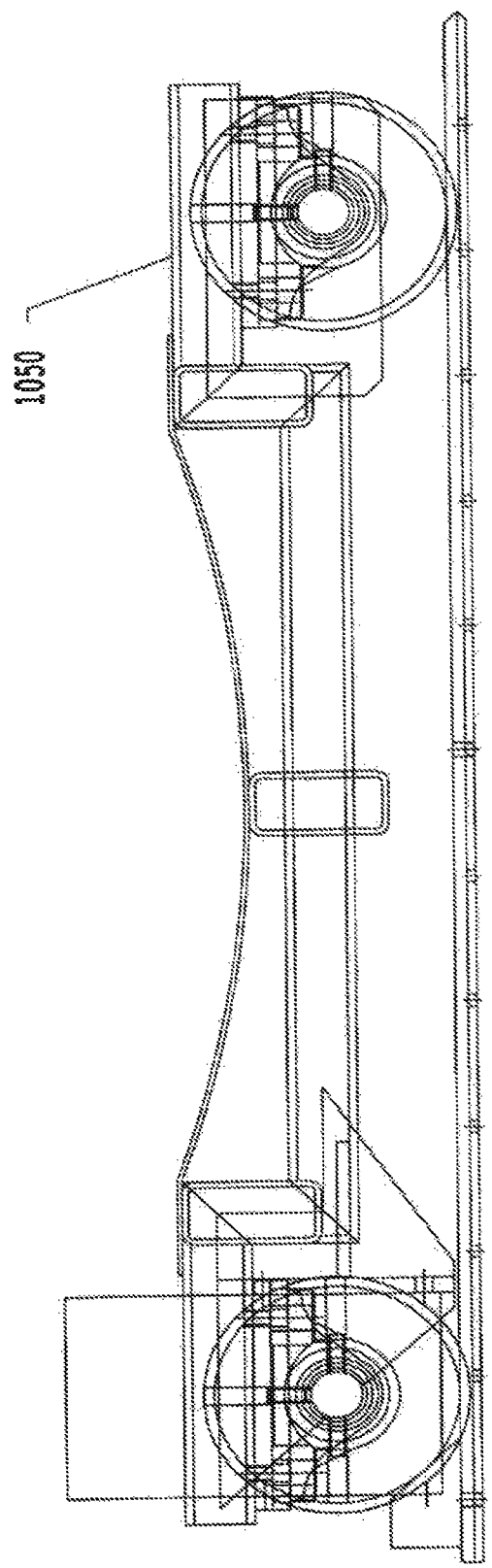
FIG. 10A is a side view of a shuttle used in the backing unwind station depicted in FIG. 10.
Figure 10B:
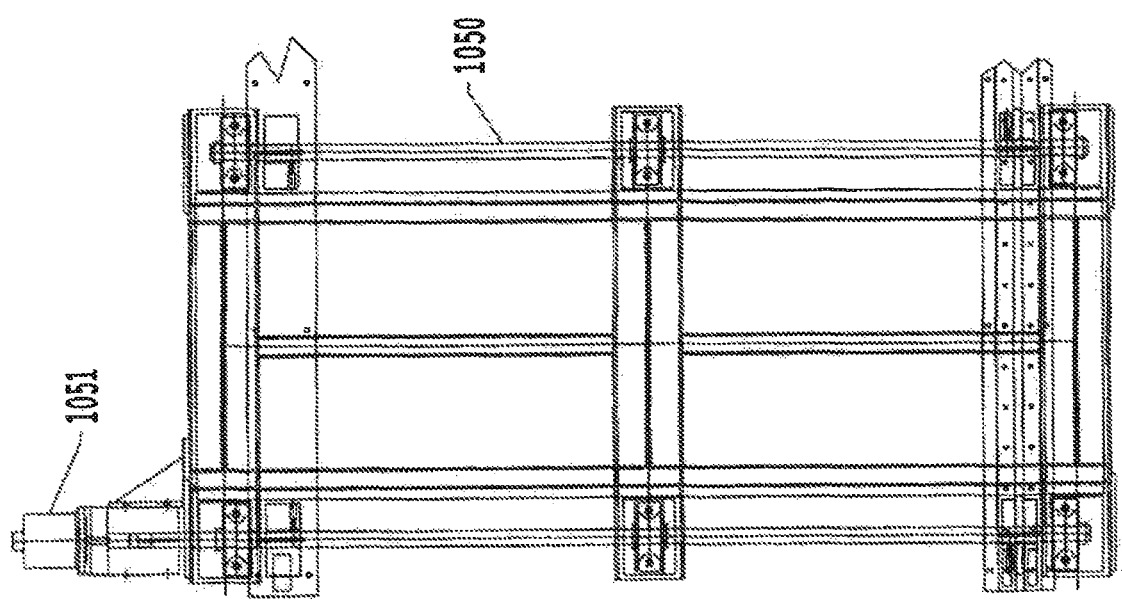
FIG. 10B is a plan view of the shuttle depicted in FIG. 10A.
Figure 10C:
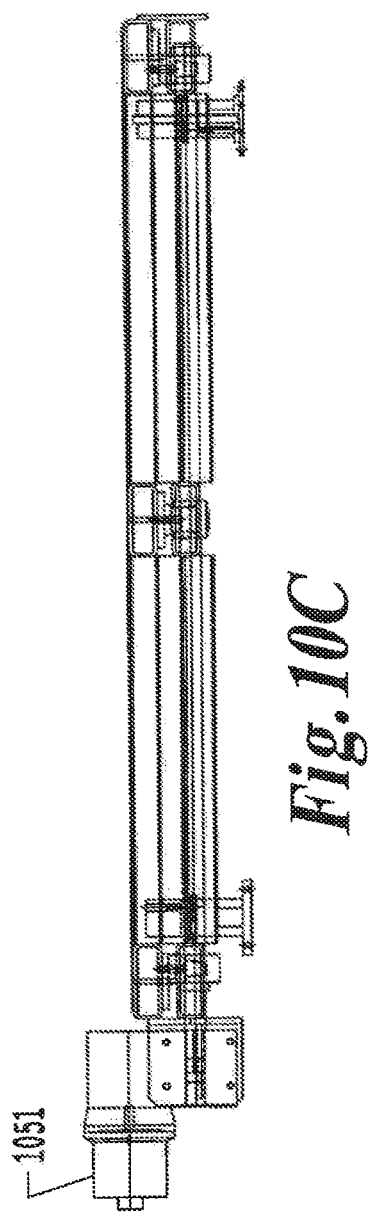
FIG. 10C is a front view of the shuttle depicted in FIG. 10A.

FIG. 11 next depicts an optional cleaning system 1120 through which the material 130 flows after passing through the dancer 1110. FIG. 10A depicts a side view of the roll shuttle 1050, and FIG. 10B depicts a top view of the roll shuttle 1050. FIG. 10C depicts an end view of the roll shuttle 1050, and as is evident in FIGS. 10B and 10C, the roll shuttle 1050 may include a motor 1051 to assist in movement of the rolls 1001 inasmuch as the rolls 1001 often weigh approximately 1500 pounds. As is further evident from FIG. 10A, the roll shuttle 1050 typically includes a partial section of a circle in order to securely accommodate the roll 1001.

Figure 10D:
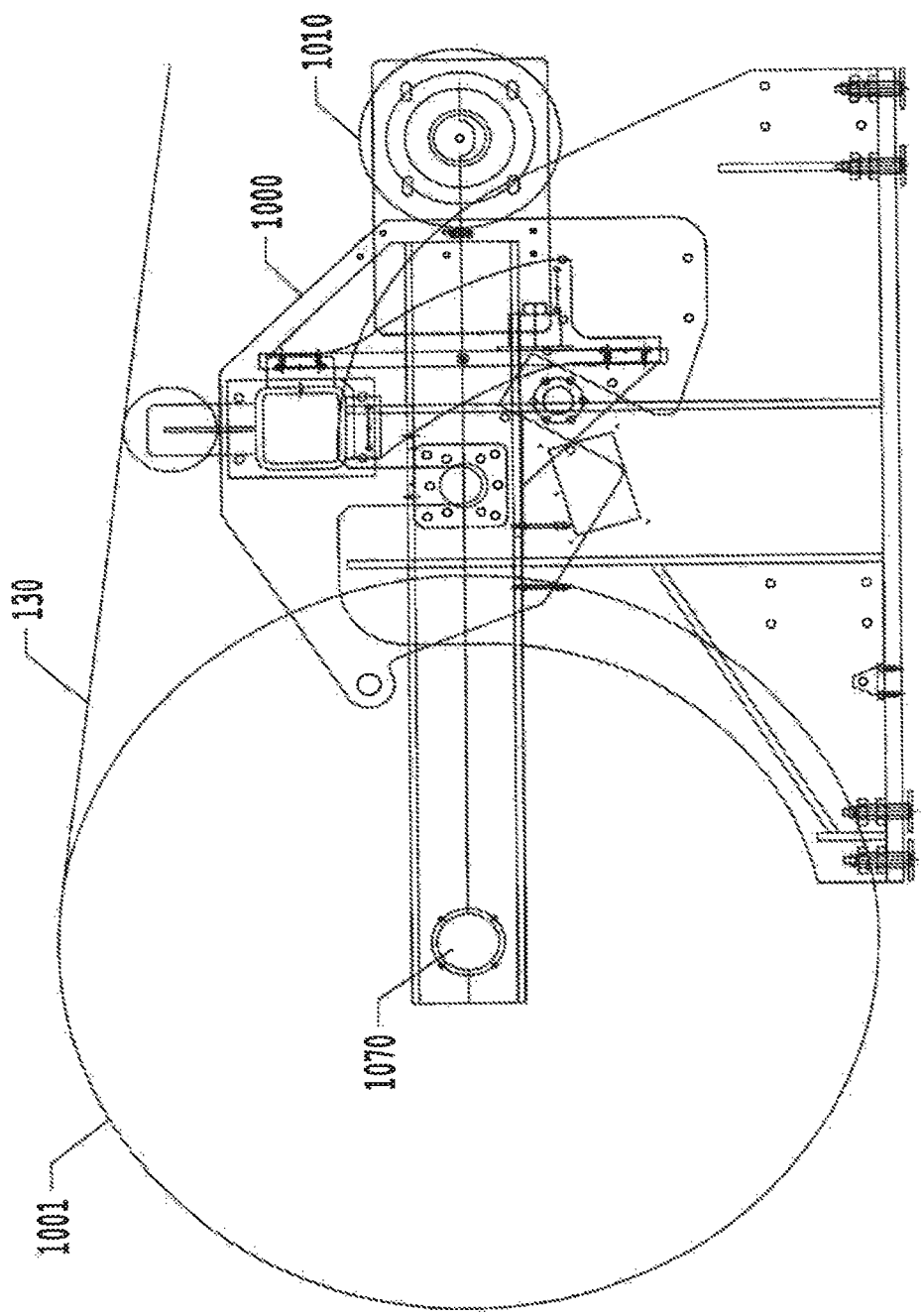
FIG. 10D is a side view of the unwinding system depicted in FIG. 10.

FIG. 10D depicts a detailed view of the backing unwind station 1000. The unwind station 1000 pivots in response to force created by the cylinder 1060 in order to move the rotating axis point 1070 upward and downward in order to lift and lower the roll 1001.

FIG. 11A is a detailed view of the splice station 1100 depicted in FIG. 11. As shown in FIG. 11A, various rollers 1180 either passively or actively convey the backing material 130. Within the splice station 1100, a user X adjusts a cutting surface insert 1109 in order to splice ends of separate rolls of material 130 together.

FIG. 11B describes a dancer in detail. As discussed above, the dancer applies a predetermined amount of tension to the material conveyed within the dancer. For example, the dancer 1110 includes a cylinder 1160, which may be hydraulic or pneumatic. The cylinder 1160 is controlled via a controller to apply a predetermined amount of tension to the material 130 by causing the pivot arm 1155 to pivot about the pivot point 1165. Typically, the cylinder 1160 is controlled by the controller based on input from a sensor that senses a force placed upon one of the rollers 1180.

FIG. 12 depicts a facing unwind station 1200 that unwinds a roll 1201 of facing material such as material 110 discussed in reference to FIG. 1. A roll shuttle 1050 is also depicted in FIG. 12 and may operate in a similar manner to the roll shuttle 1050 discussed in reference to FIG. 10. Similarly, operation of the facing unwind station 1200 is typically similar to operation of the backing unwind station 1000. For example, the facing unwind station 1200 typically includes a motor 1210 that operates to unwind the roll 1201. However, it should be noted that, in order to allow substantially linear operation of the system 101, it is helpful to elevate the facing unwind station 1200 relative to the level of the backing unwind station 1000. Alternatively, the positions of the backing unwind station 1100 and facing unwind station 1200 could be reversed, and the facing unwind station could be positioned at a level below the backing unwind station 1100. In order to achieve this difference in elevation, a system 101 includes a platform 1250, which is depicted in detail in FIG. 12A. Accordingly, with the platform 1250, it is possible to elevate one roll of material and its traveling path relative to another roll of material and its traveling path.

Figure 13A:
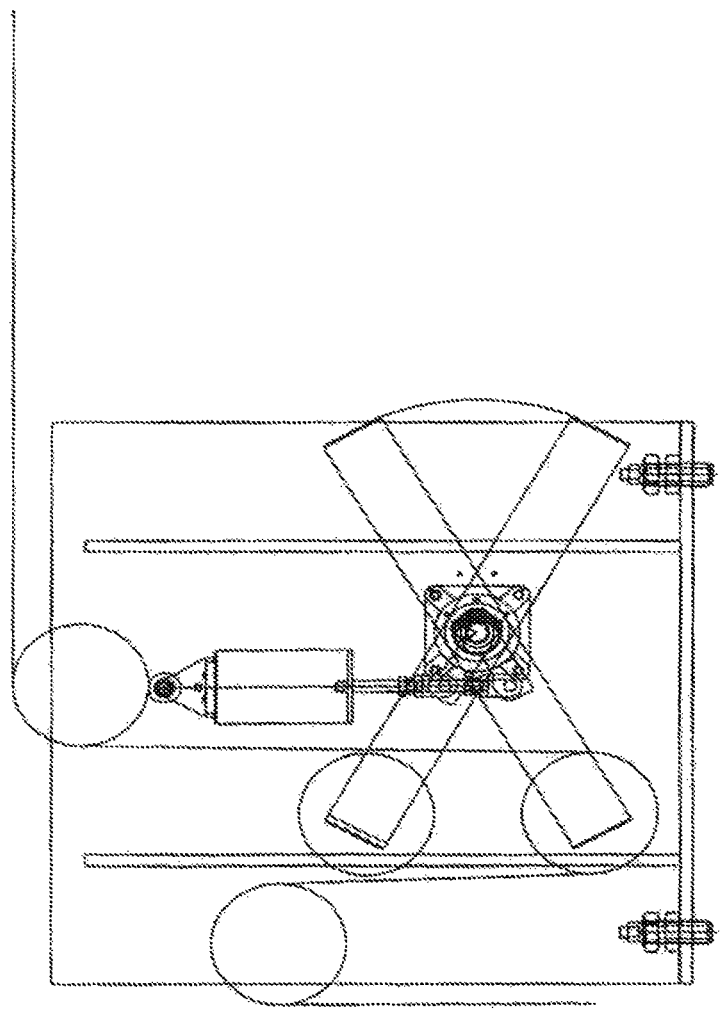
FIG. 13A depicts a side detailed view of the dancer used with the facing station described in FIG. 13.

FIG. 13 depicts a splice station 1300 for splicing the facing material 110 in a similar manner to the way the backing material 130 is spliced in the station 1100 shown in FIG. 11. In other words, the system 101 typically uses one roll 1201 of material after another, and the splicing station 1300 permits continuity of operation from one roll to the next. FIG. 13 also depicts an optional dancer 1310, which may be disposed in a position other than the one depicted in FIG. 13. The dancer 1310 is shown in more detail in FIG. 13A. The dancer 13 10 functions in a similar manner to the dancer 1110 discussed in relation to FIG. 11. In an alternative embodiment, in addition to or in replacement of the dancer 1310, a belt may be used to convey or carry the facing material in the direction of material movement.

Furthermore, an optional cleaner 1320 is disposed downstream of the dancer 1310 as shown in FIG. 13. The cleaner 1320 operates in a similar manner to 1120. It should be noted that water recycling systems are often used with one or both of the cleaners 1120 and 1320.

FIG. 14 depicts a roll of bonding material 1401 disposed in a bonding material unwind station 1400. FIG. 14 also shows the facing material 110, the bonding material 120, and the backing material 130 in relation to each other.

FIG. 14A depicts a detailed side view of the bonding material unwind station 1400. As shown in FIGS. 14A and 14B, which is an isometric view of the bonding material unwind station 1400, the material 120 is typically formed of sheets from two separate rolls 1401. Additionally, waste rolls 1403 receive a portion of the material from 1401, which is used to cover the material 120 before use.

Figure 14D:
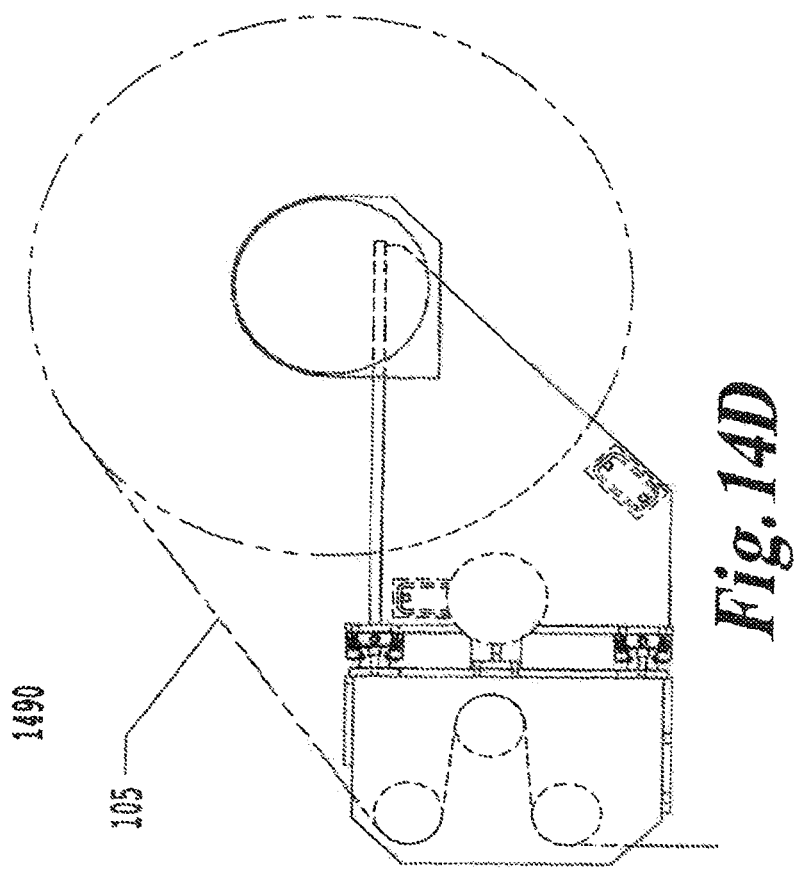
FIG. 14D is a detailed side view of the auxiliary unwind station depicted in FIG. 14.

FIG. 14C describes a bonding material dancer 1410. In an alternative embodiment, in addition to or in replacement of the dancer 1410, a belt may be used to convey or carry the bonding material in the direction of material movement. FIG. 14D depicts a detailed view of an auxiliary material unwind station 1490, and FIG. 14E depicts the auxiliary unwind station 1490 in isometric view. The auxiliary unwind station is used to apply an additional material to the facing material 110 as shown in FIG. 14. For example, in some cases, the auxiliary unwind station 1490 applies an enhanced material to a substrate material used for the facing material 110. However, the auxiliary unwind station 1490 is optional, and certain products do not require the addition of any auxiliary material 105. FIG. 14D and FIG. 14E each describe a roll 1491 of auxiliary material 105, which may or may not be used in conjunction with facing material 110. FIGS. 14F, 14G, and 14H depict various views of heaters 1440 used to apply heat to the casing material 110 and/or the backing material 130. The infrared heater 1440A applies heat directly to a surface of the material 130 that eventually comes into contact with the bonding material 120. Similarly, the infrared heater 1440B applies heat directly to a surface of the facing material 110 that comes into contact with the bonding material 120. Thus, as discussed above, the surfaces that directly contact the bonding layer are directly heated via the heaters 1440. This direct application of heat where it is needed saves energy inasmuch as it is not necessary to heat the entire thickness of the materials 110 and 130 in order to activate the heat activated bonding material 120. Rather, heat is applied where it is needed most, at the surface where the materials are to be joined.

FIG. 14I is a view of an embodiment of the heaters depicted in FIG. 14, but with a powder scattering unit 1450 installed for dispensing a powdered bonding material. The powdered bonding material is typically heat activatable, similar to the film discussed previously. The powder scattering unit 1450 is most often configured to shake or cast the powdered bonding material onto the backing material 130 from a position above the backing material 130, but other arrangements are possible. For example, if the positions of the backing material 130 and facing material 110 are reversed, then the powder scattering unit 1450 would apply powdered bonding material to the facing material 110. In one example, the powder scattering unit 1450 is driven by a motor that stirs or shakes the powdered bonding material. The motor is typically electric or hydraulic.

In some applications, heat may be applied via another type of heater, for example, a heated blower or a heated roller. Rollers similar to those shown in various other parts of the unwind station 1490 may be used, but with sufficient provisions made to apply heat to the roller. For example, an electric heater may be disposed inside the roller. However, the application of infrared heat to the various materials 110, 120, and/or 130 is preferred inasmuch as infrared heat can disrupt the surface tension of the material to which it is applied and therefore result in superior bonding between materials than is typically available with heat applied via convection or conduction methods alone. It should be noted, however, it is possible to add a device, such as a static electricity generator, that can disturb the surface tension of the materials 110 and 130. The addition of this static electricity generator is often not made when infrared radiation is used to heat the materials 1 10 and 130.

The heaters 1440A and 1440B typically heat the surface of the material to which they are applied to a temperature of 93° C. to about 310° C., more preferably from 180° C. to 250° C., even more preferably about 190° C. to about 230° C. (surface temp), and more preferably about 200° C. to about 220° C. Other temperatures may be used.

One or both of the infrared heaters 1440A and 1440B may be configured to provide a gradient to the infrared radiation applied to the surface of the facing material 110 or backing material 130. In other words, in order to prevent the edges of the heated material from overheating, it is preferable to provide greater radiation intensity at an area in the middle (away from the edges) of the facing material 110 or backing material 130 than is applied to the edges themselves. This is so because the edges of the material do not have as great of a heat sink in which to dump heat as the center of the material has. Accordingly, it is beneficial to provide a gradient to the amount of radiation applied to the heated surface. The gradient may be controlled via an electronic controller, for example, a temperature controller or a temperature program loaded onto a personal computer. Alternatively, the temperature gradient may be provided via hardwiring or may be provided via individual heat elements disposed within the heaters 1440 with elements of greater wattage disposed toward the center of the heaters 1440 and elements of relatively less wattage disposed toward the edges of the heaters 1440.

Although the temperature gradient noted above is typically preferred, especially when the materials to be heated are relatively sensitive to heat, some configurations of the system 101 use heaters 1440 without providing any temperature gradient. Additionally, as discussed previously, alternative forms of heating the facing material 110 and/or backing material 130 such as heated rollers or heated air blowers may be used in place of the infrared heaters 1440 or in addition to the heaters 1440. Additionally, as discussed previously, the heaters 1440 disposed upstream of the laminator 1500 may be replaced or augmented with heaters disposed within the laminator 1500 itself.

Figure 15:
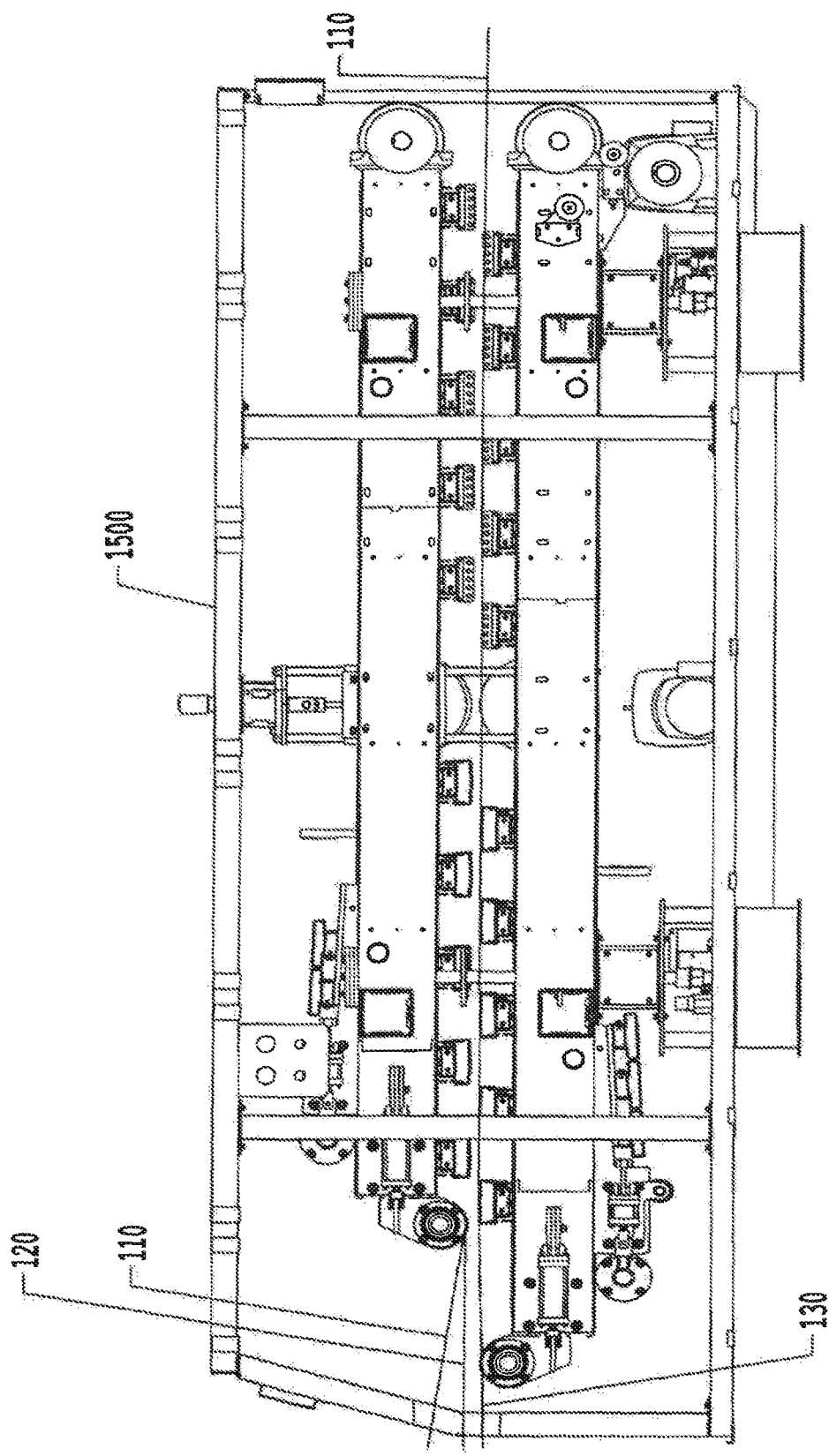
FIG. 15 describes a laminator used to laminate the facing material depicted in FIG. 12 to the backing material depicted in FIG. 10.

FIG. 15 depicts a laminator 1500 that presses together the facing material 110 (and auxiliary material, if any), heat activated bonding material 120, and backing material 130 to form a laminated material 100. The laminator 1500 typically includes one or more rollers, and, as discussed previously, may include additional heaters configured to heat at least one of the facing material 110 and backing material 130. As shown in FIG. 15, material is moving from left to right, and laminated material 100 exits the machine at its right-hand end.

Figure 16:
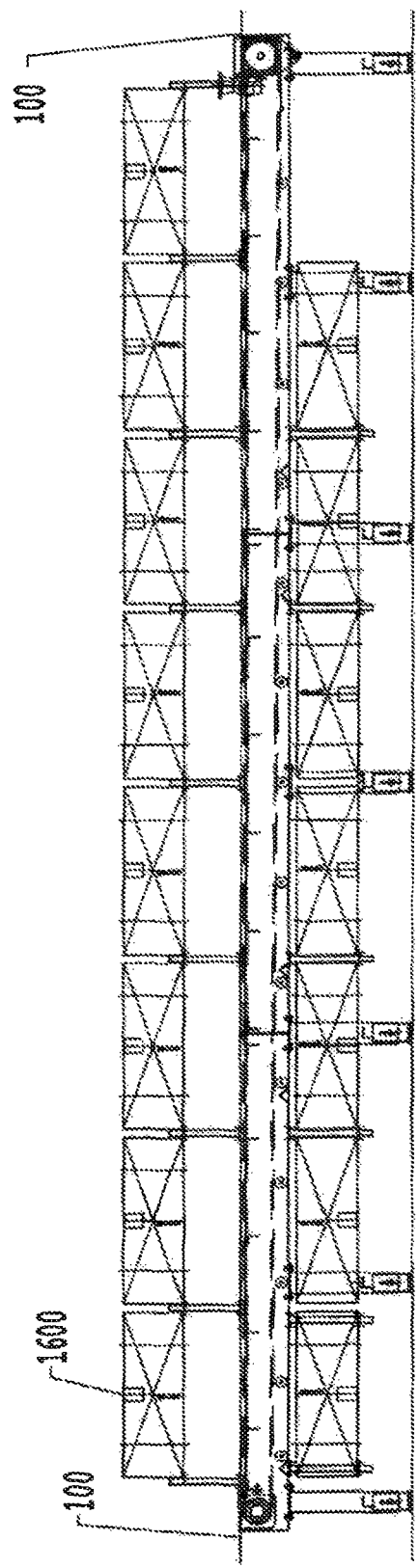
FIG. 16 describes a cooling conveyor disposed downstream of the laminator depicted in FIG. 15.

Upon exiting the laminator 1500, the laminated material 100 passes into the cooling conveyor 1600 shown in FIG. 16. The cooling conveyor 1600 typically cools the laminated material 100 by applying ambient or chilled air to at least one side of the laminated material 100, preferably both sides of the laminated material 100. FIG. 16A is a detailed side view of the laminator 1600 depicting fans 1610 depicted above and below a path where the material 100 travels. It is preferable that the cooling conveyor 1600 is from 10 to 40 feet, more preferably 20 to 35 feet, in length and that the cooling conveyor 1600 does not include sharp bends in the path of the laminated material 100 inasmuch as. having recently been heated during its bonding process, the laminated material 100 does not typically have its full tensile strength as it leaves the laminator 1500. Accordingly, the cooling conveyor 1600 typically includes a substantially straight path for the material 100 with fans 1610 disposed above and/below the material 100 in order to allow the material 100 to cool before any substantial bending stress is applied to the material 100. As shown in FIGS. 16C and 16D, which are upper and lower plan views of the cooling conveyor 1600, fans 1610 may be disposed in a staggered pattern relative to the direction of movement (left to right) of the laminated material 100.

Figure 16B:
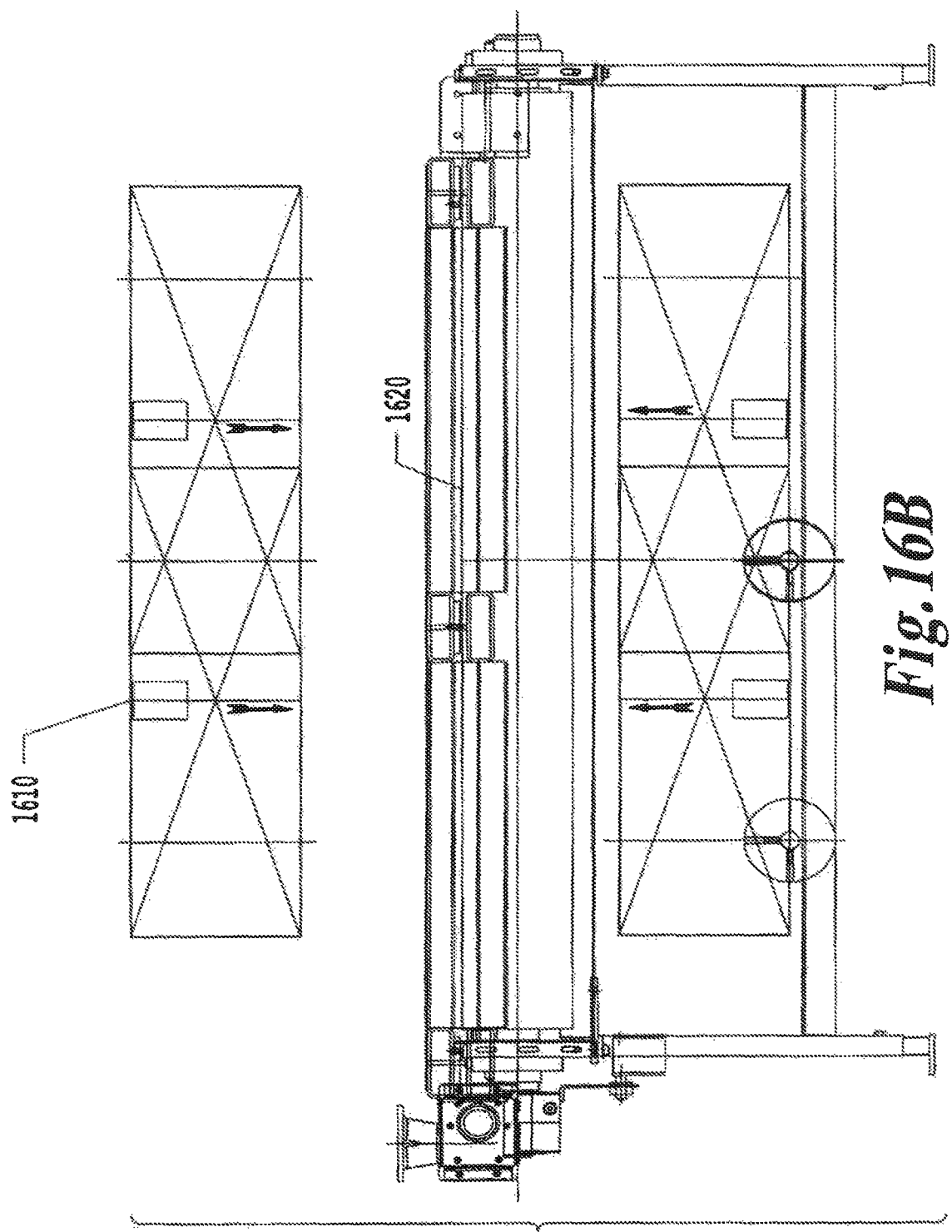
FIG. 16B is an end view of the laminator depicted in FIGS. 16 and 16A.
Figure 16C:
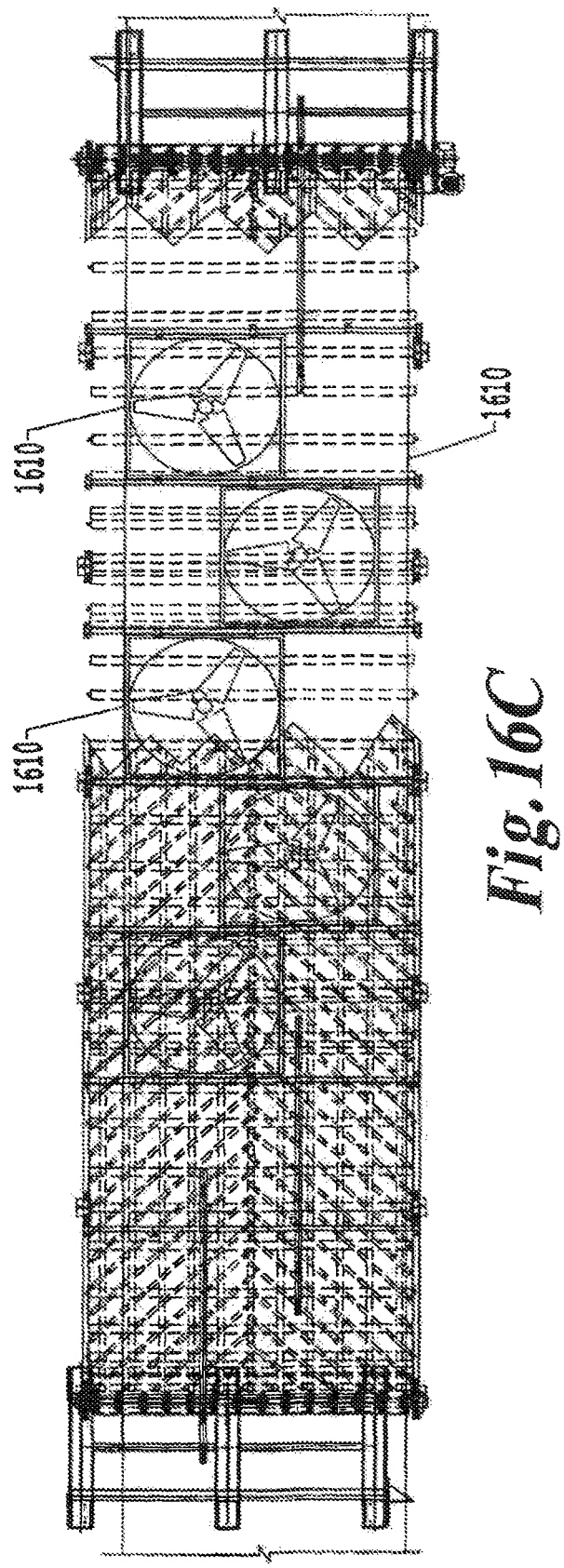
FIG. 16C is a top view of the laminator depicted in FIGS. 16, 16A, and 16B.
Figure 16D:
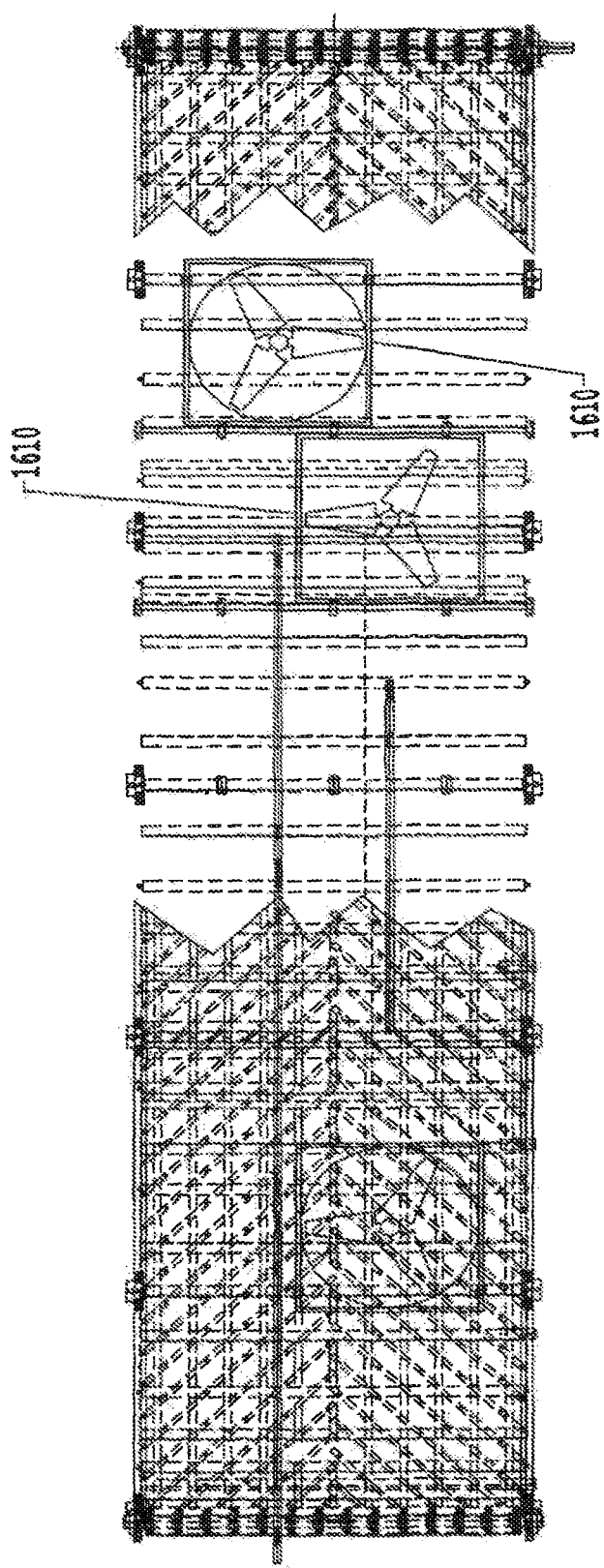
FIG. 16D is a bottom view of the laminator depicted in FIG. 16.
Figure 17:
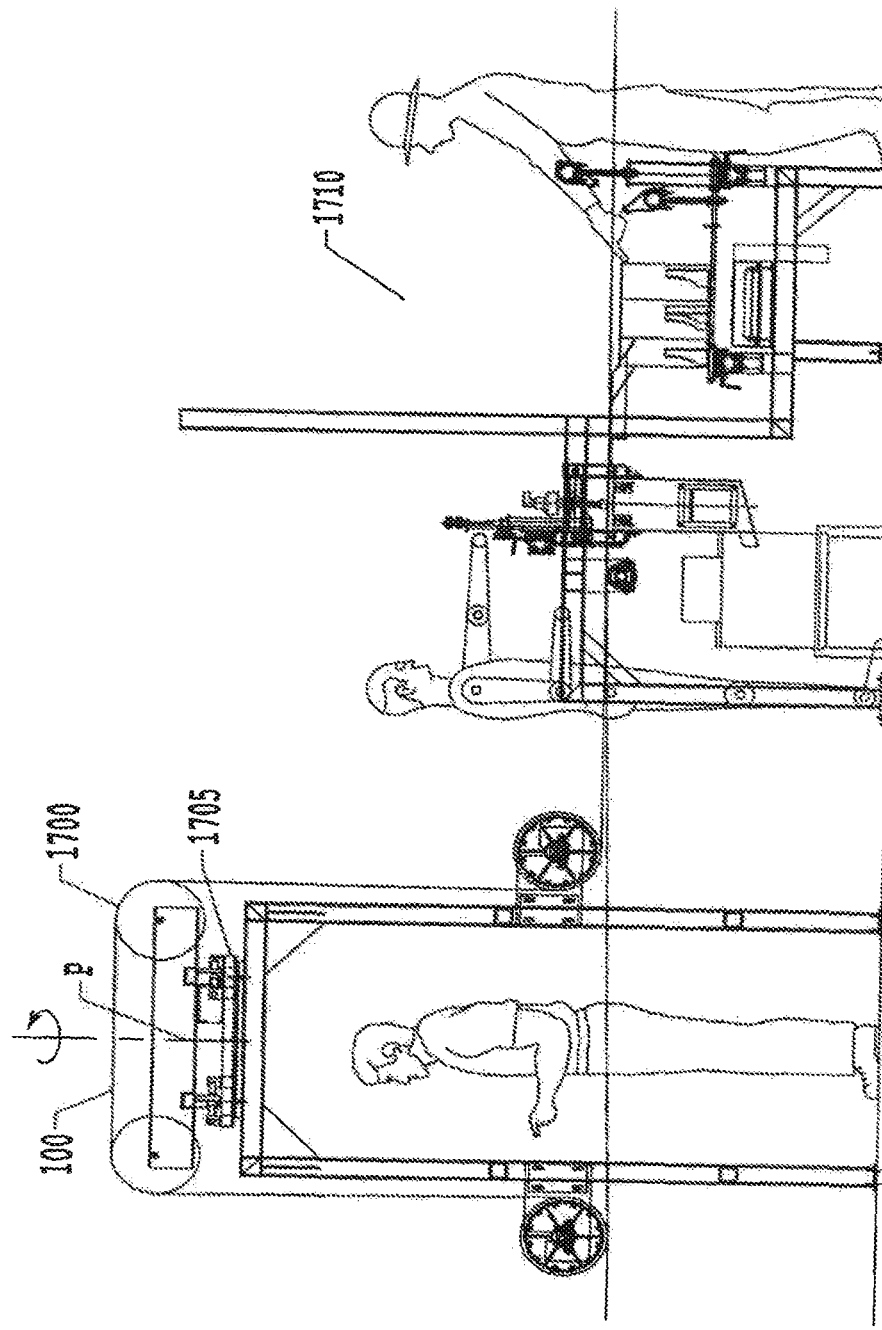
FIG. 17 depicts an optional inspection station (guider) and trimming station disposed downstream of the cooling conveyor depicted in FIG. 16.

As shown in FIG. 16B, the fans 1610 are configured to blow cooling air over substantially an entire width of the laminated material 100. As further shown in FIG. 16B, there is typically a gap between the outputs of the fans 1610 and a surface of a belt 1620 on which the laminated material 100 is conveyed. This gap allows for variations in the thickness of the laminated material 100. For example, the laminated material 100 may be anywhere from about 1 to about 25 mm thick, more preferably about 2 to about 15 mm thick, and even more preferably about 4 to about 10 mm thick. It should be noted that, up to a certain point, the thinner the laminated material 100 is, the easier it is to heat, and therefore, the easier it is to bond. FIG. 17 depicts the laminated material 100 passing over an inspection station 1700. In the inspection station 1700, a user typically visually examines the material after it has been cooled in order to discover any defects that may be present in the material. Also depicted in FIG. 17 is a trim station in which edges of the laminated material 100 may be trimmed. For example, the trim station 1710 may comprise a water jet configured to cut a straight edge, or even a series of interlocking protrusions and cavities into the material. The interlocking cavities and protrusions form a so-called "puzzle-cut" pattern in which various pieces of laminated material 100 may be assembled to cover a floor the same way pieces of a child's puzzle interlock to form a picture. However, the typical procedure cuts a linear edge on the laminated material 100, and any puzzle cut patterning is performed later. In one example, the trim station 1710 cuts the laminated material 100 at an angle such that the facing material has a larger surface area than the backing material. In other words, the edge of the laminated material 100 is chamfered. One benefit of the above-noted chamfering is that, when pieces of the laminated material 100 are fit together, the upper surface of the laminated material 100, which exposes the facing material 110, abuts with an edge of an adjoining piece of laminated material 100 without interference from irregularities along the edge of the interior of the laminated material 100. In other words, any lumps or protrusions on the sides of the laminated material 100 do not interfere with closely abutting the top surface of the laminated material 100 with an adjoining piece of the laminated material 100.

After cutting with a water jet, air blowers typically blow air onto the cut material to dry it. In particular, the edges may be subjected to a directed air stream as this is the area most impacted by the water jet.

FIG. 17A is a detailed view of the inspection station 1700. The rollers 1780 in the inspection station 1700 are typically of sufficient diameter to prevent excessive bending of the freshly laminated material 100 because, as discussed previously, the laminated material 100 may not be at its full tensile strength. Accordingly, it is preferable to maximize the bending radius of any changes in direction in the path of the laminated material 100. For example, it is preferable that the diameter of the rollers 1780 is at least eight inches. More preferably, the diameter of the rollers is ten to twelve inches.

The inspection station typically includes a guider 1705 that pivots about an axis P. The guider checks the material for deviation from its intended direction of travel (generally perpendicular to the axes of the rollers) and aligns the material to ensure that it does not move off of the machine. The guider 1705 typically incorporates an electric or hydraulic motor in combination with a sensor that determines the location of the laminated material. Additional guiders 1705 are typically disposed upstream to guide the materials used to form the laminated material, i.e., the facing material 110, backing material 130, and/or bonding material 120.

Figure 17B:
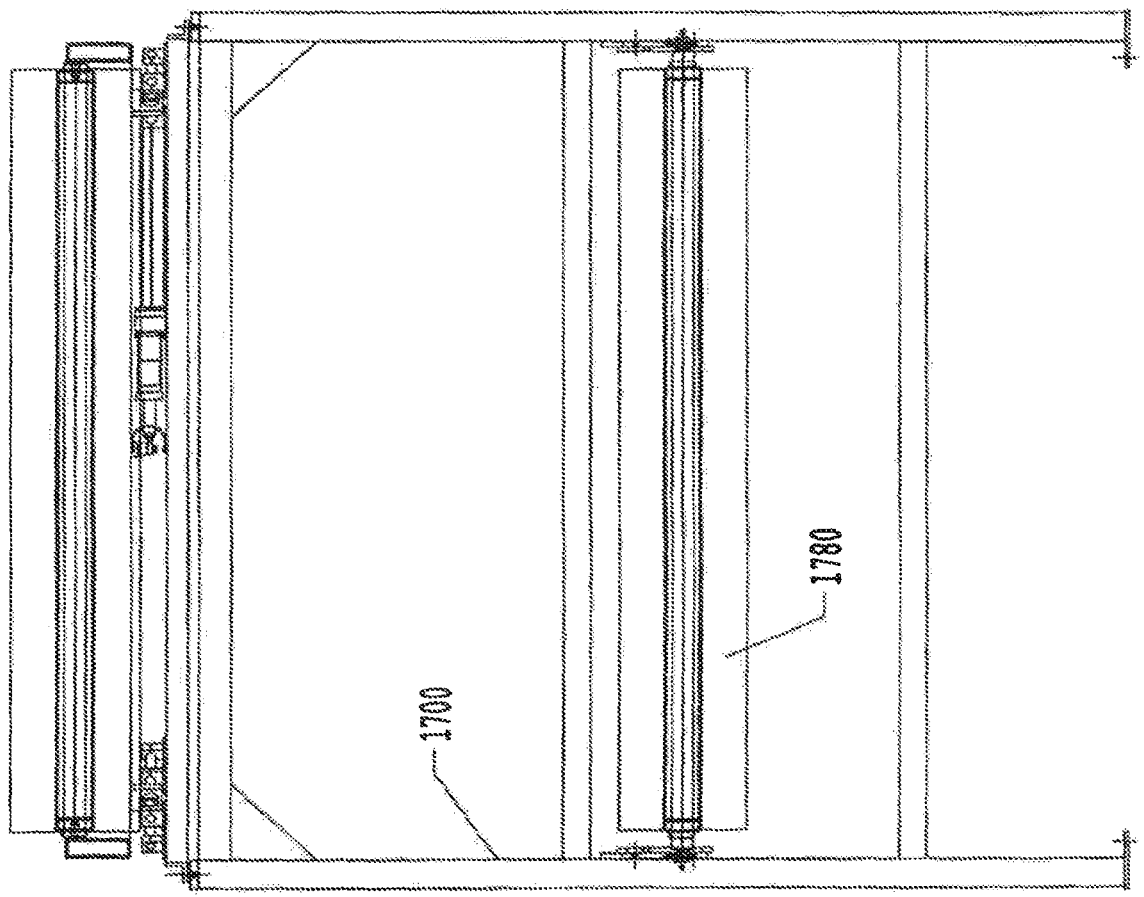
FIG. 17B is an end view of the inspection station depicted in FIG. 17.

FIG. 17B is an end view of the inspection station 1700. Typically, the rollers 1780 have a length of approximately 80 inches. However, other lengths are possible, and the length can be configured as needed.

Figure 17C:
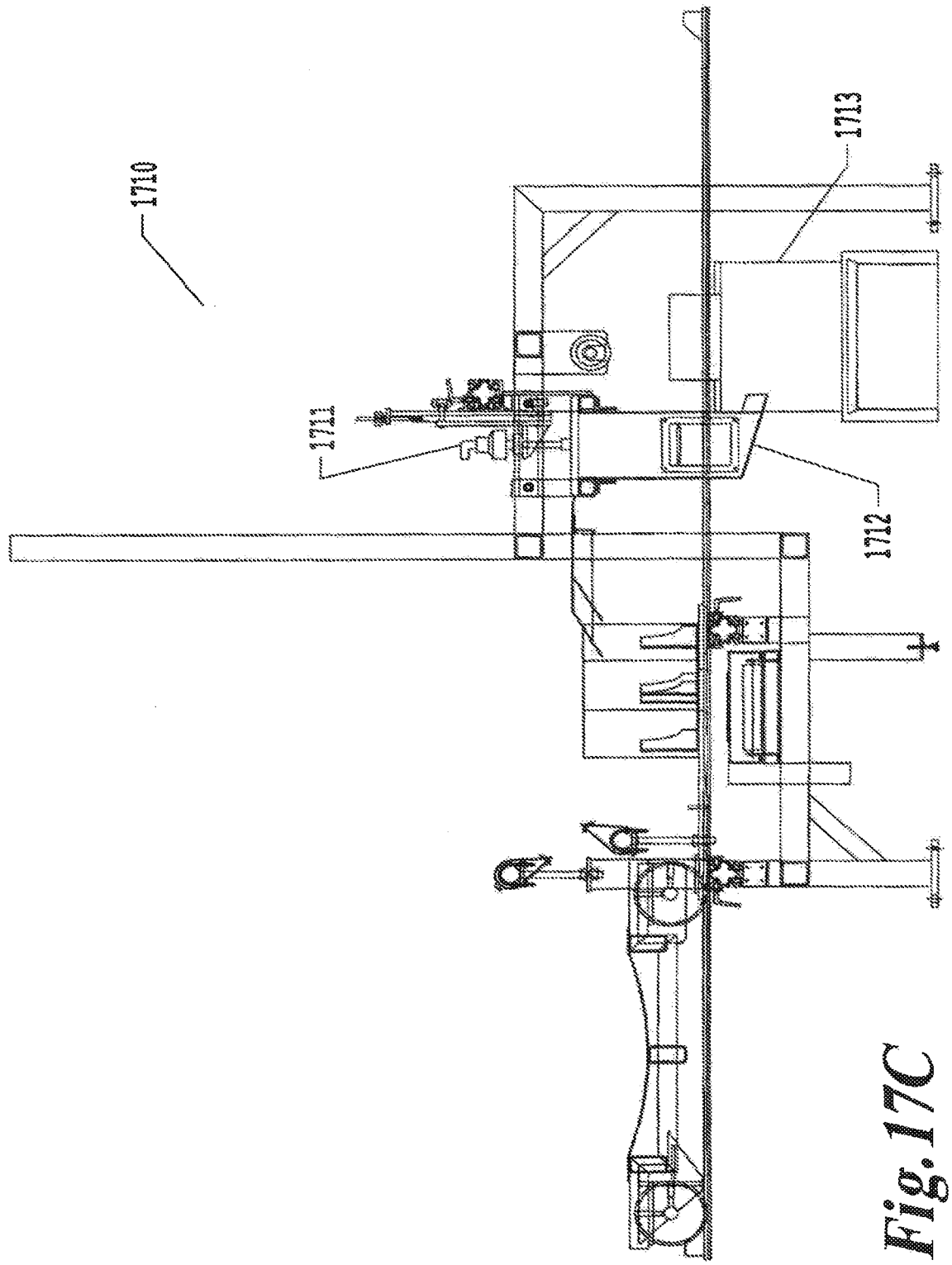
FIG. 17C is a side view of the trim station depicted in FIG. 17.

FIG. 17C is a side view of the trim station 1710 shown from an opposite perspective of that depicted in FIG. 17. In other words, FIG. 17C shows the trim station 1710 as the laminated material 100 moves from right to left. As discussed previously, in some cases, it is preferable to apply a chamfer to the edge of the laminated material 100 when trimming. In the example of the trim station 1710 shown in FIG. 17C, a nozzle of 0.10 inch in diameter (orifice) is provided. In another example, a nozzle with an orifice of 0.005 inches in diameter is provided. As shown in FIG. 17C, a nozzle subassembly 1711 directs a fluid jet into a tank 1712, which drains into a filter assembly 17 13. Thus, fluid used in the trimming process and ejected through the nozzle 1711 can be recovered, filtered, and reused in order to reduce water consumption.

Figure 18:
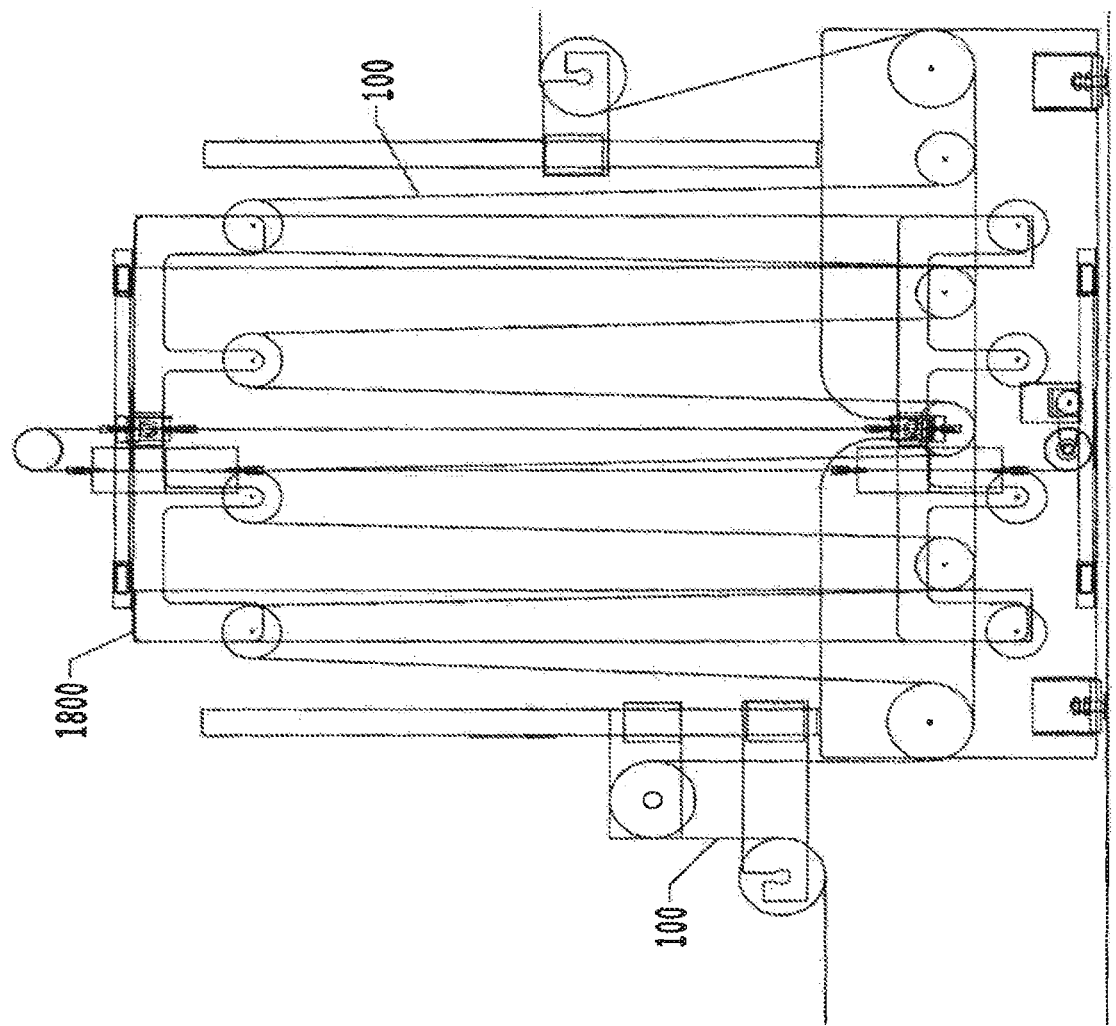
FIG. 18 depicts an accumulator disposed downstream of the cooling station and trim station depicted in FIGS. 16 and 17.

FIG. 18 depicts an accumulator 1800 disposed downstream of the trim station 1710. It should be noted, however, the trim station may follow the accumulator, if desired. The accumulator typically reverses direction of the laminated material from a substantially upward direction to a substantially downward direction repeatedly in order to provide a convenient way of storing material while the material is still in an unrolled state. In other words, by repeatedly reversing the direction of the laminated material 100, the accumulator 1800 can store, for example, 70 to 100 feet of material before the laminated material 100 is ultimately cut and rolled into rolls 1901 (see FIG. 19). In the embodiment shown in FIG. 18, about 71 feet of the laminated material 100 is shown stored in the path provided by the accumulator 1800.

Figure 19A:
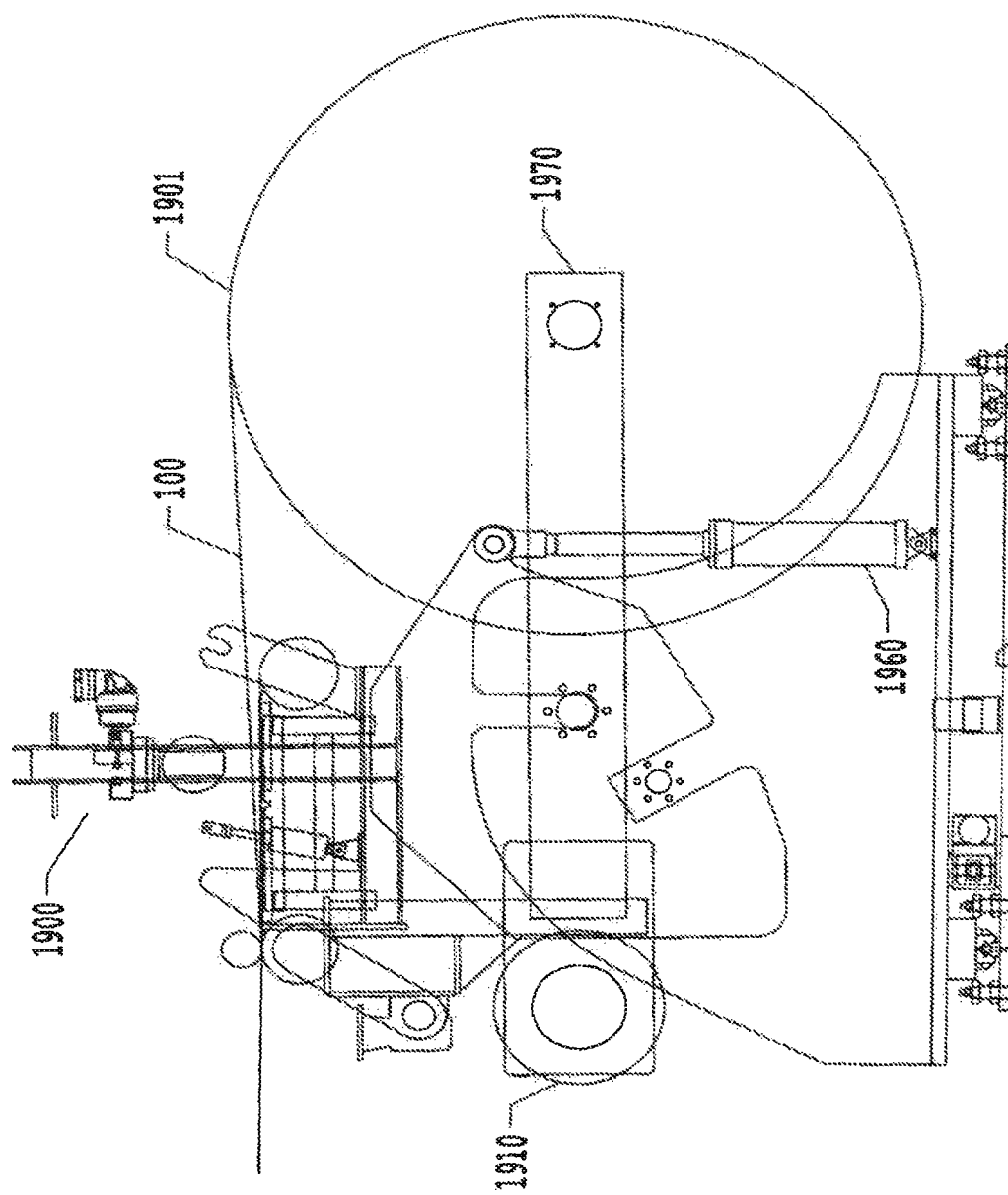
FIG. 19A is a detailed view of the rewind system depicted in FIG. 19.
Figure 19B:
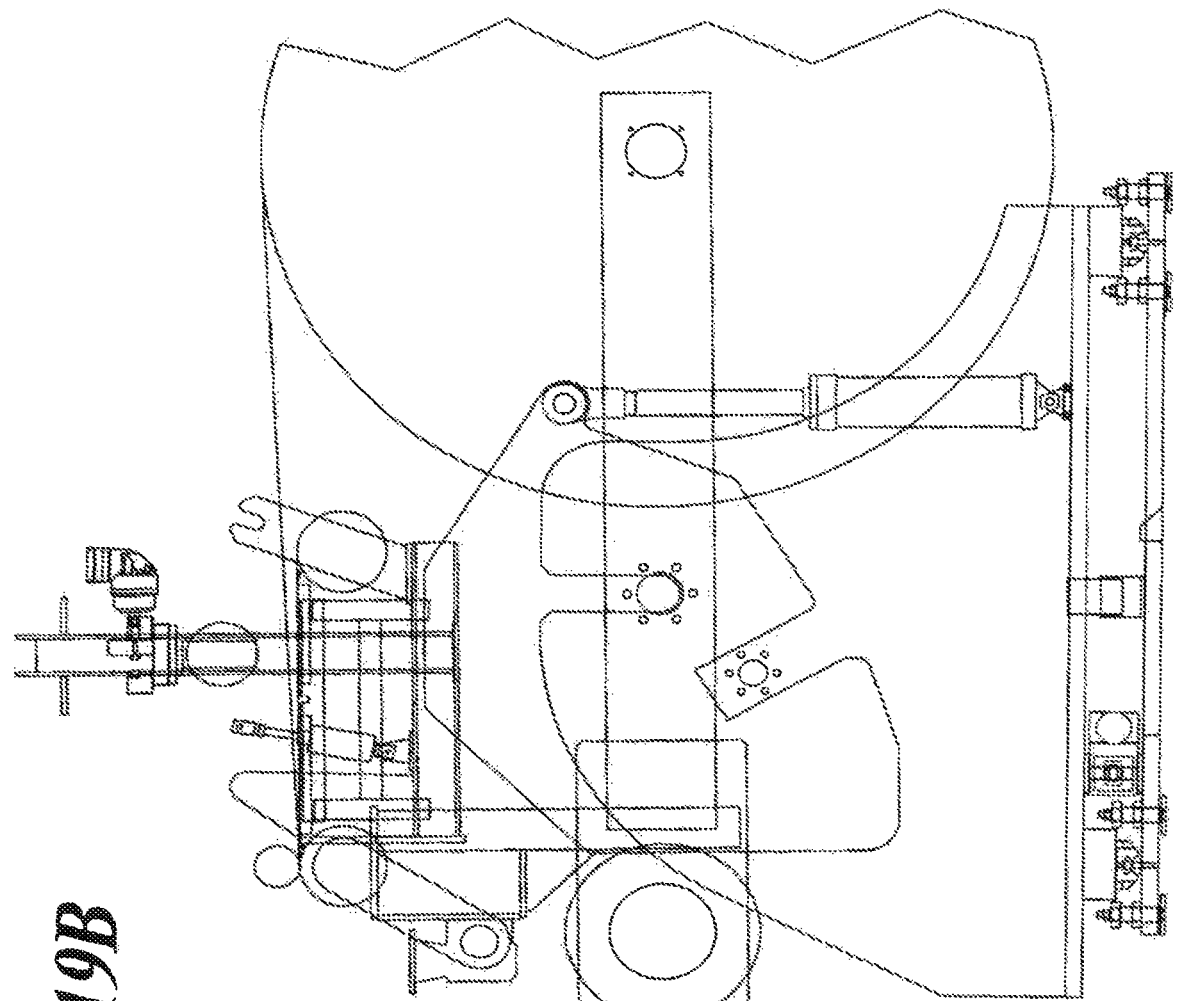
FIG. 19B is a partial view of the rewind system depicted in FIG. 19 in a loaded state.
Figure 19C:
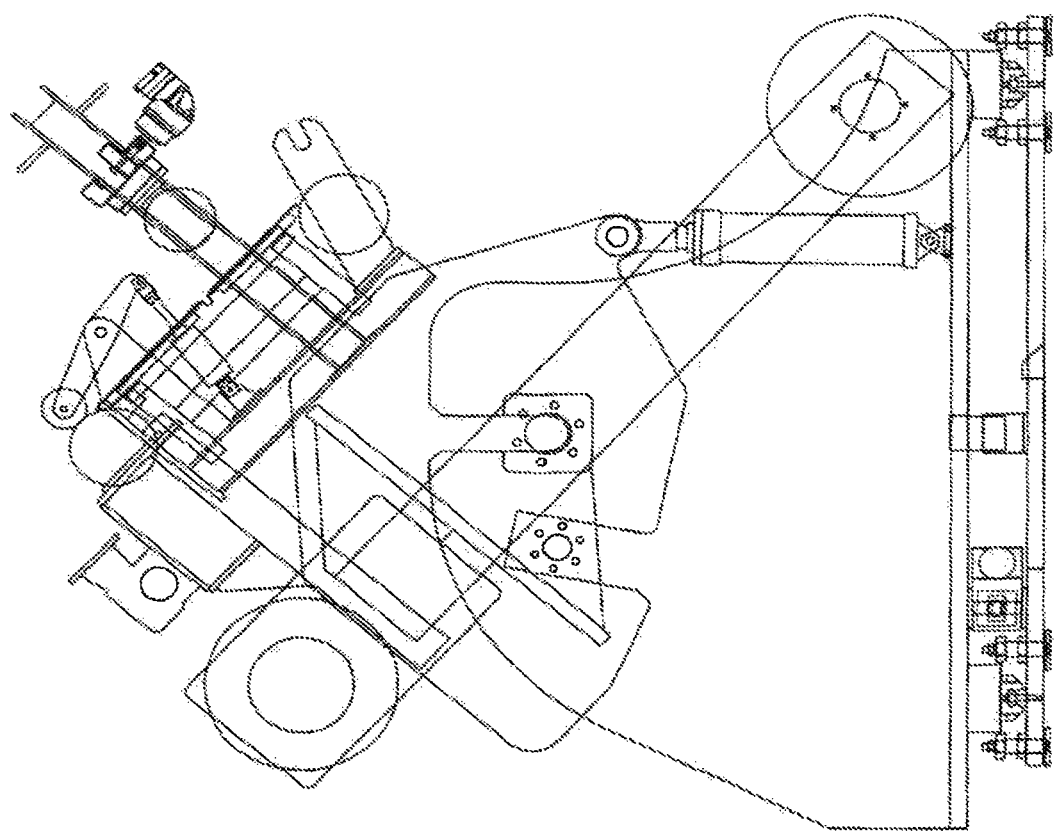
FIG. 19C depicts the rewind station depicted in FIG. 19 in an unloaded state.

FIG. 19 depicts a rewind station 1900 in which the laminated material 100 is rolled into a roll 1901. After being rolled into the roll 1901, the material is typically moved away on a roll shuttle 1950, which may be similar in construction to the roll shuttle used to deliver the backing material 130 or the facing material 1 10. FIG. 19A depicts a detailed view of the rewind station 100, which typically includes a motor 1910. Similar to the backing unwind station 1000, the rewind station 1900 typically includes a cylinder 1960 that applies a moment force to pivot the rewind station 1900 to unload the roll 1901 (see FIG. 19C). The roll 1901 is partially depicted in FIG. 19B before unloading. FIG. 19C depicts the rewind station 1900 after unloading the roll 1901.

Figure 20:
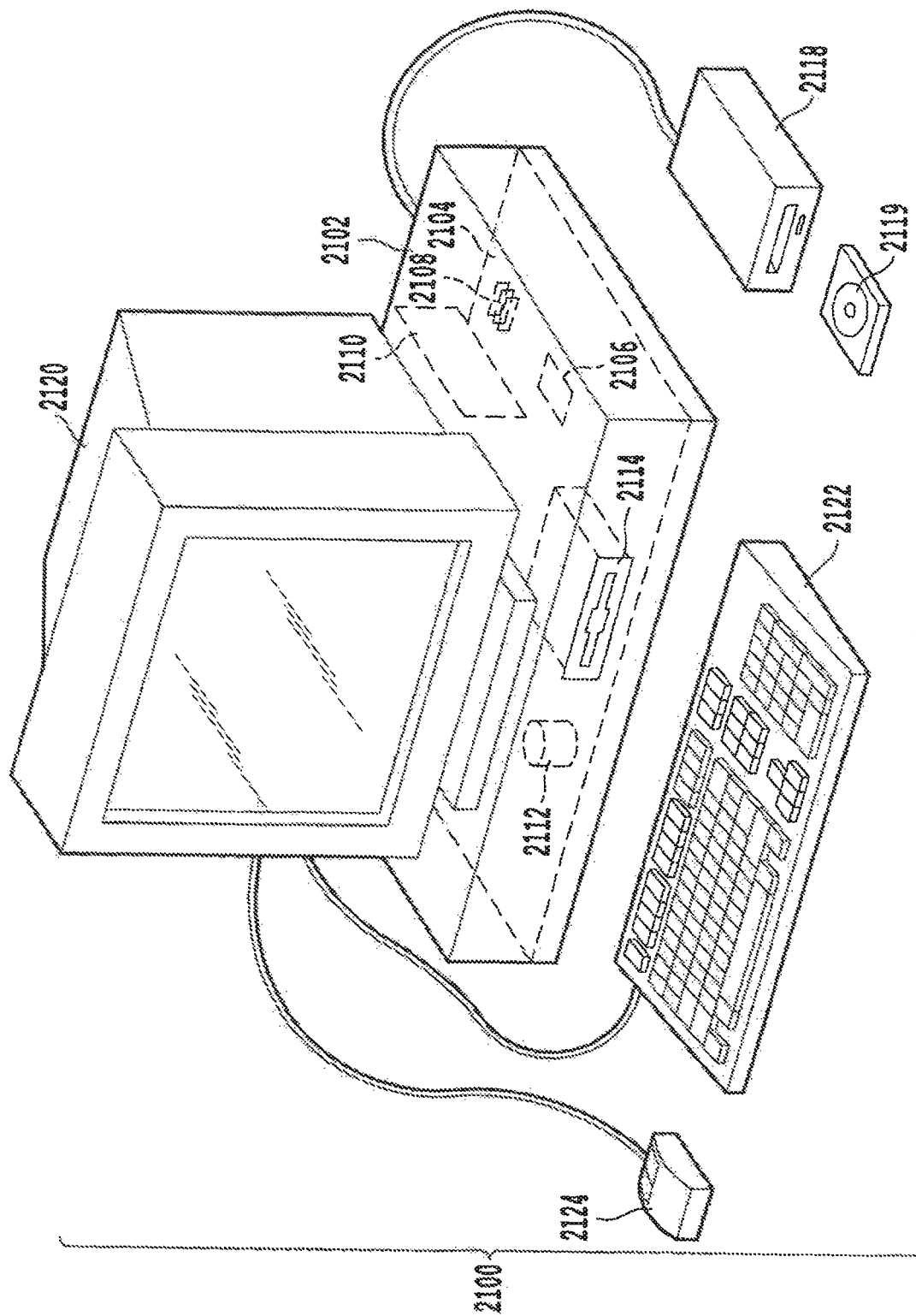
FIG. 20 is a schematic illustration of a computer system for operating the manufacturing system 101.

FIG. 20 is a schematic illustration of a computer system for operating the manufacturing system 101. A computer 2100 implements the method of the present invention, wherein the computer housing 2102 houses a motherboard 2104 which contains a CPU 2106, memory 2108 (e.g., DRAM, ROM, EPROM, EEPROM, SRAM, SDRAM, and Flash RAM), and other optional special purpose logic devices (e.g., ASICs) or configurable logic devices (e.g., GAL and reprogrammable FPGA). The computer 2100 also includes plural input devices, (e.g., a keyboard 2122 and mouse 2124), and a display card 2110 for controlling monitor 2120. In addition, the computer system 2100 further includes a floppy disk drive 2114; other removable media devices (e.g., compact disc 2119, tape, and removable magneto-optical media (not shown)); and a hard disk 2112, or other fixed, high density media drives, connected using an appropriate device bus (e.g., a SCSI bus, an Enhanced IDE bus, or a Ultra DMA bus). Also connected to the same device bus or another device bus, the computer 2100 may additionally include a compact disc reader 2118, a compact disc reader/writer unit (not shown) or a compact disc jukebox (not shown). Although compact disc 2119 is shown in a CD caddy, the compact disc 2119 can be inserted directly into CD-ROM drives which do not require caddies. In addition, a printer (not shown) also provides printed listings of tracked temperatures and tomographic information.

As stated above, the system includes at least one computer readable medium. Examples of computer readable media are compact discs 2119, hard disks 2112, floppy disks, tape, magneto-optical disks, PROMs (EPROM, EEPROM, Flash EPROM), DRAM, SRAM, SDRAM, etc. Stored on any one or on a combination of computer readable media, the present invention includes software for controlling both the hardware of the computer 2100 and for enabling the computer 2100 to interact with a human user. Such software may include, but is not limited to, device drivers, operating systems and user applications, such as development tools. Such computer readable media further includes the computer program product of the present invention for tracking temperature and tomographic information. The computer code devices of the present invention can be any interpreted or executable code mechanism, including but not limited to scripts, interpreters, dynamic link libraries, Java classes, and complete executable programs. The computer 2100 is typically configured to execute code stored in one of the above-noted computer readable media, which, when executed on the computer 2100, causes the computer 2100 to operate the manufacturing system 101 to perform any of the processes described in this document and to produce any of the products described in this document.

Although only certain embodiments of this invention have been described in detail above, those skilled in the art will readily appreciate that many modifications are possible in the exemplary embodiments without materially departing from the novel teachings and advantages of the invention. Accordingly, all such modifications are intended to be included within the scope of this invention. For example, the process and system described above may be arranged to handle various thicknesses of material 100. For example, from one millimeter to about 50 millimeters or greater. In embodiments of the invention the thickness of the material 100 may range from 2 to 50 mm, preferably from 3 to 40 mm, preferably from 4 to 30 mm, preferably from 5 to 20 mm, and preferably from 6 to 60 mm. Additionally, various widths of materials may be accommodated in the processes and system described above. For example, widths from a few inches to a dozen feet may be implemented.

Figure 21:
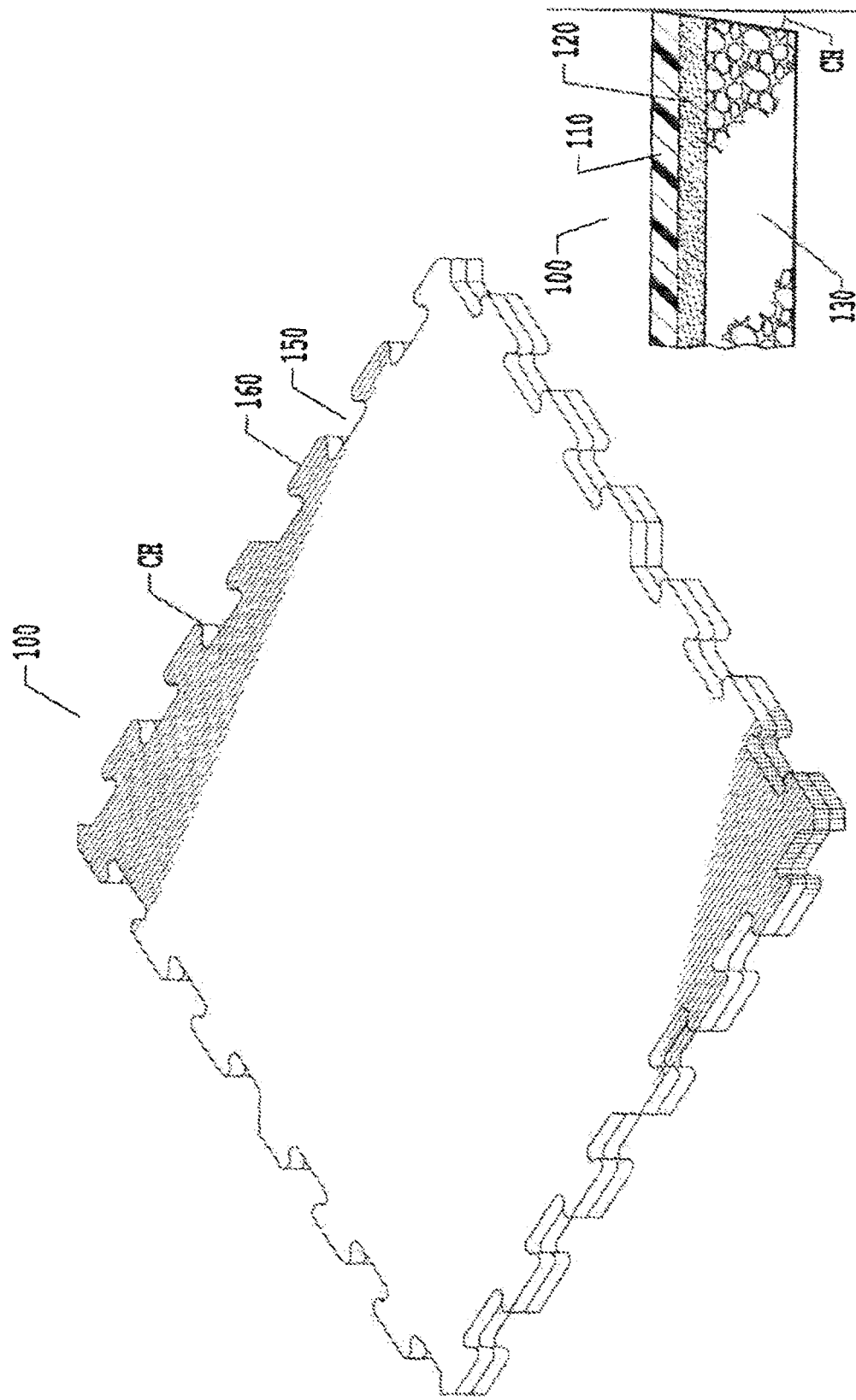
FIG. 21 is a depiction of a puzzle-cut pattern that can be applied to any of the covering materials described herein.

FIG. 21 is a view of a puzzle-cut flooring material according to one embodiment of the invention with a series of interlocking cavities 150 and protrusions 160. This arrangement can be applied to any configuration of the product 100. In many cases, the cavities 150 and protrusions 160 will interlock such that a first piece the product 100 will have to be lifted relative to an interlocked second piece of the product 100 in order to release the protrusions 160 of the first piece of the product 100 from the cavities 150 of the second piece of the product 100. Additionally, the edge of the product 100 is often chamfered with a chamfer CH (see FIG. 21A). In one example, the chamfer CH is approximately 5 degrees, which results in a slightly larger surface area for the top portion of the product 100 relative to the bottom portion. As discussed previously, this chamfer allows adjacent pieces of the product 100 to rest next to each other (or interlock) without interference from irregularities in the sidewalls of the product 100. One benefit of this arrangement is that seams between the top surfaces of the interlocked pieces of the product 100 are less visible from above. A chamfer such as the one depicted in FIG. 21A can be applied to the product 100 regardless of whether the product includes cavities 150 or protrusions 160. In other words, the chamfer CH can be applied to straight edges of the product 100 as well as to curved edges. Other shapes and sizes of cut pieces of the flooring may be made, aside from the puzzle-cut flooring shown in FIG. 21. For example, large or small circles, polygons, curved pieces, and strips may be produced.

Although the product 100 depicted in FIG. 21 includes cavities 150 and protrusions 160 on all four sides as viewed from above, the shape of the product 100 and the number of sides on which cavities 150 and protrusions 160 are present can vary. For example, in many instances, it is preferable that one or more of the sides of the product 100 are straight so that these sides present an edge that fits along a wall, into a corner, or defines a particular living/working space. In some cases, the straight edges are un-chamfered while the interlocking areas are chamfered. In other cases, all the edges are chamfered, even the straight edges.

When installed the edges of first and second tiles are preferably in contact with one another. The edges of the tiles provide a face that is at least partially represented by the rubber portion (base layer) of the tile. The rubber portions (e.g., that portion of the ace that comprises the base material layer material preferably have a high coefficient of friction with respect to one another. The static coefficient of friction ($\mu_s$) may be 0.5 or greater, 0.6 or greater, 0.7 or greater, 0.8 or greater between edge surfaces, preferably 0.9 or greater and even more preferably 1.0 or greater. The high coefficient of friction resists slippage between tiles and thereby provides a floor covering which is essentially seamless to the human eye.

In another embodiment of the invention the surface coating includes a reinforcing layer between the backing material and the facing material. The reinforcing layer may be in the form of for example, a layer of material that is different from both the surface layer material and the based layer material. In one embodiment that reinforcing layer is similar to at least one of the surface and base layers. The reinforcing layer may be a layer of fibers comprising synthetic and/or natural materials. Examples of reinforcing fiber materials include the fiber material that are present in the surface layer, e.g., glass fibers, synthetic polymer fibers, polyester, polyolefin, nylon and the like. In another embodiment the reinforcing layer is a layer of material that is similar to the base layer. The reinforcing layer may be rubber cured and/or crosslinked to a different degree than the base layer. Such chemical differences may provide a reinforcing layer that has greater strength and/or rigidity than the base layer. Curing may be effected either thermally or by radiation such as UV light.

The reinforcing layer may be in the form of a woven layer, non-woven layer, spun layer, web, dispersed fibers, and/or scrim. The reinforcing layer can serve to resist extension and stretching of the floor tile in its two major dimensions. Other layers such as a water barrier layer, e.g., a layer of microporous or impermeable material may also optionally be included.

Figure 22:
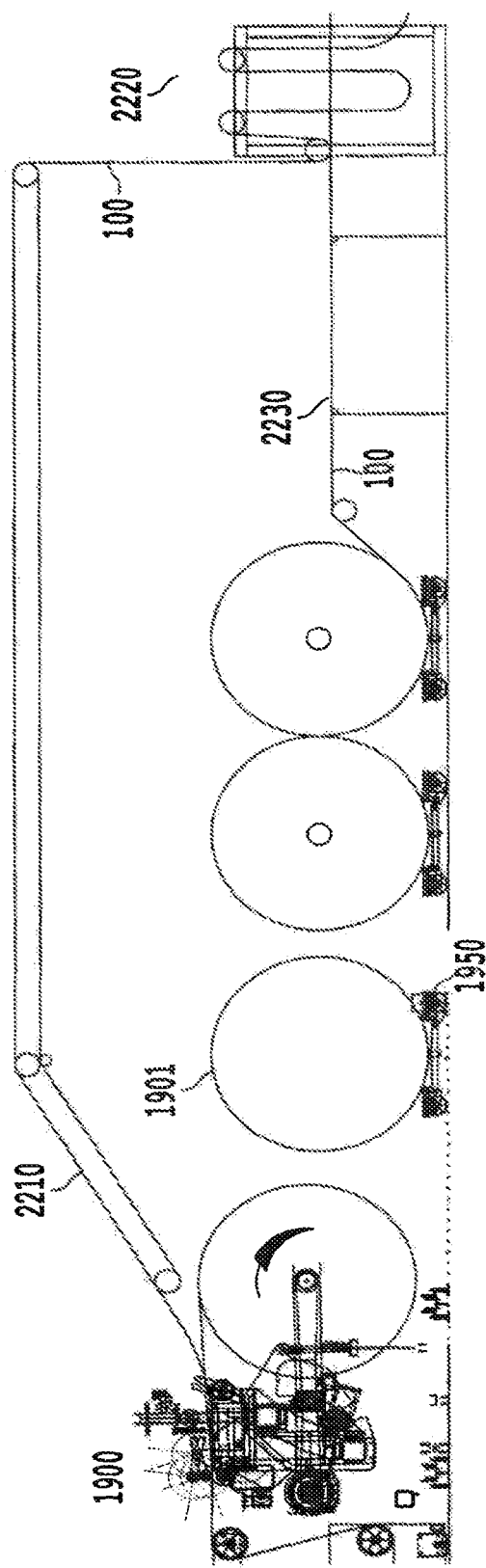
FIG. 22 depicts a side view of an arrangement of the laminator with a first part of an optional/alternative continuous die cutting pathway.

FIG. 22 depicts a first portion of a die cutting system that may be implemented in combination with the lamination system described above. In one embodiment, the die cutting system is entirely detached from the lamination system, and rolls 1901 are positioned in an unload or unwind station directly in front of a stencil table 2230. In such an arrangement, one benefit is that the die cutting station may be used with materials unrelated to those currently being produced in the lamination system. Another benefit is that the rolls 1901 may be temporarily stored before being die cut. In this way, the final form of the material in the rolls may be determined well after the lamination is completed.

In another arrangement, product 100 bypasses the rewind station 1900 and travels along a bypass conveyor 2210 and toward a mini-accumulator 2220. The mini-accumulator 2220 may be the same or similar to the accumulator 1800 discussed previously. Typically, however, the mini-accumulator 2220 stores less material than the accumulator 1800. By storing material in the mini-accumulator 2220, the infeed table 2310 (see FIG. 23) can continuously supply the press 2320 (shown in FIG. 23). In other words, as the laminator system typically feeds material continuously, and sometimes at a substantially constant rate, the mini-accumulator 2220 allows a build-up of material to supply the press 2320, which typically functions as an indexing machine inasmuch as material starts and stops in order to feed the press 2320.

As shown in FIG. 23, the press 2320, once having pressed a pattern into the product 100, sends the pressed, i.e., cut, material to the outfeed table 2330 which then may send the material to a take-away conveyor 2340 that feeds a shuttle conveyor 2350 that stacks the cut pieces in a stack 2360. Alternatively, the cut pieces produced by the press 2320 may be stacked by hand rather than handled by a take-away conveyor 2340 and shuttle conveyor 2350.

The press 2320 typically uses a belt such as a urethane belt in order to accommodate the pressing action used to cut the product 100. The flexible belt supports the product 100 during the pressing portion of the die cutting process. To perform die cutting, the press 2320 exerts a force on the product 100 and shears the product 100 into any of various shapes such as squares, rectangles, other polygons, circles, or the above-noted puzzle-cut pieces. The die cutting system may be controlled by the same controller used to the control the lamination system or may have its own controller or computer system. In one embodiment, the die cutting system is operated via manual control.

Example Product

Using the above described lamination technology/process, a vinyl surface material can be laminated to the cushioned recycled rubber backing such that the final laminated recycled rubber to vinyl product exhibits a unique fire and smoke attenuating property. Unlike the recycled rubber backing/underlayment itself, the laminated finished products are fire retardant and meet ASTM E-684 Class I (>0.45 W/m$^2$) ratings (ASTM E-684 is incorporated herein by reference for all purposes). This is accomplished because when exposed to heat or flame, the vinyl melts into the recycled rubber backing matrix thereby partially encasing the rubber granules comprising the recycled rubber backing matrix in vinyl rendering the rubber fire and smoke retardant as well. This interaction results in a product performance otherwise unattainable from the constituent components.

The laminated recycled rubber to vinyl also changes the frequency of the sound generated when the flooring surface is impacted. The normal frequency range of hard surface flooring is 30 to 36 dB. With the addition of 2-10 mm of the recycled rubber backing, the frequency generated is typically lowered to IIC 51 dB (ASTM E2179), thereby resulting in a "quieter" patient environment.

The laminated recycled rubber to vinyl likewise results in measurable force reduction. Un-backed flooring offers little to no force reduction. The addition of 2-6 mm of recycled rubber backing utilizing the above-described technology/process results in a force reduction of, for example, 17% (ASTM F2569) improving impact absorption and ergonomics of the laminated recycled rubber to vinyl product.

Another feature of the laminated recycled rubber to vinyl product is it can be installed without the use of an adhesive. The conventional installation of traditional vinyl floors always used adhesive. However, due to the mass of the recycled rubber and its dimensional stability after lamination, the product can be installed loose on the floor. The seams can then be heat welded with a PVC weld rod to provide a monolithic finished system. The ability to lay commercial flooring loosely can result in a 20-30% cost savings over adhered systems and allows for easy removal and recycling after use.

Obviously, numerous modifications and variations of the present invention are possible in light of the above teachings. It is therefore to be understood that within the scope of the appended claims, the invention may be practiced otherwise than as specifically described herein.

We claim:

1. A laminated surface covering, comprising:
   a facing material comprising vinyl;
   a backing material comprising a styrene butadiene rubber component matrix; and
   a bonding material,
   wherein the bonding material directly adheres the facing material to the backing material,
   wherein the facing material is configured to melt when the temperature of the facing material rises to be between 165° F. and 248° F. due to unexpected exposure to heat or flame, at which time the facing material melts, partially encasing the backing material in vinyl.

2. The laminated surface covering of claim 1 wherein the facing material is configured to melt when the temperature of the facing material rises to be between 165° F. and 210° F. due to unexpected exposure to heat or flame, at which time the facing material melts, partially encasing the backing material in vinyl.

3. The laminated surface covering of claim 1 wherein the facing material is configured to melt when the temperature of the facing material rises to be between 210° F. and 248° F. due to unexpected exposure to heat or flame, at which time the facing material melts, partially encasing the backing material in vinyl.

4. The laminated surface covering of claim 1, wherein the bonding material is in a solid form at room temperature.

5. The laminated surface covering of claim 1, wherein the backing material comprises granulated recycled rubber from tires.

6. The laminated surface covering of claim 1, wherein the backing material comprises at least 10% by weight of reground rubber from a recycled surface covering.

7. The laminated surface covering of claim 1, wherein a mass and a dimensional stability of the laminated surface covering allow the covering to be installed without adhesive.

8. The laminated surface covering of claim 1, wherein the backing material attenuates the frequency of sounds when the covering is impacted.

9. The laminated surface covering of claim 1, wherein the backing material improves impact absorption for improved force reduction characteristics.

10. The laminated surface covering of claim 1, wherein the material between the facing material and the backing material essentially consists of the bonding material.

11. The laminated surface covering of claim 1, which is in the form of an interlocking tile.

12. The laminated surface covering of claim 1, which is in the form of rolls.

13. A laminated surface covering for providing flame retardation and smoke suppression, comprising:
    a facing material comprising vinyl;
    a backing material comprising a styrene butadiene rubber component that is not compliant with ASTM E-648 Class I; and
    a bonding material,
    wherein the bonding material directly adheres the facing material to the backing material,
    wherein the facing material is configured to melt when the temperature of the facing material rises to be between 165° F. and 248° F. due to unexpected exposure to heat or flame, at which time the facing material infiltrates the backing material, such that the laminated surface covering is compliant with ASTM E-648 Class I.

14. The laminated surface covering of claim 13 wherein the facing material is configured to melt when the temperature of the facing material rises to be between 165° F. and 210° F. due to unexpected exposure to heat or flame, at which time the facing material infiltrates the backing material, such that the laminated surface covering is compliant with ASTM E-648 Class I.

15. The laminated surface covering of claim 13, wherein the surface tension of the backing material is disrupted prior to bonding with the facing material.

16. The laminated surface covering of claim 13, wherein the bonding material is in a solid form at room temperature.

17. The laminated surface covering of claim 13, wherein the backing material comprises granulated recycled rubber from tires.

18. The laminated surface covering of claim 13, wherein a mass and a dimensional stability of the laminated surface covering allow the covering to be installed without adhesive.

19. The laminated surface covering of claim 13, wherein the backing material attenuates the frequency of sounds when the covering is impacted.

20. The laminated surface covering of claim 13, wherein the backing material improves impact absorption for improved force reduction characteristics.

21. The laminated surface covering of claim 13, wherein the material between the facing material and the backing material essentially consists of the bonding material.

* * * * *